(12) United States Patent
Di Girolamo et al.

(10) Patent No.: US 12,477,541 B2
(45) Date of Patent: Nov. 18, 2025

(54) NR SIDELINK DISCONTINUOUS RECEPTION

(71) Applicant: INTERDIGITAL PATENT HOLDINGS, INC., Wilmington, DE (US)

(72) Inventors: Rocco Di Girolamo, Laval (CA); Pascal Adjakple, Great Neck, NY (US); Qing Li, Princeton Junction, NJ (US); Zhuo Chen, Claymont, DE (US); Joseph Murray, Schwenksville, PA (US); Kyle Pan, Saint James, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 675 days.

(21) Appl. No.: 17/784,431

(22) PCT Filed: Dec. 11, 2020

(86) PCT No.: PCT/US2020/064582
§ 371 (c)(1),
(2) Date: Jun. 10, 2022

(87) PCT Pub. No.: WO2021/119474
PCT Pub. Date: Jun. 17, 2021

(65) Prior Publication Data
US 2023/0014303 A1    Jan. 19, 2023

Related U.S. Application Data

(60) Provisional application No. 62/947,906, filed on Dec. 13, 2019.

(51) Int. Cl.
*H04W 72/20*    (2023.01)
*H04W 4/46*    (2018.01)
(Continued)

(52) U.S. Cl.
CPC ....... *H04W 72/20* (2023.01); *H04W 72/1263* (2013.01); *H04W 76/28* (2018.02); *H04W 4/46* (2018.02)

(58) Field of Classification Search
CPC ... H04W 4/46; H04W 72/1263; H04W 72/20; H04W 76/28
See application file for complete search history.

(56) References Cited

U.S. PATENT DOCUMENTS

2015/0351152 A1   12/2015   Yuan et al.
2017/0019820 A1   1/2017   Das
(Continued)

FOREIGN PATENT DOCUMENTS

CN   104125612 A   10/2014
CN   108307486 A   7/2018
(Continued)

OTHER PUBLICATIONS

3rd Generation Partnership Project; Technical Specification Group Radio Access Network; NR; Medium Access Control (MAC) protocol specification (Release 16); 3GPP TS 38.321 V16.3.0; Jan. 2021, pp. 1-156.
(Continued)

*Primary Examiner* — Brian P Cox
(74) *Attorney, Agent, or Firm* — Flaster Greenberg P.C.

(57) ABSTRACT

SL DRX mechanism is used for power savings, to address a number of sidelink non-vehicular sidelink use cases. Methods, systems, and apparatuses, among other things, as described herein may use 1) A sidelink state model to describe the UE behavior for sidelink DRX operation. The DRX operation tailored to each of the sidelink states; 2) Power savings opportunities during SL operation, in addition to stopping PSCCH monitoring; 3) Various DRX models applicable to the sidelink; 4) SL_DRX operation for the
(Continued)

SL UnLinked state; or 5) SL DRX operation for the SL_Linked state.

9 Claims, 33 Drawing Sheets

(51) Int. Cl.
*H04W 72/1263* (2023.01)
*H04W 76/28* (2018.01)

(56) References Cited

U.S. PATENT DOCUMENTS

| | | | |
|---|---|---|---|
| 2018/0145800 A1 | 5/2018 | Srivastav et al. | |
| 2019/0174411 A1* | 6/2019 | Xu | H04W 52/02 |
| 2020/0120745 A1* | 4/2020 | Yang | H04W 40/24 |
| 2021/0051587 A1 | 2/2021 | Wu et al. | |
| 2021/0400761 A1* | 12/2021 | Maleki | H04W 72/23 |

FOREIGN PATENT DOCUMENTS

| | | |
|---|---|---|
| CN | 108307489 A | 7/2018 |
| EP | 3499975 A1 | 6/2019 |
| WO | WO-2017078783 A1 * | 5/2017 |
| WO | 2018/064477 A1 | 4/2018 |
| WO | 2020/218892 A1 | 10/2020 |
| WO | 2021/002723 A1 | 1/2021 |

OTHER PUBLICATIONS

3rd Generation Partnership Project; Technical Specification Group Radio Access Network; NR; Radio Resource Control (RRC) protocol specification (Release 16); 3GPP TS 38.331 V16.3.1; Jan. 2021, pp. 1-932.

3rd Generation Partnership Project; Technical Specification Group Services and System Aspects; Study on enhancement of 3GPP Support for 5G V2X Services (Release 16); 3GPP TR 22.886 V16.2.0; Dec. 2018, pp. 1-76.

RP-202846, NR Sidelink Enhancement Work Item Description; 3GPP TSG RAN Meeting #96, Budapest, Hungary, Jun. 6-9, 2022, pp. 1-6.

Huawei, "Consideration on the sidelink DRX for unicast, groupcast and broadcast", 3GPP TSG-RAN WG2 Meeting #112 electronic, R2-2009413, Nov. 2-13, 2020, 8 pages.

Apple : "Discussion on remaining issues on SL DRX Configuration", 3GPP Draft; R2-2100862, 3rd Generation Partnership Project (3GPP), Mobile Competence Centre; 650, Route Des Lucioles ; F-06921 Sophia-Antipolis Cedex ; France vol. RAN WG2, No. Online; Jan. 25, 2020-Feb. 5, 2020, Jan. 15, 2021, pp. 1-4.

Fraunhofer IIS et al., "General Principle of NR SL DRX", 3GPP Draft; R2-2100573, 3rd Generation Partnership Project (3GPP), Mobile Competence Centre ; 650, Route Des Lucioles; F-06921 Sophia-Antipolis Cedex ; France vol. RAN WG2, No. Online; Jan. 25, 2021-Feb. 5, 2021, Jan. 14, 2021, pp. 1-4.

Interdigital Inc: "Initial discussion on SL DRX" 3GPP Draft; R2-2009210, 3rd Generation Partnership Project (3GPP), Mobile Competence Centre; 650, Route Des Lucioles ; F-06921 Sophia-Antipolis Cedex ; France vol. RAN WG2, No. electronic; Nov. 1, 2020 Oct. 23, 2020 (Oct. 23, 2020), pp. 1-3.

$3^{rd}$ Generation Partnership Project; "Technical Specification Group Services and System Aspects; Architecture enhancements for 5G System (5GS) to support Vehicle-to-Everything (V2X) services (Release 16)", 3GPP TS 23.287 V16.0.0, Sep. 2019, 49 pages.

3rd Generation Partnership Project; "Technical Specification Group Services and System Aspects; Proximity-based services (ProSe); Stage 2 (Release 15)", 3GPP TS 23.303 V15.1.0, Jun. 2018, 130 pages.

3rd Generation Partnership Project; "Technical Specification Group Radio Access Network; NR; User Equipment (UE) procedures in Idle mode and RRC Inactive state (Release 15)", 3GPP TS 38.304 V15.5.0, Sep. 2019, 29 pages.

$3^{rd}$ Generation Partnership Project; "Technical Specification Group Radio Access Network; NR; Medium Access Control (MAC) protocol specification (Release 15)", 3GPP TS 38.321 V15.7.0, Sep. 2019, 78 pages.

* cited by examiner a) SL DRX per Destination b) SL DRX per Source-Destination Pair (per SL Connection)

c) SL DRX per Resource Pool d) SL DRX per SL Carrier Frequency e) SL DRX per Service Type

NR SIDELINK DISCONTINUOUS RECEPTION

CROSS-REFERENCE TO RELATED APPLICATIONS

This application is the National Stage Application of International Patent Application No. PCT/US2020/064582, filed Dec. 11, 2020, which claims the benefit of U.S. Provisional Patent Application No. 62/947,906, filed on Dec. 13, 2019, entitled "Nr Sidelink Discontinuous Reception," the contents of which are hereby incorporated by reference herein.

BACKGROUND

Sidelink Communication: Communication between set of peer UEs that are in proximity. The communication may be unicast (between a UE and a single peer UE), groupcast (between a UE and a fixed number of other UEs), or broadcast (between a UE and all other UEs in proximity).

ProSe Discovery: A process that identifies that a UE that is ProSe-enabled is in proximity, using E-UTRA or EPC.

ProSe Direct Discovery: A procedure employed by a ProSe-enabled UE to discover other ProSe-enabled UEs in its vicinity by using only the capabilities of the two UEs with E-UTRA technology.

EPC-level ProSe Discovery: A ProSe Discovery procedure by which the EPC determines the proximity of two ProSe-enabled UEs and informs them of their proximity.

Open ProSe Discovery: is ProSe Discovery without explicit permission from the ProSeenabled UE being discovered.

Restricted ProSe Discovery: ProSe Discovery that only takes place with explicit permission from the ProSe-enabled UE being discovered.

Connected Mode (e.g., TS 38.321, NR; Medium Access Control (MAC) protocol specification, V15.7.0-[1]) DRX controls when the UE may stop PDCCH monitoring, in order to save power. DRX has an ON-OFF cycle, with the ON (or Active) duration being extended under a number of conditions:

- drx-onDurationTimer or drx-InactivityTimer or drx-RetransmissionTimerDL or drx-RetransmissionTimerUL or ra-ContentionResolutionTimer is running; or
- a Scheduling Request is sent on physical uplink control channel (PUCCH) and is pending; or
- a PDCCH indicating a new transmission addressed to the C-RNTI of the MAC entity has not been received after successful reception of a Random Access Response for the preamble not selected by the MAC entity.

During the OFF portion of the cycle, the UE has the opportunity to go into DRX, as it knows that it will not be scheduled for any DL transmissions. In contrast, during the ON portion of the cycle, the UE may be scheduled for DL transmission, and as a result the UE is required to monitor the PDCCH for every sub-frame. The basic procedure is shown in FIG. 1.

DRX may be configured with a short cycle and a long cycle. The UE uses the short cycle for a maximum amount of occurrences, after which the long cycle is used (See FIG. 2).

The Connected mode DRX procedure applies to a single MAC entity. DRX "controls the UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, and TPC-SRS-RNTI Connected mode DRX is an optional capability of a UE (it is signaled to the network), and it is configured by the network through the IE: MAC-MainConfig (See Table 1). Once configured through RRC signaling, DRX is active for the UE.

TABLE 1

Some DRX Configuration Parameters

| DRX Parameter | Description |
| --- | --- |
| drx-onDurationTimer | The duration of 'ON time' within one DRX cycle |
| drx-InactivityTimer | Specify how long UE should remain 'ON' after the reception of a PDCCH. When this timer is on UE remains in 'ON state' which may extend UE ON period into the period which is 'OFF' period otherwise. |
| drx-RetransmissionTimerDL | Specifies the maximum time the UE should remain active to wait an incoming retransmission after the first available retransmission time |
| drx-RetransmissionTimerUL | Specifies the maximum time the UE should remain active to wait an incoming grant for UL retransmission is received |
| drx-shortCycle | DRX cycle which can be implemented within the 'OFF' period of a long DRX Cycle. |
| drx-ShortCycleTimer | The consecutive number of subframes the UE shall follow the short DRX cycle after the DRX Inactivity |
| drx-longCycleStartOffset | Provides information related to the duration of the long cycle (longDRX-Cycle) and the starting offset of the long cycle (drx-StartOffset). The cycle ranges from a few subfames to thousands of subframes |

Network can cut short an Active time, by sending a "DRX Command" MAC control element or a "Long DRX Command" MAC control element. This will trigger the UE to fall back to OFF mode. The DRX Command MAC control element triggers the UE to start a short DRX cycle (if one is configured) or start a long DRX cycle otherwise. The long DRX Command MAC control element triggers the UE to start a long DRX cycle.

The timing of the start of the ON duration is based on the configured values and depends on the following formula:

if the Short DRX Cycle is used:

$$[(SFN \times 10) + \text{subframe number}] \bmod (drx\text{-ShortCycle}) = (drx\text{-StartOffset}) \bmod (drx\text{-ShortCycle});$$

or if the Long DRX Cycle is used:

$$[(SFN \times 10) + \text{subframe number}] \bmod (drx\text{-LongCycle}) = drx\text{-StartOffset};$$

Idle Mode (or paging) DRX (e.g., TS 38.304, NR; User Equipment (UE) procedures in idle mode and in RRC Inactive state, V15.5.0-[2]) is defined when the UE in RRC_IDLE or RRC_INACTIVE states. While in these states the UE is only required to monitor paging channels during one Paging Occasions (PO) per DRX cycle. The Paging DRX cycles are configured by the network:
1) For Core Network (CN)-initiated paging, a default cycle is broadcast in system information;
2) For Core Network (CN)-initiated paging, a UE specific cycle can be configured via NAS signalling;
3) For RAN-initiated paging, a UE-specific cycle is configured via RRC signalling;

The UE uses the shortest of the DRX cycles applicable i.e. a UE in RRC_IDLE uses the shortest of the first two cycles above, while a UE in RRC_INACTIVE uses the shortest of the three.

The UE monitors one paging occasion (PO) per DRX cycle, in the Paging Frame that carries its PO. Every DRX cycle has one paging frame (PF) which may contain multiple POs. A PO is a set of PDCCH monitoring occasions and can consist of multiple time slots (e.g. subframe or OFDM symbol) where paging DCI can be sent. One Paging Frame (PF) is one Radio Frame and may contain one or multiple PO(s) or starting point of a PO.

The PF and PO for paging are determined by the following formulae:
SFN for the PF is determined by:

$$(SFN + PF\_offset) \bmod T = (T \div N) * (UE\_ID \bmod N)$$

Index (i_s), indicating the index of the PO is determined by:

$$i\_s = \mathrm{floor}(UE\_ID / N) \bmod Ns$$

The following parameters are used for the calculation of PF and i_s above:
T: DRX cycle of the UE (T is determined by the shortest of the UE specific DRX value(s), if configured by RRC or upper layers, and a default DRX value broadcast in system information. If UE specific DRX is not configured by RRC or by upper layers, the default value is applied).
N: number of total paging frames in T
Ns: number of paging occasions for a PF
PF_offset: offset used for PF determination
UE_ID: 5G-S-TMSI mod 1024

This background information is provided to reveal information believed by the applicant to be of possible relevance. No admission is necessarily intended, nor should be construed, that any of the preceding information constitutes prior art.

SUMMARY

Herein, discontinuous reception mechanisms for sidelink connections are disclosed. The SL DRX mechanism is used for power savings, to address a number of sidelink non-vehicular sidelink use cases.

Disclosed herein: 1) A sidelink state model to describe the UE behavior for sidelink DRX operation. The DRX operation tailored to each of the sidelink states; 2) Power savings opportunities during SL operation, in addition to stopping PSCCH monitoring; 3) Various DRX models applicable to the sidelink. These models describing how SL DRX operates (per destination, per service type, per cast type, etc.); 4) SL DRX operation for the Sl_UnLinked state. Including how to enable or disable the SL DRX, how to configure the SL DRX, and the operation of SL DRX in SL_UnLinked state; and 5) SL DRX operation for the SL_Linked state. Including how to enable or disable the SL DRX, how to configure the SL DRX, and the operation of SL DRX in SL_Linked state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Figure 1:
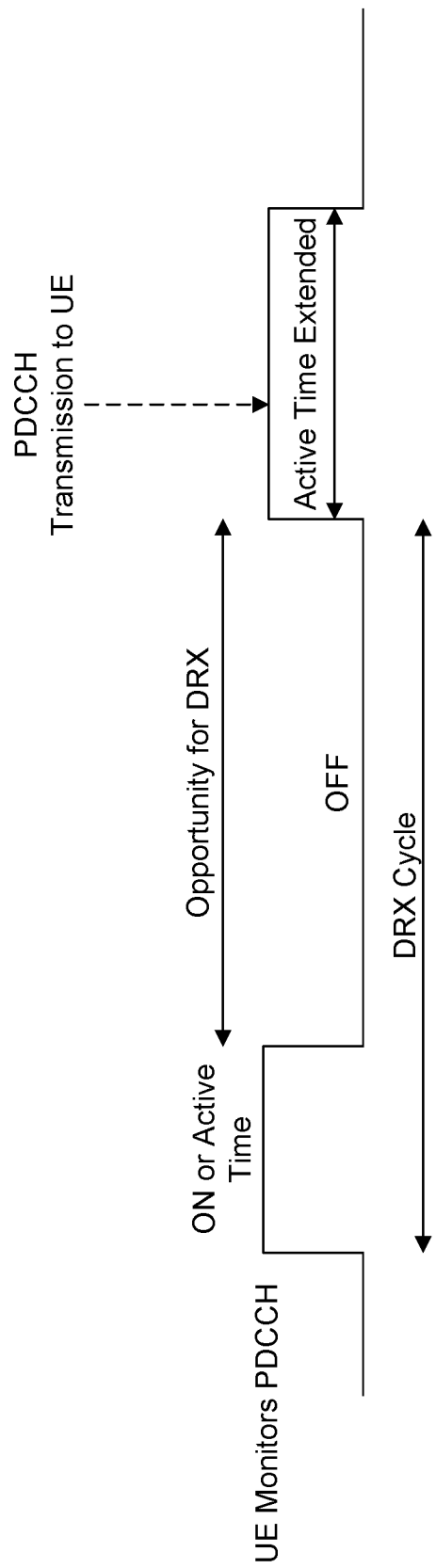
FIG. 1 illustrates an exemplary LTE Connected Mode DRX.
Figure 2:
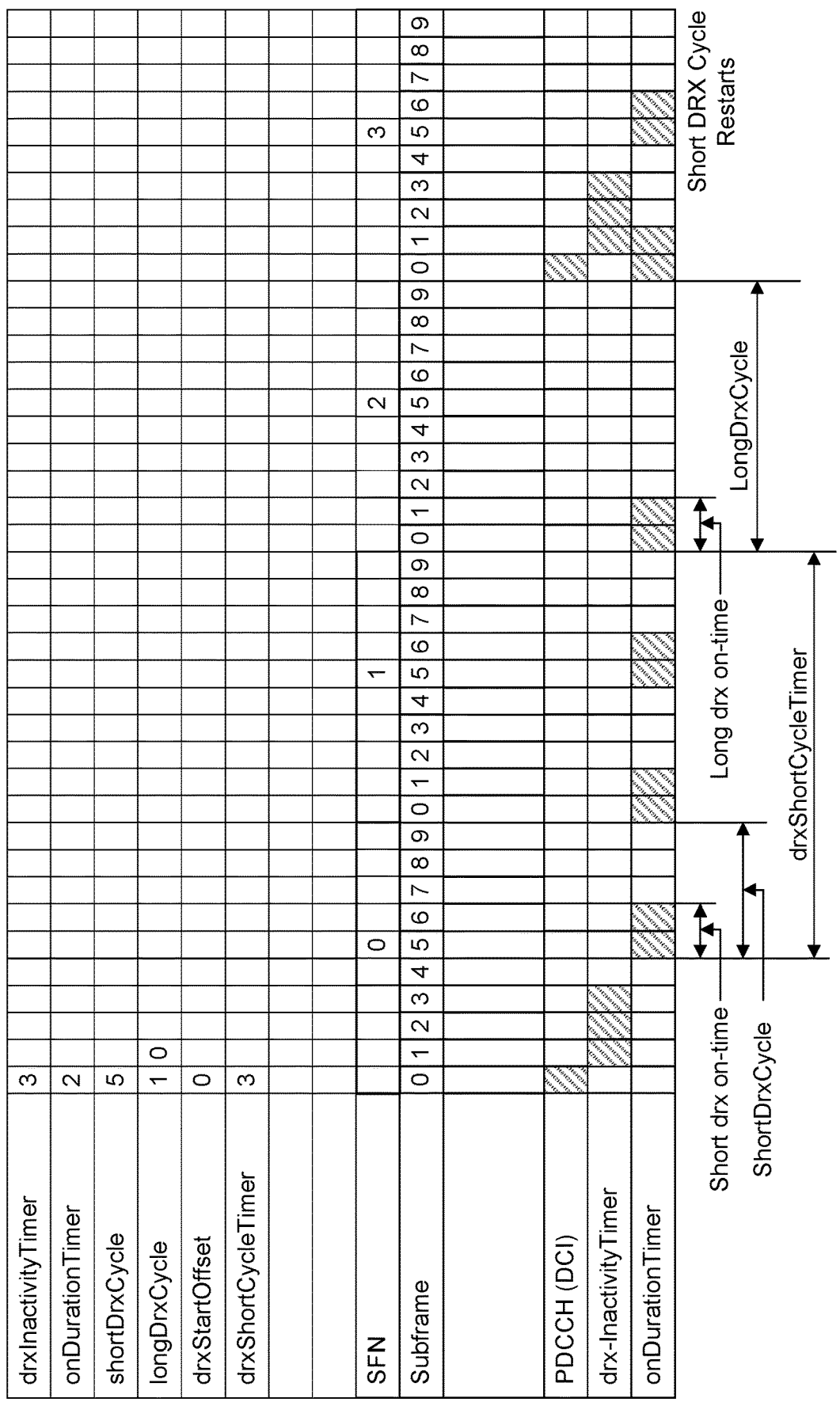
FIG. 2 illustrates an exemplary Short/Long NR Connected Mode DRX.

Disclosed herein are discontinuous reception mechanisms for sidelink connections. A SL DRX (also referred to as just "DRX" herein) mechanism may be used for power savings to address a number of sidelink non-vehicular sidelink use cases. NR Sidelink (SL) is envisioned for a number of use cases, such as an NR V2X sidelink use case, NR Commercial (non-V2X) sidelink use case, or NR Critical (non-V2X) sidelink use case.

NR V2X sidelink: In one use case, information may be provided to vulnerable road users, e.g., pedestrian or cyclist, about the presence of moving vehicles in case of dangerous situation.

NR Commercial (non-V2X) sidelink: Sidelink communications with high throughput and low latency may be required, such as for proximity based applications of augmented reality/virtual reality (AR/VR). For example, a head mounted device VR unit may have a sidelink to offload computing to a gateway device.

NR Critical (non-V2X) sidelink: Some critical (e.g., emergency) situations may require SL communications with little or no cellular coverage, and with first responders using UEs for extended periods of time to communicate with each other and to send out location information. Power savings for first responders is an important factor.

In these use cases, the UEs may rely on NR sidelink for communication, and may require: high data rate, low latency, ultra reliability, or low power consumption. Conventional NR V2X approaches are not expected to do a good job at power consumption requirements. Conventional UEs relying on these NR V2X solutions may not be power efficient. Conventionally, the procedures were designed assuming mostly a vehicle-to-vehicle (V2V) model, where the UEs were vehicles. As a result, these UEs may not have issues with power consumption, and power usage may not have been focused on as a design consideration.

Power savings is a significant issue for NR sidelink communication. Sidelink Discontinuous Reception (DRX) is one mechanism to achieve this power savings. However, a number of issues should be resolved to use DRX for sidelink communications.

Issue 1: SL DRX Modeling

For the Uu interface, the UE actions related to DRX may be tied to the RRC state of the UE (hereinafter referred to as the "Uu State Model" of the UE). The UE follows different DRX actions depending on whether the UE is in RRC_IDLE, in RRC INACTIVE, or in RRC CONNECTED. On the sidelink, the notion of RRC state with respect to a peer UE may not exist, and RRC connections are defined (for unicast sidelinks), but these SL RRC connections have no associated RRC state. Therefore one issue to be addressed in support of sidelink DRX specification is the issue of how to model sidelink DRX operation in terms of whether or not the UE is engaged in sidelink activities, and if UE is engaged in sidelink activities, the types of sidelink activities the UE is engaged in for, e.g. only sidelink discovery, or sidelink communication in addition to sidelink discovery. Another sidelink DRX modeling issue to be addressed is how to design sidelink DRX in a multi-peer UEs sidelink discovery or sidelink communication environment wherein a UE may be engaged in sidelink interactions with more than one UE, with each peer UE having its own sidelink transmission and reception resources in both time, frequency and spatial domain. On Uu interface, in RRC idle mode or RRC inactive mode the UE performs DRX operation with respect to only one peer cell (serving cell). The UE should know when that cell may send it paging messages, and that cell should know when the UE is monitoring for paging messages that it is sending to the UE. The UE shares a common knowledge with that cell of resources in time, frequency, and space domain for data reception from that cell such as paging reception, and therefore is aligned with the serving cell in terms of when to perform reception from the cell or discontinue reception to save power. Again, 'common knowledge' is a term used to describe that the serving cell and the UE have the same understanding of which resources (e.g., time, frequency, and beam) will be used to transmit the paging message. If not, they would be unsynchronized and the UE would not be listening when the serving cell is transmitting the paging message. Conventionally, this common knowledge may be difficult to achieve on the SL since the peer UEs may not know each other On Uu interface in RRC connected mode, the UE may perform DRX operation with respect to only one group of cells (group of serving cells) controlled by the same scheduler or the UE may perform DRX operation with respect to more than one group of cells controlled by more than one scheduler. In the aforementioned cases, it is relatively simple to ensure that the UE and the groups of serving cells share a common knowledge of the communication resources in time, frequency and space for data reception such as the UE can perform reception of data of interest or discontinue reception to save power. In the case of sidelink multi-peer UEs environment, the issues of how to ensure discovery or communication resource coordination in time, frequency and spatial domain amongst sidelink UEs such that the UE can discontinue transmission or discontinue reception on sidelink in order to save power without missing reception of data intended for the UE need to be addressed. Additionally, there is a need to identify DRX parameters and to address how these DRX parameters are configured into the UE, considering sidelink scenarios such as in-coverage, partial coverage, and out of coverage.

Issue 2: SL DRX During Sidelink Discovery

During discovery, the UE may be in a monitoring phase, an announcing phase, or a joint monitoring/announcing phase. The monitoring phase in particular, may be extremely power inefficient, as the UE needs to be in continuous reception in order to receive discovery announcements from any of the peer UEs in proximity. Although similar in principle to IDLE mode operation on the Uu interface, the problem may be complicated by the fact that the UE may need to discover multiple peer UEs (not just one serving cell as in cell selection) and these peer UEs are not coordinated. The details of DRX operation by the UE when the UE only activity on sidelink is discovery of sidelink peer UEs, should be addressed.

Issue 3: SL DRX During Sidelink Communications

The details of DRX operation by the UE when the UE is communicating with sidelink peer UEs, should be addressed. Once a UE has started a sidelink communication with a peer, power savings may depend on the SL communication state (as discussed in Issue 1). In addition, a number of sub-issues may be addressed for SL DRX. For example, a first sub-issue may be what is the format of the SL-DRX ON and OFF period?

With regard to a second sub-issue, for the Uu interface, DRX operation effects the DL communication between gNB and the UE. As the gNB configures the UE with the relevant DRX parameters to use for the DRX operation, the gNB knows when the UE is in Active mode and is capable of receiving DL transmissions. For the SL a UE may have multiple SL interfaces to one or more peer UEs. These peer UEs need to know the DRX configuration so that they can send SL traffic when the UE is monitoring the Sidelink Control Information (SCI) for the respective sidelink. How the peer UEs know or determine this configuration should be defined. Who initiates or configures the SL-DRX?

A third sub-issue, may be how does an entity for, e.g. a UE subject to DRX operation, determine the parameters of the SL-DRX configuration? A fourth sub-issue may be what actions extend the SL DRX ON time? A fifth sub-issue may be what are the UE actions during the OFF periods?

With regard to a sixth sub-issue, a UE may have multiple concurrent sidelink connections, and each may have its own SL DRX configuration, for example based on QoS requirements of different services. If these are determined completely independently, this would lead to inefficient power savings for the UE. For example, a sidelink may be in OFF state while a second sidelink may be in ON state. This UE would be required to stay in ON state to permit communication on the $2^{nd}$ sidelink. In such cases, should the SL DRX configurations be combined into a common SL DRX? If so, how is this common SL DRX determined?

Figure 3:
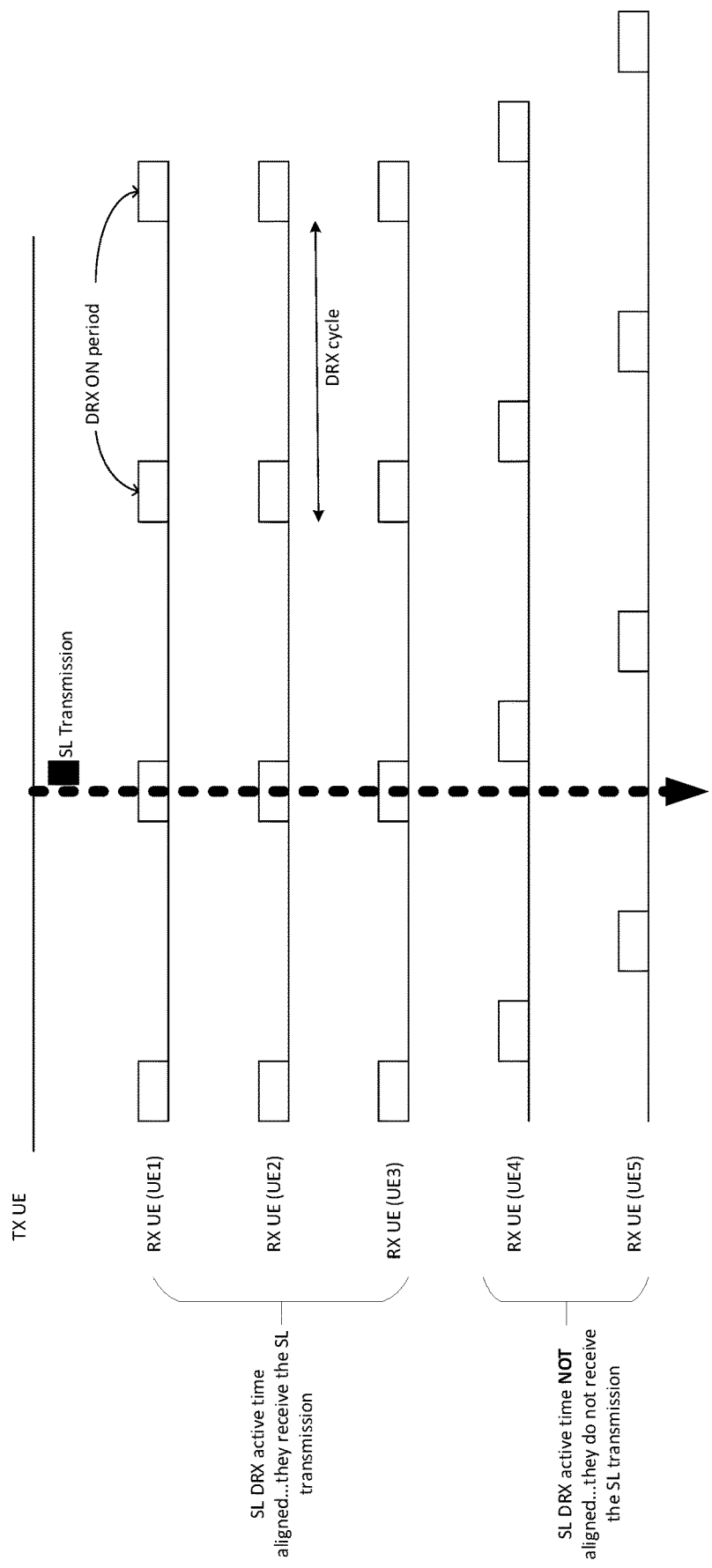
FIG. 3 illustrates an exemplary SL DRX Alignment.

With regard to a SL DRX during Sidelink Communications, special consideration may need to be given for groupcast and broadcast SL communications, where a TX UE is transmitting a single PDU to multiple RX UEs. For such cases, the following sub-issues may need to be addressed. A first sub-issue related to if the RX UEs have a SL DRX configuration, the active times of these RX UEs need to be aligned (See FIG. 3), otherwise not all RX UEs will receive the TX UE transmission. Only the RX UEs with aligned active times will receive the TX UE transmission.

A second sub-issue may occur for very large groups (i.e., the size of UE group is very large), or for deployments with many UEs that are using broadcast SL communication. In such cases, the number of UEs trying to transmit over the aligned active times may lead to collision (for mode 2 resource allocation, where more than one of these UEs selects the same resource for SL transmission) or congestion (for mode 1 resource allocation, where there are too few opportunities for the network to schedule the SL transmission). In such cases, power efficiency is gained at the expense of SL throughput. Mechanisms are needed to trade-off power efficiency and SL throughput.

With regard to a third sub-issue, SL DRX configuration for groupcast and/or broadcast transmission may be dynamically enabled and/or disabled. Mechanisms are needed to support enabling or disabling the SL DRX and notifying the UEs.

Issue 4: SL Communication Impact on Uu DRX

In cases where the UE has an active connection over the Uu interface with its serving cell, in addition to active sidelink communication, the UE may engage in DRX operation on Uu. The impacts of sidelink communication on Uu DRX including the determination of UE active time on Uu interface may be specified.

Issue 5: Uu DRX Impact on SL Communications

In cases where the UE has an active connection over the Uu interface with its serving cell, in addition to active sidelink communication, the UE may engage in DRX operation on Uu. The interaction of the Uu DRX on the sidelink communications has not conventionally been considered and may lead to some optimizations, especially for a UE operating in SL Mode 1.

Issue 6: Uu DRX-SL DRX Interaction

The interaction of the Uu DRX and the Sidelink DRX operation may lead to certain inefficiencies with respect to power savings.

Issue 7: How to Determine that a RX UE has Extended its Active Time

A RX UE may have multiple SL communications with peer TX UEs. When one of these TX UEs extends the active time for a RX UE, the other peer TX UEs are not aware and cannot take advantage that the RX UE is monitoring the SCI/PSCCH (See FIG. 4).

In summary, herein, discontinuous reception mechanisms for sidelink connections are disclosed. The SL DRX mechanism may be used for power savings to address a number of sidelink non-vehicular use cases. Disclosed herein are the following:

1) A sidelink state model to describe the UE behavior for sidelink DRX operation. The DRX operation tailored to each of the sidelink states.
2) Power savings opportunities during SL operation, in addition to stopping SCI/PSCCH monitoring.
3) Various DRX models applicable to the sidelink. These models describing how SL DRX operates (per destination, per service type, per cast type, etc).
4) SL DRX operation for the Sl_UnLinked state 212. Including how to enable or disable the SL DRX, how to configure the SL-DRX, or the operation of SL DRX in Sl_UnLinked state 212.
5) SL DRX operation for the SL_Linked state. Including how to enable or disable the SL DRX, how to configure the SL DRX, or the operation of SL DRX in SL_Linked state.

In further detail the following is a summary of example of concepts disclosed herein. In a first example, a UE may execute operations that may include monitoring discovery messages; receiving one or more SL DRX Configurations for SL_UnLinked state based on some common knowledge of the communication resources in time, frequency and space; selecting the DRX configuration based on one or more selection parameters; setting the monitoring for the discovery message based on the selected DRX configuration; and stopping the monitoring based on triggering conditions.

The SL DRX Configuration for SL_UnLinked may include Discovery Period, Discovery Window Size, or Discovery Window start time, among other things. The common knowledge of the communication resources in time, frequency, or space may also be known to the serving cell and the UE issuing the discovery announcement message, among other things. The selection parameters may include service type, device class, resource pool, or sidelink bandwidth part, among other things. The triggering conditions may include location, signal from user, sidelink activity, UE battery status, status of Uu interface, or signal from serving cell, among other things.

In a second example, a UE may execute operations that may include announcing discovery messages; receiving a discovery response window configuration; monitoring for discovery announcements during the configured discovery window; and increasing the size of the window after each discovery announcement, up until the maximum window size is reached.

In a third example, a UE may execute operations that may include communicating using SL communication with one or more other peer UEs; enabling or disabling SL DRX based on trigger conditions; configuring SL DRX parameters; determining the SL communications that are impacted by the SL DRX configuration; informing the peer UEs impacted by the SL DRX configuration; performing SL DRX operation according to the SL DRX configuration; and monitoring status of SL activity to determine if SL DRX configuration needs to be modified. Trigger conditions may be based on SL state, SL service, configuration from the network, SL carrier frequency/SL BWP/SL resource pool, number of active SL connections, QoS requirements of the SL communication, or UE battery status, among other things. SL DRX Configuration may include drx-InactivityTimerSL, drx-onDurationTimerSL, drx-RetransmissionTimerSL, drx-longCycleStartOffsetSL, drx-shortCycleSL, drxShortCycleTimerSL, or drxPrioritySL, among other things. UE may ask serving cell for assistance in determining the SL DRX configuration. Peer UEs may inform their serving cell about the DRX configuration, so that the serving cell may make appropriate scheduling decisions.

In a fourth example, a UE that has a Uu interface to its serving cell and the UE may execute operations that may include communicating with SL communication with one or more other peer UEs; receiving a Uu DRX configuration from its serving cell; restarting the drx_InactivityTimer upon reception of a SL grant (SCI for sidelink transmission); and extending the active time based on Uu activities related to SL communication. The Uu activities related to SL communication may include: transmission of a sidelink Scheduling Request, transmission of a sidelink buffer status report, or transmission of a sidelink HARQ, among other things.

Note that hereinafter, the following terms may be used as disclosed below. The terms groupcast and multicast may be used interchangeably. The terms Active Mode and DRX ON time may be used interchangeably. These refer to the periods when the UE is actively monitoring the SCI/PSCCH for sidelink transmissions. The term Sidelink DRX group may be used to refer to a single Sidelink DRX configuration that controls the Sidelink DRX operation. The Sidelink DRX group controls the Sidelink DRX for a number of Sidelink Communications that share the same Sidelink DRX configuration. Sidelink DRX groups may be linked (e.g., dependent) on each other. Therefore, the Sidelink DRX configuration for the linked Sidelink DRX groups may share some common parameter(s) or operation(s). For example, the linked Sidelink DRX groups may start the DRX On periods at the same subframe or slot. Alternatively, Sidelink DRX groups may be independent to one another, each with their own Sidelink DRX configurations. Sidelink DRX operation on these independent SL DRX groups do not impact each other. The term Sidelink DRX Configuration may be used to refer to the parameters associated with a Sidelink DRX group that controls the Sidelink DRX operation. Such parameters may include the On duration timer, inactivity timer, retransmission timers, HARQ RTT timers, short and long cycles, etc. The term Sidelink DRX model may refer to how the Sidelink DRX configuration is applied. The configuration may apply to a specific destination, specific source, resource pool, service, source-destination pair, unicast link, etc. This is referred to the SL DRX model. The term Sidelink DRX Operation may refer to the UE actions when the Sidelink DRX is configured and enabled. This may include: when the UE starts the ON duration, what the UE does during the Sidelink DRX active times, the triggers to start and stop the timers, etc. The term 'SL connection' may refer to any transfer of data between a UE and a peer UE. A SL connection may be unicast connection, where the SL communication is between a UE and a peer UE. A SL connection may be groupcast connection, where the SL communication is between a UE and a group of UEs. A SL connection may be broadcast connection, where the SL communication is between a UE and all other UEs. In the case of unicast, the SL connection or SL communication between the two peer UEs also has a PC5-RRC signaling connection, and is part of a PC5 unicast link. It is also possible that SL connection could have mix of different cast types. The terms 'RRC Connected mode', 'RRC Connected state', 'Connected Mode', 'Connected state' may be used interchangeably. The terms 'RRC Idle mode', 'RRC Idle state', 'Idle mode', 'Idle state' may be used interchangeably. The terms 'RRC Inactive mode', 'RRC Inactive state', 'Inactive mode', or 'Inactive state' may be used interchangeably.

Herein, it is assumed that a UE may have a Uu connection to its serving cell, and any number of sidelink communications. These sidelink communications may be unicast in nature (to one other peer UE), groupcast (to a group or set of peer UEs), or broadcast in nature. In addition, the UE may have multiple simultaneous such sidelink communications.

Each of the applications or services using these sidelink communications may further be characterized by the predominant direction of the traffic between the peer UEs. If the application or service using the a sidelink communication is generating traffic mostly for a peer UE, it is characterized as "unidirectional Tx". If the application or service using the sidelink communication is mostly receiving traffic from a peer UE, it is characterized as "unidirectional Rx". If the application or service using the sidelink communication is both transmitting and receiving traffic from a peer UE, it may be characterized as "bidirectional".

Figure 5:
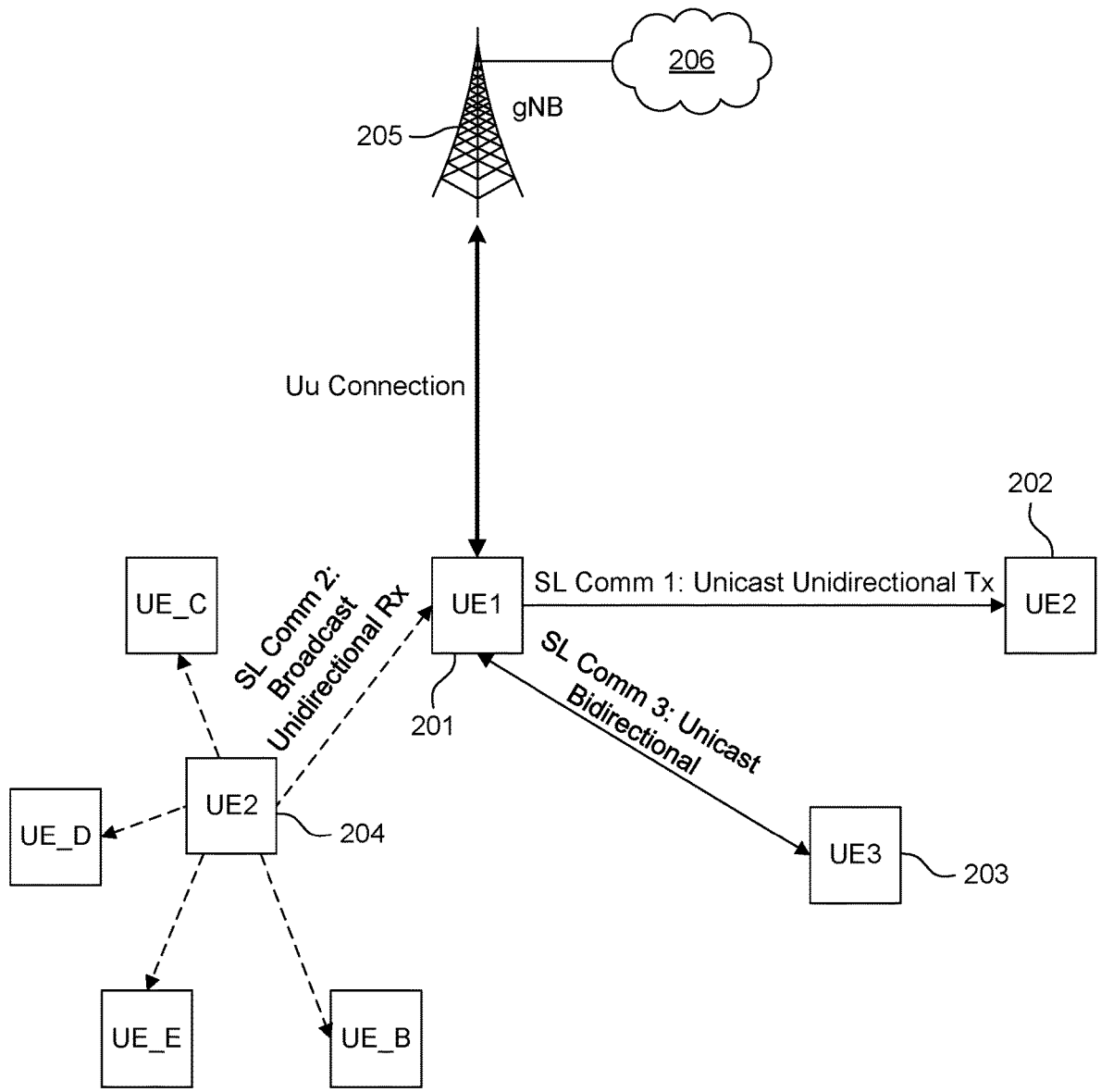
FIG. 5 illustrates an exemplary UE1 with Uu and multiple Sidelink Connections.

FIG. 5 shows a UE (UE 201) with a Uu connection and with multiple sidelink communications. In this example, sidelink communication 1 is with UE 202 and is characterized as unicast or unidirectional Tx. Sidelink communication 2 is characterized as broadcast, unidirectional Rx from UE 204. Sidelink communication 3 is with UE 203 and is characterized as unicast, bidirectional.

Furthermore, in the following it may be assumed that the UEs in the sidelink have a common synchronization source (timing reference). Although some embodiments may apply also to the case where the UEs do not share a common timing reference.

Approaches to Issue 1: SL DRX Modelling
Sidelink Communication States

New UE states on Sidelink may be defined. These states may be defined for example at the RRC level (similar to RRC_IDLE/RRC_INACTIVE/RRC_CONNECTED for the Uu interface), at the PC5-S level. Herein, we will refer to any such state as sidelink state or UE sidelink state. For example, SL OFF state, and SL ON state may be defined wherein SL OFF denotes a state where the sidelink is switched off, while SL ON may include SL DISCOVERY state and SL COMMUNICATION state. SL COMMUNICATION state may further include sidelink linked state "SL_Linked" and sidelink unlinked state "SL-UnLinked". In SL COMMUNICATION state, UE sidelink communication may include SL unicast, SL groupcast or sidelink broadcast.

Hereinafter, the terms SL-Inactive 211, SL-UnLinked 212, and SL-Linked 213 may be used to denote the potential states of the SL communication. A UE authorized to use sidelink transmission may transition to or from these states as described below and shown in FIG. 6. These states are defined to help to describe the sidelink UE behavior related to sidelink DRX operation. However, it should be understood that these sidelink behaviors may occur outside of any formal state definition.

SL_Inactive 211 or SL OFF is described as follows: Sidelink is deactivated and UE 201 does not have any activity, including discovery or communication. No higher/upper layer has requested to start a sidelink communication transfer to another UE or has requested to allow incoming sidelink communication transfer from another UE or has requested to start sidelink discovery of other UEs or has requested to start listening for sidelink discovery messages from other UEs. UE 201 may be in coverage (IC) of a serving cell and be in RRC_IDLE, RRC_INACTIVE, or RRC_CONNECTED mode with respect to the Uu interface. Alternatively, UE 201 may be in out-of-coverage (OOC) of a serving cell. Depending on the application, UE 201 may transit to one or more of the following states:

In an example, higher/upper layer may request to start a discovery process transitioning UE 201 to state SL_UnLinked 212.

In an example, higher/upper layer may request to start broadcast sidelink communication (e.g., transmit a broadcast message or begin monitoring for broadcast message) and UE 201 transitions to state SL_Linked 213. This may apply when UE 201 knows a priori the destination Layer 2 ID for the intended communication, and UE 201 may transition directly to SL_Linked state 213—bypassing the discovery phase.

In an example, higher/upper layer may request to start groupcast sidelink communication (e.g., transmit a groupcast message or begin monitoring for groupcast message) and UE 201 transitions to state SL_Linked 213. This may apply when UE 201 knows a priori the destination Layer 2 IDs for the intended group members, and UE 201 may transition directly to SL_Linked state 213—bypassing the discovery phase.

In an example, higher/upper layer may request to start unicast sidelink communication (e.g., transmit a unicast message or begin monitoring for unicast message) and UE 201 transitions to state SL_Linked 213. This may apply when UE 201 knows a priori the destination Layer 2 ID for the intended communication, and UE 201 may transition directly to SL_Linked state 213—bypassing the discovery phase.

SL_UnLinked 212 is described as follows: UE may transmit or receive only discovery related messages, and no other sidelink communication with peer UEs. In this state, UE 201 may announce or monitor for discovery messages. Discovery messages may be transparent to the Access Stratum. In LTE ProSE, discovery announcement messages are created by the ProSe Protocol layer. In NR V2X, discovery messages may correspond to DIRECT COMMUNICATION request PC5-S messages. State in which higher/upper layer has requested to start discovery announcements or discovery monitoring. UE 201 has no ongoing sidelink communications to any other UE. For discovery, UE 201 may behave as an announcing UE (e.g., sending out discovery like messages) or a monitoring UE (e.g., listening for discovery like messages), or both as an announcing UE and a monitoring UE. The specific procedure used for discovery may depend on the underlying sidelink technology. For example, UE 201 may use ProSe Direct Discovery (e.g., TS 23.303, Proximity-based services (ProSe); Stage 2, V 15.1.0-[3]) or a NR V2X broadcast discovery mechanism (e.g., TS 23.287, Architecture enhancements for 5G System (5GS) to support Vehicle-to-Everything (V2X) services, V16.0.0-[4]). In this state, the UE may rely on procedures to stop continuous reception to reduce power consumption. UE 201 may be in coverage (IC) of a serving cell and be in RRC_IDLE, RRC_INACTIVE, or RRC_CONNECTED mode with respect to the Uu interface. Alternatively, UE 201 may be in out-of-coverage (OOC) of a serving cell. During this state, UE 201 may use sidelink DRX. From this state, the following example triggers and transitions may occur:

In an example, higher/upper layer may request to start broadcast sidelink communication (e.g., transmit a broadcast message or begin monitoring for broadcast message) and UE 201 transitions to state SL_Linked 213. For example, this may occur when the higher/upper layer has been told that UE 201 has discovered a peer UE sending broadcast messages that are of interest.

In an example, higher/upper layer may request to start groupcast sidelink communication (e.g., transmit a groupcast message or begin monitoring for groupcast message) and UE 201 transitions to state SL_Linked 213. For example, this may occur when the higher/upper layer has been told that UE 201 has discovered the members of the group.

In an example, higher/upper layer may request to start unicast sidelink communication (e.g., transmit a unicast message or begin monitoring for unicast message) and UE 201 transitions to state SL_Linked 213. For example, this may occur when the higher/upper layer has been notified that UE 201 has discovered the peer UE.

SL_Linked 213 is described as follows: UE 201 has ongoing sidelink communication between UE 201 and another peer UE. Communication may be broadcast, groupcast, or unicast. In this state, in addition to the sidelink communication, UE 201 may also be performing discovery related procedures. A state during which UE 201 has at least one sidelink communication (broadcast, groupcast, or unicast), and may simultaneously be engaged in discovery (e.g., behaving as an announcing UE, a monitoring UE, or both an announcing UE and a monitoring UE). During this state, UE 201 may use sidelink DRX. From this state, the following example triggers and transitions may occur:

In an example, UE 201 may terminate all its sidelink communications, and UE transitions to state SL_UnLinked 212 for possible discovery.

In an example, UE 201 may terminate all its sidelink communications and have no Higher/Upper layer requiring discovery. In such a case, the UE 201 transitions to state SL_Inactive 211.

Figure 6:
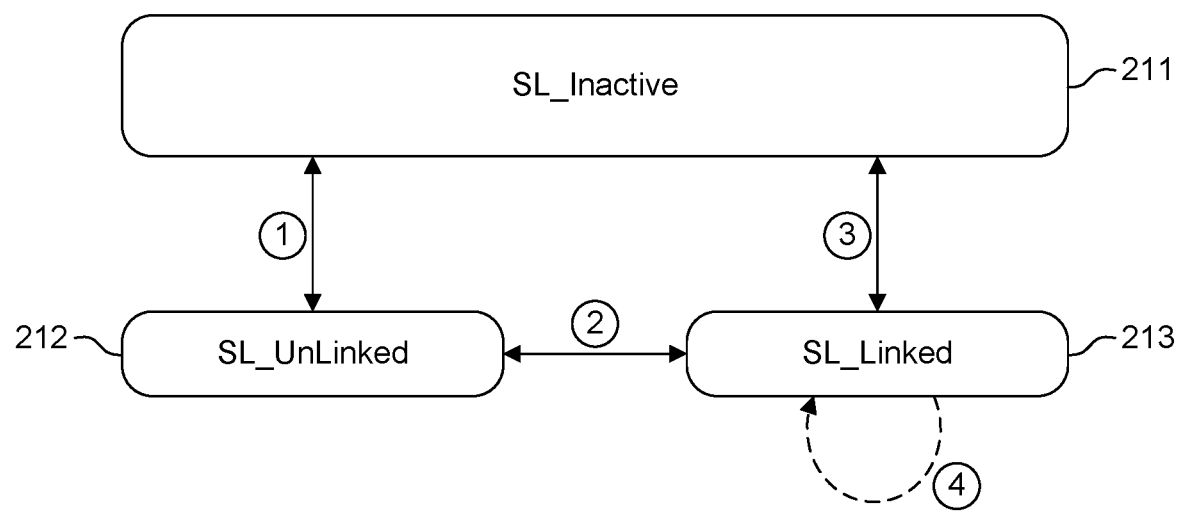
FIG. 6 illustrates an exemplary UE Sidelink States.
Figure 7:
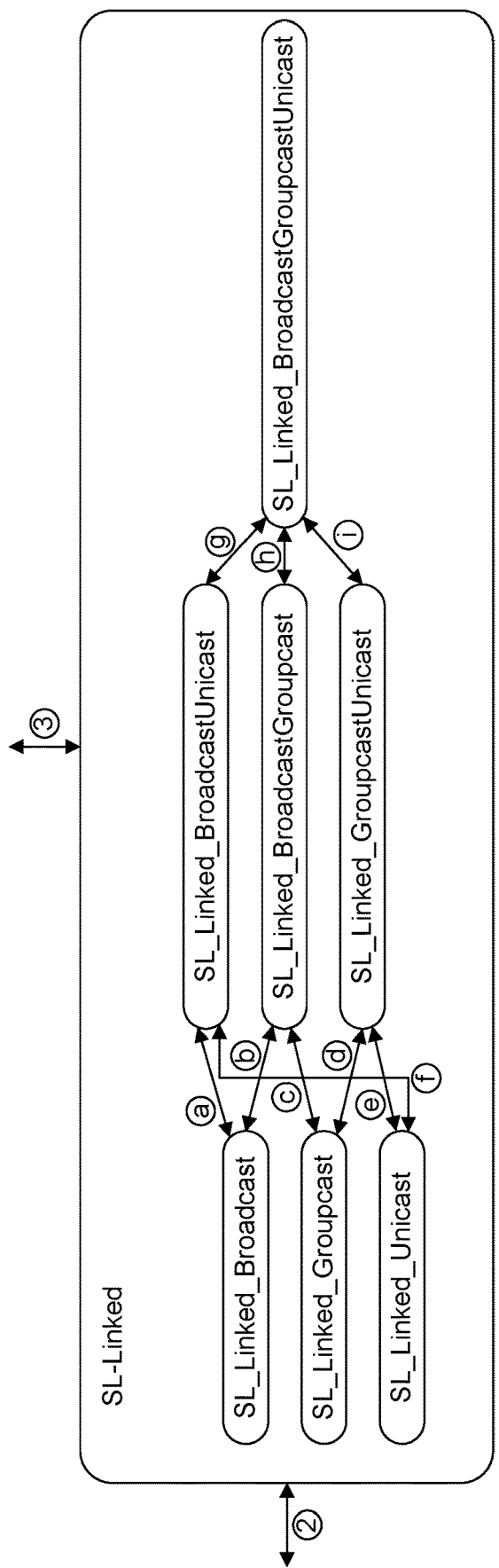
FIG. 7 illustrates an exemplary Sub-States of SL_Linked.

In addition, FIG. 6 also shows transition '4'. This transition corresponds to the case that UE 201 already has one or more sidelink communications, and starts another sidelink communication. Transition '4' may also correspond to the case that UE 201 terminates or releases one or more active sidelink communications, but still has at least one more ongoing sidelink communication. Note that although not shown, the SL_Linked state 213 may be subdivided into a number of sub-states, depending on the type of ongoing SL communication. A different SL DRX Model may be used in each of these sub-states. The SL_Linked sub-state 213 model is shown in FIG. 7, where each of the potential combinations of broadcast, groupcast, or unicast is shown. The transitions should be clear based on the sub-state names. For example, transition 'd' corresponds to a case where UE 201 has only groupcast, and then starts at least one unicast SL communication.

Discontinuous Reception for Sidelink

For the Uu interface, power savings for UE 201 in connected mode is achieved by UE 201 not monitoring PDCCH transmissions during DRX OFF periods. UE 201 and the base station are both aware the DRX cycle that will be followed by UE 201, and the base station will not schedule any downlink transmissions on the PDSCH to UE 201 during the cycle OFF times. As a result, UE 201 may shut off its PDCCH reception during these OFF periods and move its radio processing into a sleep mode (turning off most of unnecessary processes). Similarly, for the Uu interface, power savings for UE 201 in IDLE/INACTIVE mode is achieved by UE 201 not monitoring for paging messages outside of its paging occasions. As a result, UE 201 may shut off its PDCCH reception outside of these occasions (effectively stop listening for paging message encrypted by P-RNTI on the PDCCH) and move its radio processing into a sleep mode (turning off most of unnecessary processes).

The notion of power savings and DRX in sidelink communications may not be easily identified. UE 201 may have one or more active sidelink communication. Each of these communications may be to a different peer UE. The sidelink transmissions are over the same or different resource configurations. The SL resource configuration can include a specific carrier, or a specific sidelink bandwidth part (BWP) per carrier, or a specific resource pool. A resource pool is a set of time-frequency resources that can be used for sidelink transmission or reception. Multiple resource pools can be (pre-)configured to a UE in a carrier. Time domain resources in a resource pool can be non-contiguous. For such cases, sidelink transmissions may only be possible in those slots that are part of the resource pools. During these slots, UE 201 is required to monitor the SCI/PSCCH to determine if there is any sidelink traffic addressed to it. Such traffic may be unicast, groupcast, or broadcast. These resource pools may be on different carriers.

Figure 8:
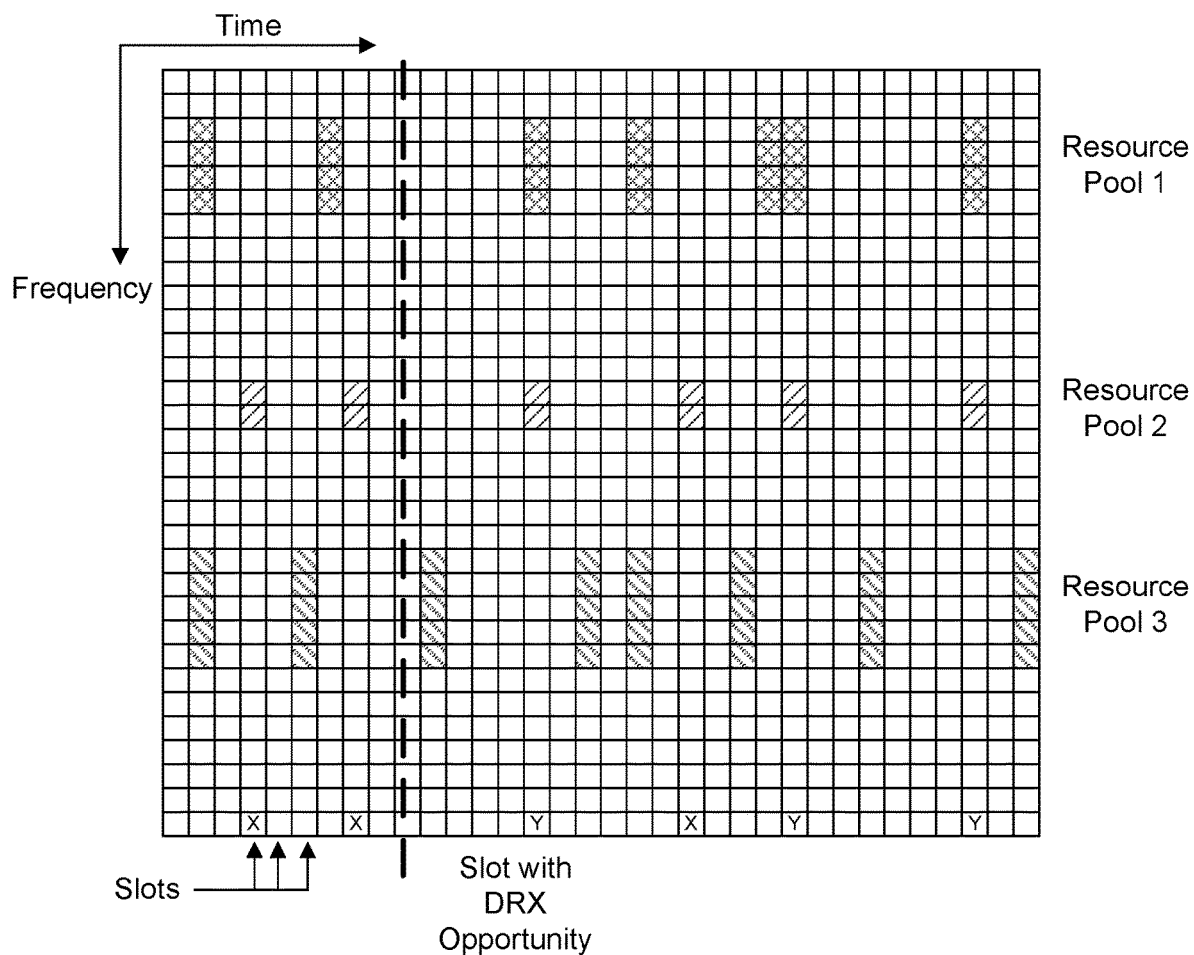
FIG. 8 illustrates an exemplary Example Resource Configuration for a UE.

The receiving UE may not receive any sidelink communication on slots that are not part of its SL resource configuration. UE 201 may already employ DRX during those slots. An example is shown in FIG. 8 for UE 201 that has a SL resource configurations on one carrier and sidelink bandwidth part, and over 3 resource pools. The empty slot shown with the dashed line is an opportunity for UE 201 to go into DRX.

If UE 201 resource configuration is such that UE 201 must monitor many resource pools, potentially over multiple sidelink BWPs, and potentially over multiple carriers, this UE 201 may have few empty slot opportunities to go into DRX. In addition, even if UE 201 did have such empty slots, UE 201 may still benefit from further power savings opportunities on the sidelink. Potential power savings opportunities may result from one or more of the following approaches of stopping sidelink reception: 1) on one or more carriers; 2) one or more SL bandwidth parts; 3) one or more resource pools; or a 4) certain direction. With regard to stopping sidelink reception on one or more carriers, in cases where a UE is configured with resource pools on multiple carriers, UE 201 may stop reception on one or more of these carriers. With regard to stopping sidelink reception on one or more sidelink bandwidth parts, in cases where UE 201 is configured with resource pools on multiple sidelink bandwidth parts, UE 201 may stop reception on one or more of these sidelink bandwidth parts. With regard to stopping sidelink reception in a certain direction, in cases where the peer UEs are using beamformed transmissions, UE 201 may stop reception on one or more of these beams.

With regard to stopping sidelink reception on one or more resource pools, in cases where UE 201 is configured with multiple resource pools, UE 201 may stop reception on one or more of these resource pools. Power savings may come from one of two mechanisms. First, some additional slots may become available for DRX. For example, using the case from FIG. 8, if UE 201 stops reception on Resource Pool 2 then the slots marked with 'X' are also opportunities for DRX. Second, even for those slots where multiple resource pools overlap, a power savings is expected if UE 201 is not required to monitor the SCI/PSCCH in each of these resource pools. For example, using again the case from FIG. 8, if UE 201 stops reception on Resource Pool 2 then for the slots marked with 'Y', UE 201 may be only required to monitor the SCI/PSCCH for Resource Pool 1.

SL DRX Model

SL DRX operation may differ based on the underlying DRX model. For the Uu interface the model is based on a "serving cell-UE" link. Even for the dual-connectivity cases, DRX operation is per serving cell, as it is difficult to use the same DRX across serving cells (as is done for carrier aggregation) due to the backhaul latency between the gNB/eNB 205 and core network 206.

On the sidelink, UE 201 may have one or more simultaneous sidelink communications, along with the Uu communication to the serving cell. The SL DRX model may be based on one or more of the following principles: 1) per destination UE; 2) per source UE; 3) per sidelink carrier frequency; 4) per sidelink bandwidth part; 5) per resource pool; 6) per source-destination pair; 7) per Sidelink Service or service type; or 8) per cast type.

Per destination UE: A single SL DRX operation applies to the entire UE 201, and for sidelink communications for UE 201. UE 201 knows that it will not receive any sidelink traffic during the DRX OFF periods, and UE 201 may stop monitoring the SCI/PSCCH in all slots of the OFF period.

Per source UE: A single SL DRX operation applies for all SL communications from a UE. A peer UE that knows the SL DRX configuration may stop monitoring SL communications from this UE in all slots of the OFF period.

Per sidelink carrier frequency: A SL DRX operation applies to a specific carrier frequency. Communication on this carrier frequency will follow the SL DRX operation associated to that carrier frequency. UE 201 may have multiple simultaneous SL DRX operations, one for each sidelink carrier frequency. UE 201 knows that it will not receive any sidelink traffic on this carrier frequency during the DRX OFF periods, and it may stop monitoring the SCI/PSCCH in all slots on this carrier frequency.

Per sidelink bandwidth part: A SL DRX operation applies to a specific sidelink bandwidth part. Communication on this sidelink bandwidth part will follow the SL DRX operation associated to that sidelink bandwidth part. UE 201 may have multiple simultaneous SL DRX operations, one for each sidelink bandwidth part. UE 201 knows that it will not receive any sidelink traffic on this sidelink bandwidth part during the DRX OFF periods, and it may stop monitoring the SCI/PSCCH in all slots on this sidelink bandwidth part.

Per resource pool: A SL DRX operation applies to a specific reception resource pool. Communication on this resource pool will follow the SL DRX operation associated to that resource pool. UE 201 may have multiple simultaneous SL DRX operations, across its reception resource pools. UE 201 knows that it will not receive any sidelink traffic on this resource pool during the DRX OFF periods. For those slots in the resource pool that are not shared with other resource pools (for example those marked as 'X' in FIG. 8), the UE may stop monitoring the SCI/PSCCH. For those slots in the resource pool that are shared with other resource pools (for example those marked as 'Y' in FIG. 8), UE 201 still needs to monitor the PSCCH in those other resource pools, since there may be sidelink traffic scheduled on these other resource pools. However, it may only need to monitor the SCI/PSCCH for the resource pools that are not in DRX.

Figure 9:
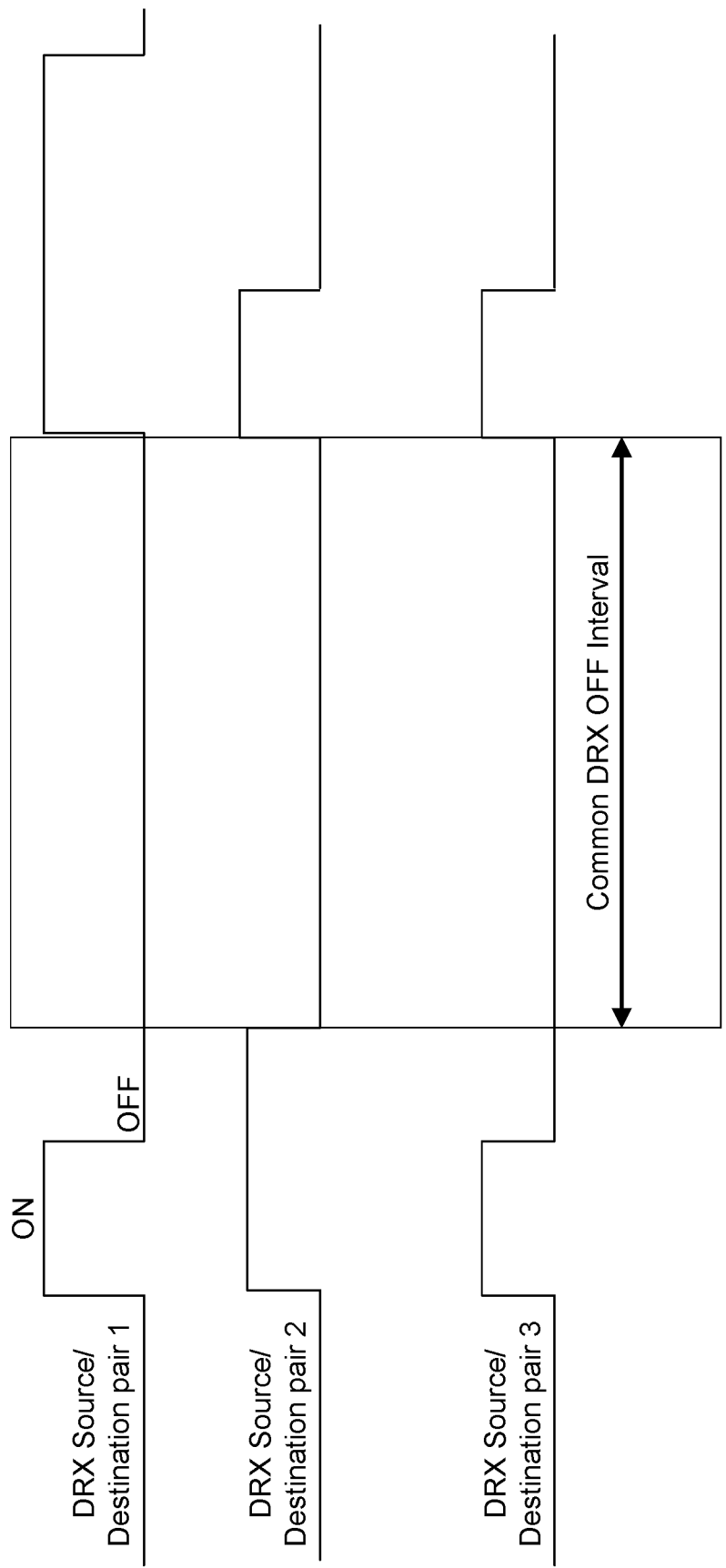
FIG. 9 illustrates an exemplary Power Savings for source/destination pair DRX.

Per source-destination pair: A SL DRX operation applies to a specific sidelink communication. Typically, a unicast connection between a transmitting UE and receiving UE. UE 201 may have multiple simultaneous SL DRX operations, one for each sidelink communication. In such a case, UE 201 may find the common intervals where the DRX cycle is 'OFF' for all source-destination pairs. During these common DRX OFF intervals, UE 201 may stop monitoring the SCI/PSCCH (See FIG. 9). Outside these common DRX OFF intervals UE 201 may have to monitor the SCI/PSCCH, however it may rely on other mechanisms for power savings. For example, if a sidelink communication is between two fixed UEs (or UEs with very little mobility) that use beamforming, then UE 201 may stop monitoring SCI/PSCCH in the direction of the peer UE. As another example, if a sidelink communication is limited to a specific resource pool, and UE 201 will not have any other sidelink communications on that resource pool, then UE 201 may stop reception on that resource pool. This may be the case, for example, when UE 201 may only want to communicate with a single peer UE and so it may only intend to use that single sidelink communication. Note that in this example case, the common DRX OFF intervals would correspond to the OFF cycle of the single source/destination DRX cycle. Note that the term 'source' above is used to refer to a logical node/entity that is the source of the SL transmission. The source logical entity may integrate the scheduling functionality that controls the scheduling of the SL transmissions. Alternatively, if the scheduling functionality is in a separate scheduling entity (for example a gNB, Scheduling UE, or Controlling UE), the term 'source' may refer to the separate scheduling entity that is scheduling the logical entity SL transmission. As an another alternative, the term 'source' may represent a source layer 2 ID of the logical entity. Similarly, the term 'destination' above is used to refer to a logical node/entity that is the destination of the SL transmission. The destination logical entity may integrate the scheduling functionality that controls the scheduling of the reception of the SL transmission. Alternatively, if the scheduling functionality is in a separate scheduling entity (for example a gNB, Scheduling UE, or Controlling UE), the term 'destination' may refer to the separate scheduling entity that is scheduling the reception of the SL transmission at the logical entity. As another alternative, the term 'destination' may refer to a destination layer 2 ID of the logical entity. As a result the following combination of source-destination SL DRX modeling are permitted: logical node/entity that is the scheduling the SL transmission-logical node/entity that is scheduling the reception of SL transmission; logical node/ entity that is the scheduling the SL transmission-logical node/entity that is the destination of the SL transmission; logical node/entity that is the scheduling the SL transmission-destination layer 2 ID; logical node/entity that is the source of the SL transmission-logical node/entity that is scheduling the reception of SL transmission; logical node/ entity that is the source of the SL transmission-logical node/entity that is the destination of the SL transmission; Source layer 2 ID-logical node/entity that is scheduling the reception of SL transmission; logical node/entity that is the source of the SL transmission-destination layer 2 ID; source layer 2 ID-logical node/entity that is the destination of the SL transmission; or source layer 2 ID-destination layer 2 ID. The term source, transmitter, and scheduler for source SL transmissions, may be used interchangeably. Similarly the terms destination, receiver, and scheduler for the reception of the SL transmission at a destination, may be used interchangeably.

Per Sidelink Service or Service type: A SL DRX operation applies to a specific sidelink service. All communication of this service or service type will follow the SL DRX operation associated to that service or service type. UE 201 may have multiple simultaneous SL DRX operations, one for each service or service type. In such a case, UE 201 may find the common DRX OFF intervals for all service or service types. During these common DRX OFF intervals, UE 201 may stop monitoring the SCI/PSCCH. Outside these common DRX OFF intervals UE 201 may have to monitor the SCI/PSCCH, however it may rely on other mechanisms for power savings. For example, if resource pools are configured to only carry sidelink traffic of a given service or service type and SL DRX operation is associated to that service type, then UE 201 may stop reception on that resource pool. A sidelink service or service type may be V2X service identifier, such as a PSID or ITS-AID. Alternatively, it may be a descriptive name of a service. Alternatively, the service may be identified by the destination layer 2 ID of the service. The mapping of service to destination layer 2 ID is provided in the (pre)provisioning of the UE.

Per cast type: A SL DRX operation applies to a specific cast type (e.g., unicast, groupcast, or broadcast). Communication of a certain cast type will follow the SL DRX operation associated to that cast type (e.g., unicast, groupcast, or broadcast). UE 201 may have multiple simultaneous SL DRX operations, one for each cast type. In such a case, UE 201 may find the common DRX OFF intervals, where the DRX cycle is 'OFF' for all cast types. During these common DRX OFF intervals, the UE may stop monitoring the SCI/PSCCH. Outside these common DRX OFF intervals UE 201 may monitor the SCI/PSCCH, however it may rely on other mechanisms for power savings. For example, if resource pools are configured to only carry sidelink traffic of a given cast type and SL DRX operation is associated to that cast type, then UE 201 may stop reception on that resource pool. For example, if a resource pool is limited to only carry unicast traffic, and UE 201 has no ongoing unicast or groupcast connection, then UE 201 may stop reception on that resource pool.

Note that in the above, the different models of SL DRX operation are described individually. It should be understood, that UE 201 may have a mixed SL DRX operation. For example, UE 201 may simultaneously have a SL DRX operation that applies to a specific cast type as well as a SL DRX operation that applies to a specific source/destination pair. In such cases, UE 201 may rely on finding the common intervals, where the DRX cycle is 'OFF'. During these common DRX OFF intervals, UE 201 may stop monitoring the SCI/PSCCH. Outside these common DRX OFF intervals UE 201 may have to monitor the SCIPSCCH, however it may rely on other mechanisms for power savings.

Figure 10:
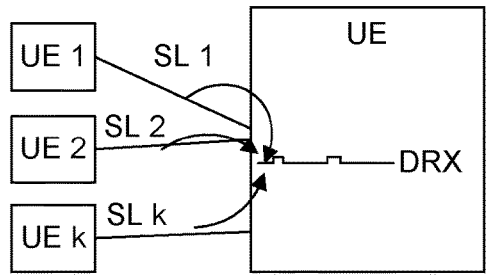
FIG. 10A illustrates an exemplary SL DRX Modelling.
FIG. 10B illustrates an exemplary SL DRX Modelling.
FIG. 10C illustrates an exemplary SL DRX Modelling.
FIG. 10D illustrates an exemplary SL DRX Modelling.
FIG. 10E illustrates an exemplary SL DRX Modelling.
Figure 10:
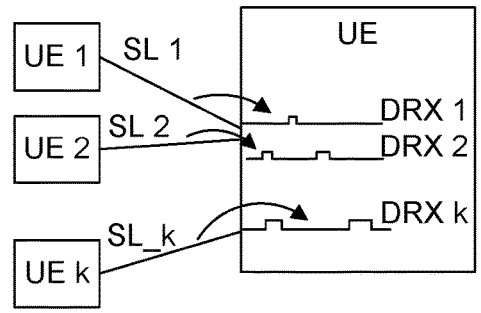
Figure 10:
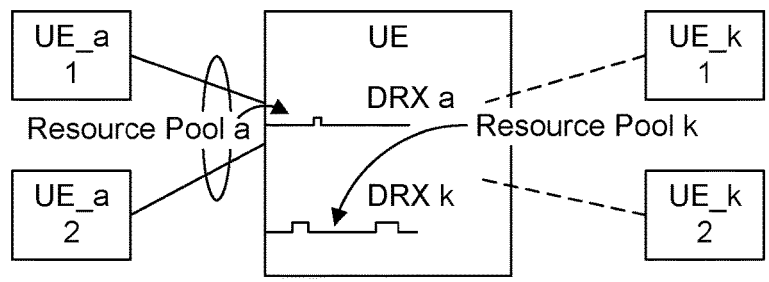
Figure 10:
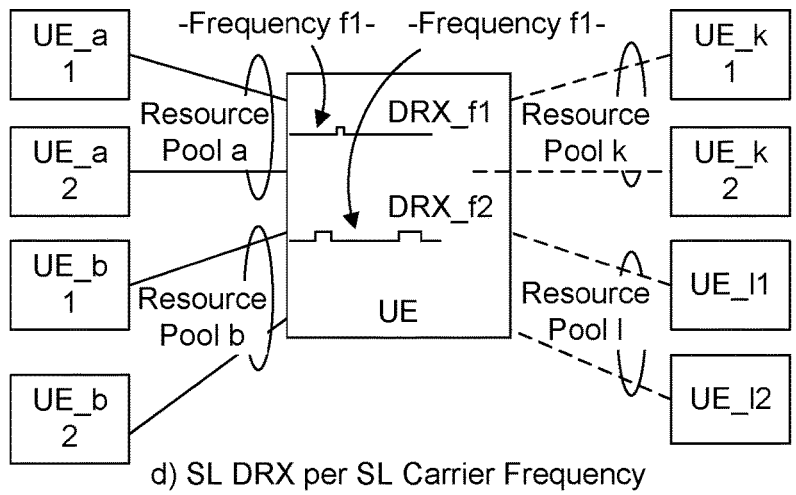
Figure 10:
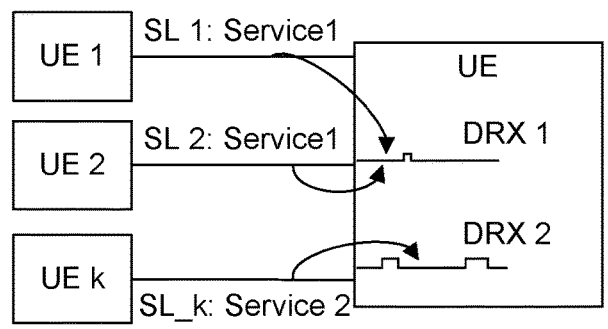

A few of the SL DRX operation models are shown in FIG. 10A-8E.

Note that the SL DRX operation for each of the SL DRX model is based on ON (or Active) and OFF times. During the ON times, UE 201 monitors the SCI/PSCCH, while during the OFF times, the UE is not required to monitor the SCI/PSCCH based on the selected SL DRX model. Details are provided herein with regard to SL DRX Operation.

Approaches to Issue 2: SL DRX During Sidelink Discovery

Sidelink Discovery may occur in the standalone state SL_UnLinked 212, as well as potentially in the SL_Linked state 213.

Announcing UE

Figure 11:
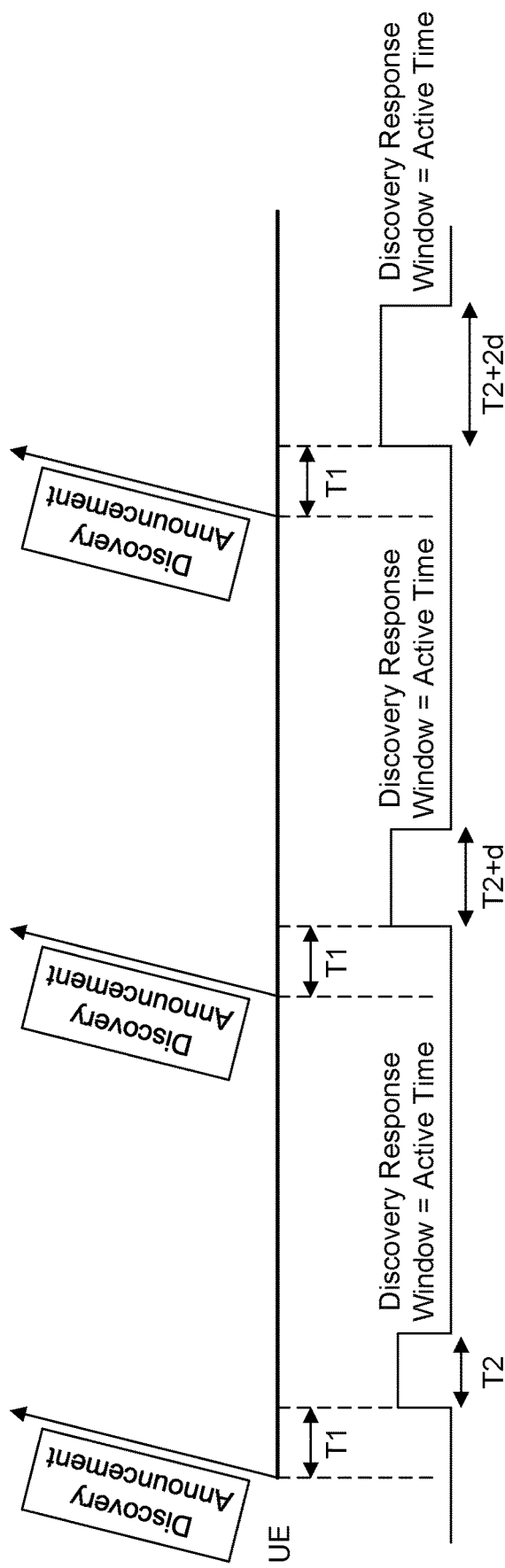
FIG. 11 illustrates an exemplary SL DRX for Announcing UEs.

If UE 201 is only making discovery announcements, UE 201 may define Discovery Response (DR) windows. UE 201 may be in DRX outside of these windows. The size of the windows may be (pre)configured through higher layers. The size of the window may also change dynamically based on the number of discovery responses received from peer UEs. For example, UE 201 may increase its discovery response window by a (pre)configured ramping step or delta value, if no discovery response is received for K consecutive discovery announcements. The size of the window may have a (pre)configured maximum size. FIG. 11 shows UE 201 with a Discovery Response Window configured with an initial size of T2 and with a discovery window ramping step or delta value (shown as 'd' in the figure). After each discovery announcement message, UE 201 increases the Discovery Window size by d. UE 201 may increase the discovery window size up until a (pre-) configured maximum discovery response window size, or for a (pre-)configured maximum number of times. The discovery window may start T1 seconds after the transmission of the discovery announcement. T1 may be (pre-)configured.

Monitoring UE

UE 201 that is monitoring for discovery announcements, is continuously receiving in order to try to find peer UEs with which to connect. This continuous reception may be a significant power drain on the UE. One of the difficulties in removing the need for continuous reception is that there may be multiple announcing UEs, which may not be synchronized. As a result, their discovery announcement messages may arrive at any time. This is in contrast to paging messages from a base station 205 (e.g. gNB or eNB) which are from a single source.

Mechanisms to try to eliminate the need for continuous reception are described in more detail, such as 1) Alternative 1: Based on underlying triggers or conditions at the UE; or 2) Alternative 2: Based on configured DRX operation.

Alternative 1: Stopping Continuous Reception Based on Triggers at UE

In this alternative, UE 201 may rely on one or more conditions (e.g., triggering conditions or trigger) to determine that it can stop continuous reception of discovery announcements. When these conditions are met, UE 201 does not monitor discovery announcements. When these conditions are not met, UE 201 may need to monitor the discovery announcements, but may rely on the second alternative (configured DRX operation) for power savings. Some five or more conditions are described below.

With regard to a first condition, UE 201 may rely on its location information to stop continuous reception. For example, UE 201 trying to establish a sidelink communication to a home set-top box, may only monitor discovery announcements when in the home. UE 201 could stop monitoring discovery announcements when outside of the home.

With regard to a second condition, UE 201 may rely on a signal from a user, through a graphical user interface. The user may manually start and stop UE 201 from monitoring discovery announcements.

With regard to a third condition, UE 201 may rely on other sidelink activity. For example, UE 201 may be (pre) configured with a maximum number of sidelink communications. Once UE 201 has established this maximum number of sidelink communications, UE 201 may stop monitoring discovery announcements. The maximum number of sidelink communications may be per cast type or a total number (that includes all cast types). As another example, UE 201 may be (pre)configured to only communicate with one or more specific peer UEs. Once UE 201 has established a sidelink communication to this one or more specific peer UEs, UE 201 may stop monitoring discovery announcements.

With regard to a fourth condition, UE 201 may rely on other factors to determine if it has to monitor discovery announcements. These factors may include battery status, or Uu interface connectivity. For example, UE 201 may stop monitoring if UE 201 determines that its battery status is below a threshold; or if UE 201 is in connected mode DRX on its Uu interface.

With regard to a fifth condition, UE 201 may rely on a signal from its serving cell or the network (over the Uu interface) that tells UE 201 that it may stop monitoring discovery announcements.

With regard to a sixth condition, UE 201 may stop continuous reception based on characteristic of the service or service type. For example. if a service cannot be used since the UE 201 would consume too much power. UE 201 may receive the information about the service or service type from (pre)provision, (pre)configuration, system information, or dedicated signalling. Different service types may have different power consumption requirements or power saving requirements. Service types may be associated with different power saving features or DRX configurations or operations.

With regard to a seventh condition, UE 201 may stop continuous reception based on a signal transmitted from its serving cell. For example, the cell may broadcast an indication if there are any active services being offered in a cell. If no service, UE 201 may stop continuous monitoring on the SL.

With regard to an eighth condition, UE 201 may stop continuous reception based on geographic information. The services may be based on geographic area. UE 201 may be (pre)provisioned or (pre)configured with the geographic area for each service. Based on its current location UE 201 would know if a service is being offered or not. This geographic information could be in terms of Zone_ID. This geographic information could be in terms of positioning such as SL positioning or the like.

Alternative 2: Stopping Continuous Reception Based on a Configured DRX Operation In this alternative, UE 201 may use a configured sidelink DRX operation. The DRX operation may be modeled after Uu RRC Idle/inactive mode DRX operation. For the Uu interface, Idle mode DRX pattern may be based on the device identity. Both UE and network may use this identity to determine the paging frames during which UE 201 may be paged. The serving cell may only page UE 201 during these frames, and UE 201 is free to go into DRX in other frames, in order to save power. This mechanism may work well as there may be only one entity issuing the paging message (the serving cell). For discovery monitoring, any number of peer UEs may issue the discovery announcement and these UEs do not know the identity of the peer they want to discover.

Figure 12:
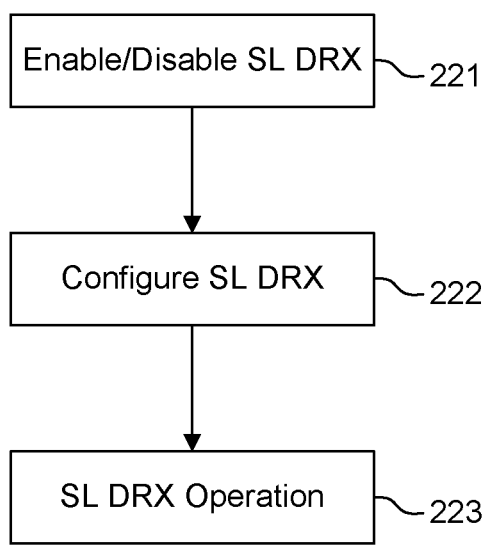
FIG. 12 illustrates an exemplary SL DRX Use in SL_UnLinked.

In order to use a configured SL DRX in the SL_UnLinked state 212, high level steps, as shown in FIG. 12, may be performed. As shown, step 221, enabling SL DRX-Which entity enables/disables SL DRX and what triggers its use. At step 222, configuring SL DRX at the transmitting UEs, Receiving UE. At step 223, SL DRX operation: how active times are interspersed with periods of DRX. Each of these steps may rely on the underlying SL DRX model, as described herein.

Enabling/Disabling SL DRX Operation & Configuring SL DRX Operation

In order to use DRX in the SL_UnLinked state 212, a common knowledge of the communication resources in time, frequency and space is needed between the transmitter UE and the receiving UE, so that they may both determine when to enable and disable the DRX operation (Step 221) as well as how to configure the SL DRX for the discovery (Step 222). Typical common knowledge that may be used, include: resource pool, sidelink bandwidth part, service or service type, or UE Device class (i.e., UE device category), among other things.

Figure 13:
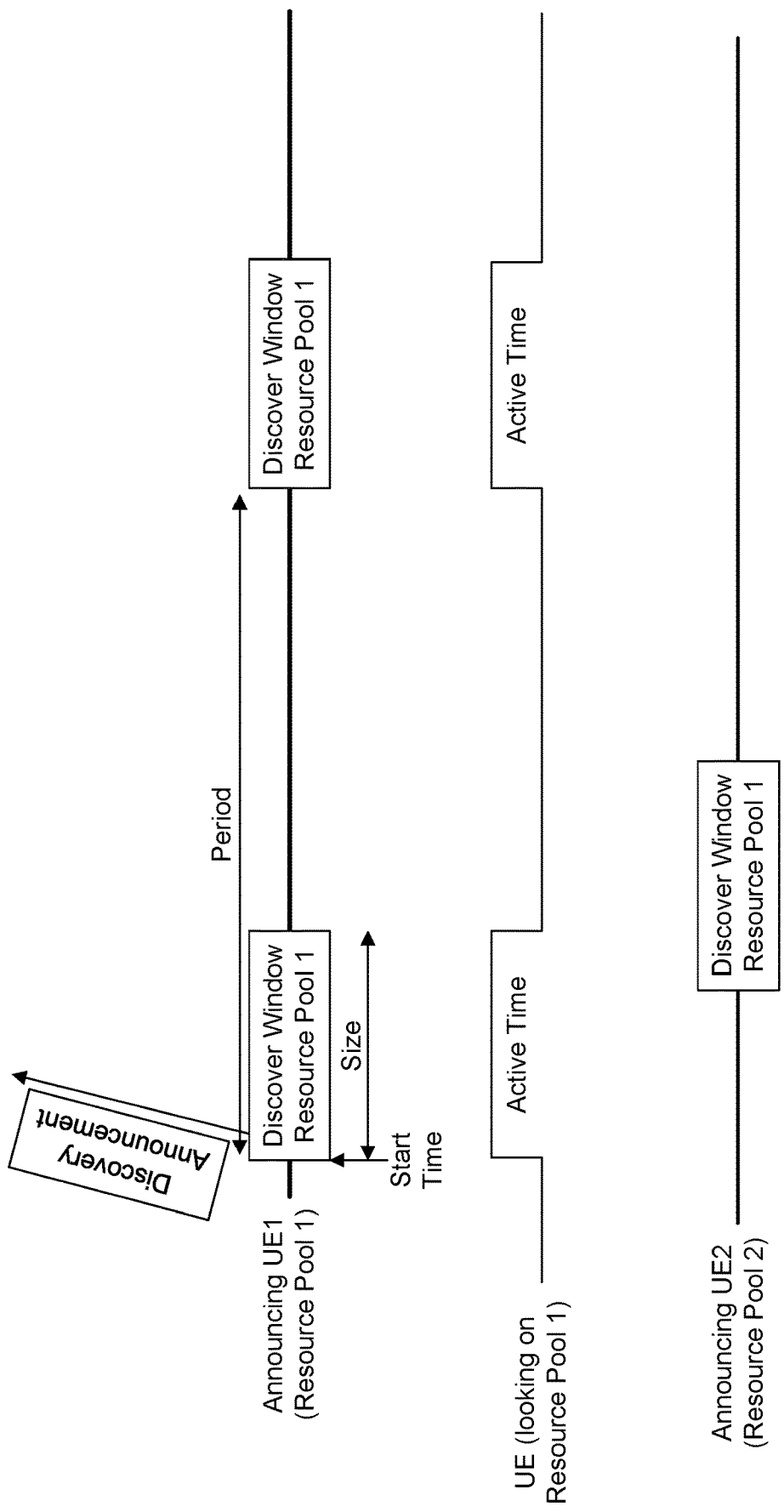
FIG. 13 illustrates an exemplary Discovery Windows per Resource Pool.

Resource pool: Each resource pool may be associated with a specific SL DRX configuration. The SL DRX configuration may be provided through dedicated signaling over the Uu interface, through system information over the Uu interface, or through pre-configuration. The SL DRX configuration may provide the details as shown in the Section for SL Configured DRX operation. It is assumed that the there is some network coordination to ensure that the same SL DRX configuration per resource pool is provided in the pre-configured resource pool information, as well as in neighbouring serving cells. Announcing UEs may ensure to only send discovery messages when monitoring UEs are in active mode (during Discovery Windows). As a result, monitoring UEs may stop reception on a resource pool that is in DRX (outside of the Discovery Windows). The SL DRX may be enabled implicitly as soon as UE 201 enters SL_UnLinked state 212. An example showing discovery announcements for 2 Resource Pools is shown in FIG. 13.

Sidelink Bandwidth Part: Each sidelink bandwidth part may be associated with a specific SL DRX configuration. The SL DRX configuration may be provided through dedicated signaling over the Uu interface, through system information over the Uu interface, or through pre-configuration. The SL DRX configuration may provide all the details as shown in Section for SL Configured DRX operation. Announcing UEs may ensure to only send discovery messages when monitoring UEs are in active mode (during Discovery Windows). As a result, monitoring UEs may stop reception on a resource pool that is in DRX (outside of the Discovery Windows). The SL DRX may be enabled implicitly as soon as UE 201 enters SL_UnLinked state 212.

Figure 14:
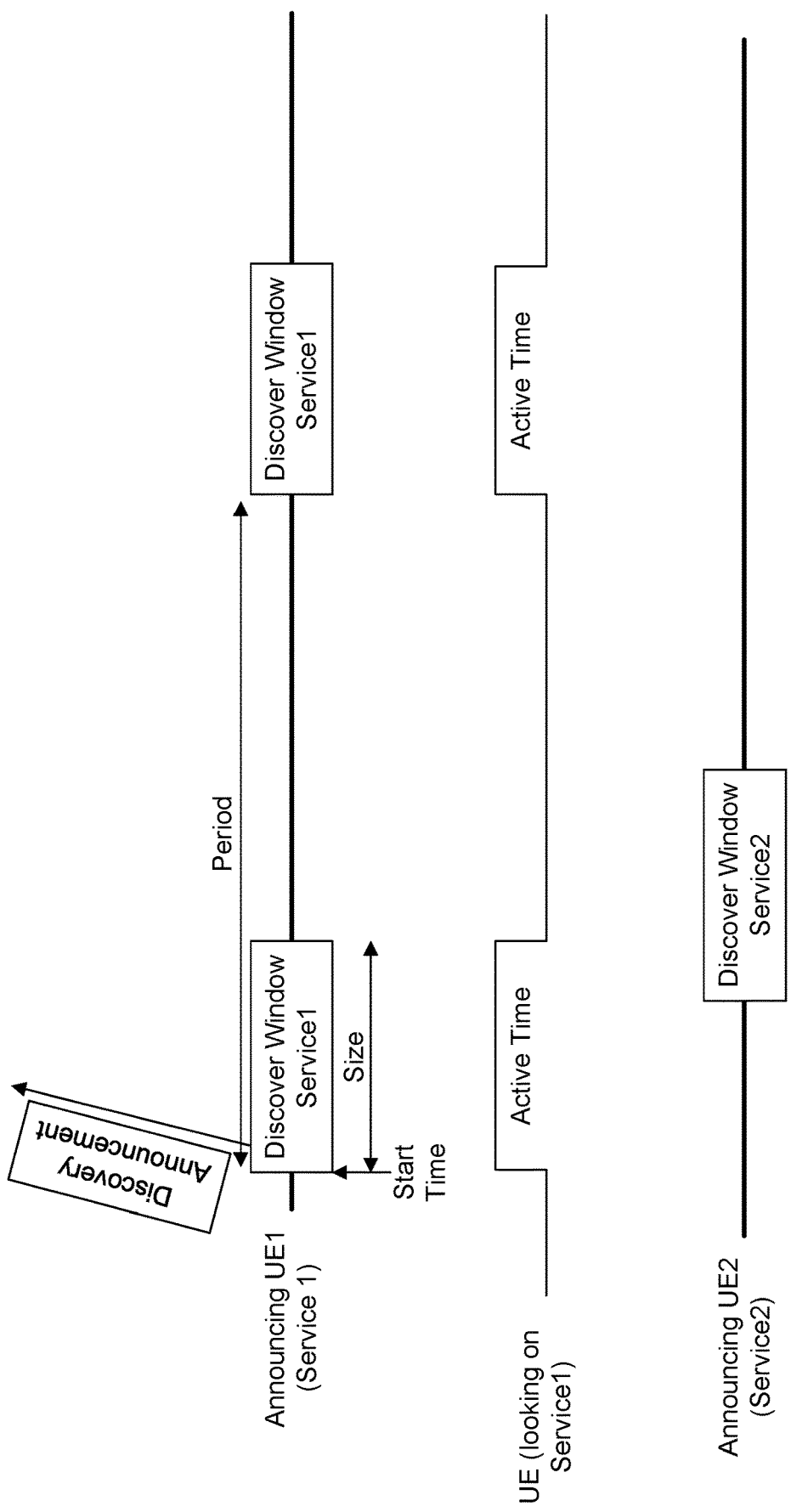
FIG. 14 illustrates an exemplary Discovery Windows per Service Type.

Service or Service Type: Each sidelink service or service type may be associated to a specific SL DRX configuration. The peer UEs know the sidelink service or service type they are looking for, and can use this to limit the times during which UE 201 is monitoring. Discovery announcements for a specific service or service type may only occur during Discovery Windows. Outside of these Discovery Windows, a UE monitoring for a service or service type tied to the Discovery Windows may use DRX, as the peer UEs will not send out discovery announcements for the service or service type. The SL DRX may be enabled implicitly as soon as UE 201 enters SL UnLinked state 212. The SL DRX configuration may provide the details as shown in Section for SL Configured DRX operation. The SL DRX configuration chosen may be based on the service or service type that the UE 201 is interested in. An example showing discovery announcements for 2 services is shown in FIG. 14. Notice that the monitoring UE may only be monitoring during the active time associated with service 1. The SL DRX configuration chosen is based on the service or service type to be discovered. The service or service type may be defined by a destination layer 2 ID or default destination layer 2 ID.

UE Device Class/Category: Each UE device class or category may be associated to a specific SL DRX configuration. A peer UE may know the class/category of device it wishes to discover. Discovery announcements for a specific device class/category may only occur during Discovery Windows tied to this class/category. Outside of these Discovery Windows, UE 201 may use DRX, as the peer UEs will not send out discovery announcements for this device class/category. The SL DRX may be enabled implicitly as soon as UE 201 enters SL_UnLinked state 212. The SL DRX configuration may provide all the details as shown in Section for SL Configured DRX operation. The SL DRX configuration chosen is based on the device class/category.

Some combination of Resource Pool or sidelink BWP and Service or service Type or Device Class. For example, some resource pools may provide a number of SL DRX configurations, one for each service or service type. The SL DRX configurations defining the Discovery Windows. Based on the desired service or service type, the announcing UE selects the appropriate SL DRX configuration and transmits discovery messages during these windows. Similarly, the monitoring UE, based on the desired service or service type, may only monitor discovery announcements during the Discovery windows.

SL Configured DRX Operation

SL_UnLinked configured DRX operation is divided into periodic ON (Active) times and OFF times. Discovery windows correspond to the ON times, and denote periods during which an announcing UE may transmit a discovery message, and when a monitoring UE may receive a discovery message. SL DRX Configuration for SL_UnLinked state 212 may be based on one or more of the following parameters (as shown on FIG. 14): discovery period, discovery window size, or discovery window start time.

Discovery Period: Period over which the discovery window repeats. This may be in terms of a number of slots or subframes, or it may be specified in terms of msec.

Discovery Window Size: Duration of the Discovery Window. This may be in terms of a number of slots or subframes, or it may be specified in terms of msec.

Discovery Window start time: the time when the Discovery Window starts. This may point to a specific slot or subframe. Alternatively, it may be as a slot or subframe offset to a specific system frame number.

Different services or service types, device class, resource pool, or sidelink BWP may have different sets of parameters. For example, a service requiring quick discovery of peer UEs may rely on a SL DRX configuration with a short DRX period.

The UEs may be (pre)provisioned, preconfigured, or configured through dedicated signaling, or through system information, with:

mapping from the service or service type to a service index to be used in the determination of the SL DRX configuration. Alternatively, if the service type is PSID or ATS-ID, these may be used directly. Alternatively the service may be identified with the destination layer 2 ID.

The mapping of service or service type to Discovery Window size

The mapping of service or service type to Discovery Window period

The mapping of device class/category to Discovery Window size

The mapping of device class/category to Discovery Window period

The mapping of resource pool to Discovery Window size

The mapping of resource pool to Discovery Window period

The mapping of sidelink BWP to Discovery Window size

The mapping of sidelink BWP to Discovery Window period

UE 201 will select the SL DRX configuration based on the service or service type, sidelink BWP, device class/category, resource pool, etc. Once selected, UE 201 will start monitoring the SCI/PSCCH for discovery messages during the Discovery window. If a discovery message is received, UE 201 may follow the discovery procedure as described in [3] or [4]. If no discovery message is received, UE 201 may return to DRX until the next discovery period.

The UEs may use the (pre)provisioned or (pre)configured information to calculate a Discovery Window start time.

Note that UE 201 may have multiple active SL DRX configurations in SL_UnLinked state 212. For example, in the case where UE 201 may be interested in two or more sidelink services.

Approaches to Issue 3: SL DRX During Sidelink Communications

UE 201 that has multiple ongoing SL communications, may be continuously receiving to try to receive these SL communications. This continuous reception may be a significant power drain on the UE.

Mechanisms to try to eliminate the need for continuous reception for sidelink communications may be divided into alternatives, such as the following three: 1) Alternative 1: Based on underlying triggers or conditions at UE 201; or 2) Alternative 2: Based on configured DRX operation; or 3) Alternative 3: Based on configured DRX operation for Groupcast or Broadcast SL communication. These are described herein.

Alternative 1: Stopping Continuous Reception Based on Triggers at UE

In this alternative, UE 201 relies on one or more conditions to determine that it can stop continuous reception of one or more SL communications. When these conditions are met, UE 201 does not monitor SCI/PSCCH for these SL communications. When one or more of these conditions are not met, UE 201 may need to monitor SCI/PSCCH for these SL communications, but may rely on the second alternative (configured DRX operation) for power savings. Some conditions are described below:

With reference to a first condition, UE 201 may rely on its location information to stop continuous reception. For example, UE 201 with a sidelink communication to a home set-top box, may only monitor SCI/PSCCH when in the home. UE 201 may stop monitoring SCI/PSCCH for this SL communication when outside of the home.

With reference to a second condition, UE 201 may rely on a signal from a user, through a graphical user interface. The user may manually start and stop UE 201 from monitoring SCI/PSCCH.

With reference to a third condition, UE 201 may rely on other sidelink activity. For example, UE 201 may be (pre) configured with a maximum number of sidelink communications. Once UE 201 has established this maximum number of sidelink communications, UE 201 may stop monitoring SCI/PSCCH for other SL communication.

With reference to a fourth condition, UE 201 may rely on other factors to determine if it has to monitor SCI/PSCCH. These factors may include battery status, or Uu interface connectivity. For example, UE 201 may stop monitoring if UE 201 determines that its battery status is below a threshold; or if UE 201 is in connected mode DRX on its Uu interface.

With reference to a fifth condition, UE 201 may rely on a signal from its serving cell or the network (over the Uu interface) that tells UE 201 that it may stop monitoring SCI/PSCCH.

With reference to a sixth condition, UE 201 may stop continuous reception based on characteristic of the service or service type. For example. if a service cannot be used since the UE 201 would consume too much power. UE 201 may get the information about the service or service type from (pre)provision, (pre)configuration, system information, or dedicated signalling. Different service or service types may have different power consumption requirements or power saving requirements. Services or service types may be associated with different power saving features or DRX configurations or operations.

With reference to a seventh condition, UE 201 may stop continuous reception based on a signal transmitted from its serving cell. For example, the cell may broadcast an indication if there are any active services being offered in a cell. If no service, UE 201 may stop continuous monitoring on the SL.

With reference to an eighth condition, UE 201 may stop continuous reception based on geographic information. The services may be based on geographic area. UE 201 may be (pre)provisioned or (pre)configured with the geographic area for each service. Based on its current location the UE would know if a service is being offered or not. This geographic information may be in terms of Zone_ID. This geographic information may be in terms of positioning such as SL positioning or the like.

Figure 15:
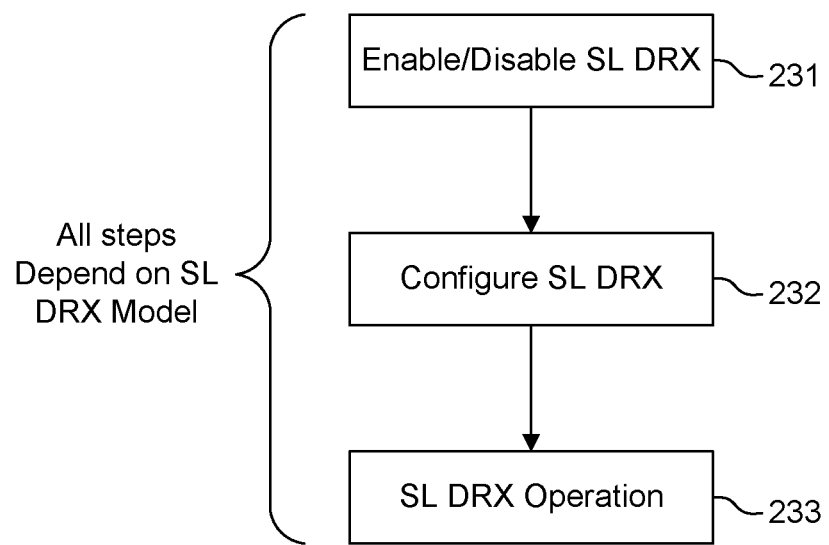
FIG. 15 illustrates an exemplary SL DRX Use in SL_Linked.

Alternative 2: Stopping Continuous Reception Based on Configured SL DRX Operation In this alternative, UE 201 may use a configured sidelink DRX operation. The DRX operation is modeled after Uu RRC CONNECTED mode DRX operation. For the Uu interface, Connected mode DRX pattern is determined by the serving cell, and configured in UE 201. Once configured, the connected mode DRX operation may be implicitly enabled. For SL operation, Configured SL DRX may be more complicated, and involve three high level steps, as shown in FIG. 15. At step 231, enabling SL DRX—Which entity enables SL or disables SL DRX and what triggers it uses. At step 232, configuring SL DRX at the transmitting UEs, Receiving UE, serving cells, controlling entity or scheduling entity, among other things. A controlling entity is an entity that may send control messages to a UE to control its SL transmissions. These messages may be over the sidelink (PC5) interface. A scheduling entity is an entity that may schedule SL transmissions of a UE. These messages may be over the sidelink (PC5) interface. The functionality of the controlling entity and the scheduling entity may be combined in a single controlling/scheduling entity. At step 233, SL DRX operation: how active times are interspersed with periods of DRX. Each of these steps may rely on the underlying SL DRX model, as described herein, such as with regard to the section for SL DRX Model.

For unicast transmissions between UE 201 and UE 202, a PC5 RRC CONNECTION may be established between the two peer UEs. This RRC connection may be used for capability exchange and RB configuration, but may be extended to include information related to SL DRX configuration.

In a sidelink communication, a source UE may transmit traffic to a peer UE by sending Sidelink Control Information in the PSCCH followed by additional Sidelink Control Information and data in the PSSCH. The SCI may include information that helps identify the target UE at the physical layer. The SCI may be divided into multiple stages (e.g., two), with a first stage including a minimum set of information that may be used to facilitate reception of a second stage. Together, the two stages may include the Layer-1 destination ID, or Layer-1 source ID, along with information that will help decode the PSSCH.

Enabling/Disabling SL DRX Operation

UE 201 may support SL DRX operation. For the Uu interface in the non-dual-connectivity case, there may only be a single transmitting entity, such as base station 205 (e.g., gNB or eNB) that can lead to reception at UE 201. As a result, base station 205 may be suited to enable or disable Uu DRX, based on UE 201 support for Uu DRX. The situation is different for the sidelink, where a number of transmitting entities may lead to reception at UE 201, and the notion of enabling SL DRX or disabling SL DRX operation may be complicated by factors, such as who controls the enabling or disabling of SL DRX or when is the SL DRX enabled or disabled.

Who controls the enabling/disabling of SL DRX? A number of entities may be allowed: UE 201 itself, one or more of the peer UEs communicating with UE 201, the serving cell of UE 201, or a controlling/scheduling UE in cases where UE 201 belongs to a group of UEs that is scheduled or controlled by the controlling/scheduling UE. For example, in a platoon setting, where one of the UEs in the platoon acts as a platoon leader.

When is the SL DRX enabled/disabled? Numerous triggering conditions to enable or disable SL DRX should be defined. Disclosed herein SL DRX may be enabled or disabled based on one or more conditions (e.g., triggering conditions) herein, such as the following.

In an example condition, some UEs may enable SL DRX based on the underlying SL state. For example, UE may always have it enabled when it enters SL_Linked state and disabled when UE transitions out of a SL_Linked state In an example condition, some UEs may have SL DRX enabled based on configuration from the network, or pre-configuration, or (pre)provisioning. For example, a UE may be pre-configured or (pre)provisioned to always use SL DRX when in out-of-coverage.

In an example condition, some sidelink services may always use SL DRX, and for these services, SL DRX operation is always enabled. Other services may never use SL DRX, while some other services may leave the decision to the controlling gNB or controlling entity, or to the UE (based on some configuration from the network or based on preconfiguration or (pre)provisioning).

In an example condition, SL DRX operation may be enabled per resource pool. Some resource pools may always require that UEs use SL DRX. Other resource pools may never have UEs that use SL DRX. Still other resource pools may leave the decision to enable SL DRX to the controlling gNB or controlling entity, or to the UE (based on some configuration from the network or based on preconfiguration or (pre)provisioning).

In an example condition, SL DRX operation may be enabled per sidelink carrier frequency. Some sidelink carrier frequencies may always require that UEs use SL DRX. Other sidelink carrier frequencies may never have UEs that use SL DRX. Still other sidelink carrier frequencies may leave the decision to enable SL DRX to the controlling gNB or controlling entity, or to the UE (based on some configuration from the network or based on preconfiguration or (pre)provisioning).

In an example condition, SL DRX may be enabled at the UE based on the number of sidelink communications to the UE. For example, SL DRX may be enabled when the first K1 (K1>=1) unicast connections are established. Alternatively, SL DRX may be enabled when the UE is involved in at least K1 sidelink communications of any cast type (including unicast, groupcast, or broadcast). SL DRX operation may be disabled when the number of sidelink communications falls below K2 (K2 may be different from K1, K2 may be <=K1).

In an example condition, SL DRX may be enabled/disabled based on the status of the Uu interface. For example, the SL DRX may be enabled when the Uu DRX enters the OFF state, and disabled when the Uu DRX enters the ON state. This would maximize the power savings to the UE. As another example, SL DRX may be enabled when the Uu interface enters RRC_IDLE state, and disabled when the UE leaves RRC_IDLE state. As another example, SL DRX may be enabled when the Uu interface enters RRC_INACTIVE state, and disabled when the UE leaves RRC_INACTIVE state. As another example, SL DRX may be enabled when the Uu interface enters RRC_CONNECTED state, and disabled when the UE leaves RRC_CONNECTED state.

In an example condition, SL DRX may be enabled/disabled based on the type of traffic carried on the sidelink connection. The SL DRX may be enabled if the sidelink connection carries traffic with a certain QoS profile (identified by a PC5 5G QoS Identifier (PQI) for example). Alternatively, the SL DRX may be linked to certain traffic flows (identified by a PC5 QoS Flow Identifier (PFI) for example). The SL DRX may be enabled if the sidelink connection carries traffic with a certain PFI.

Figure 16:
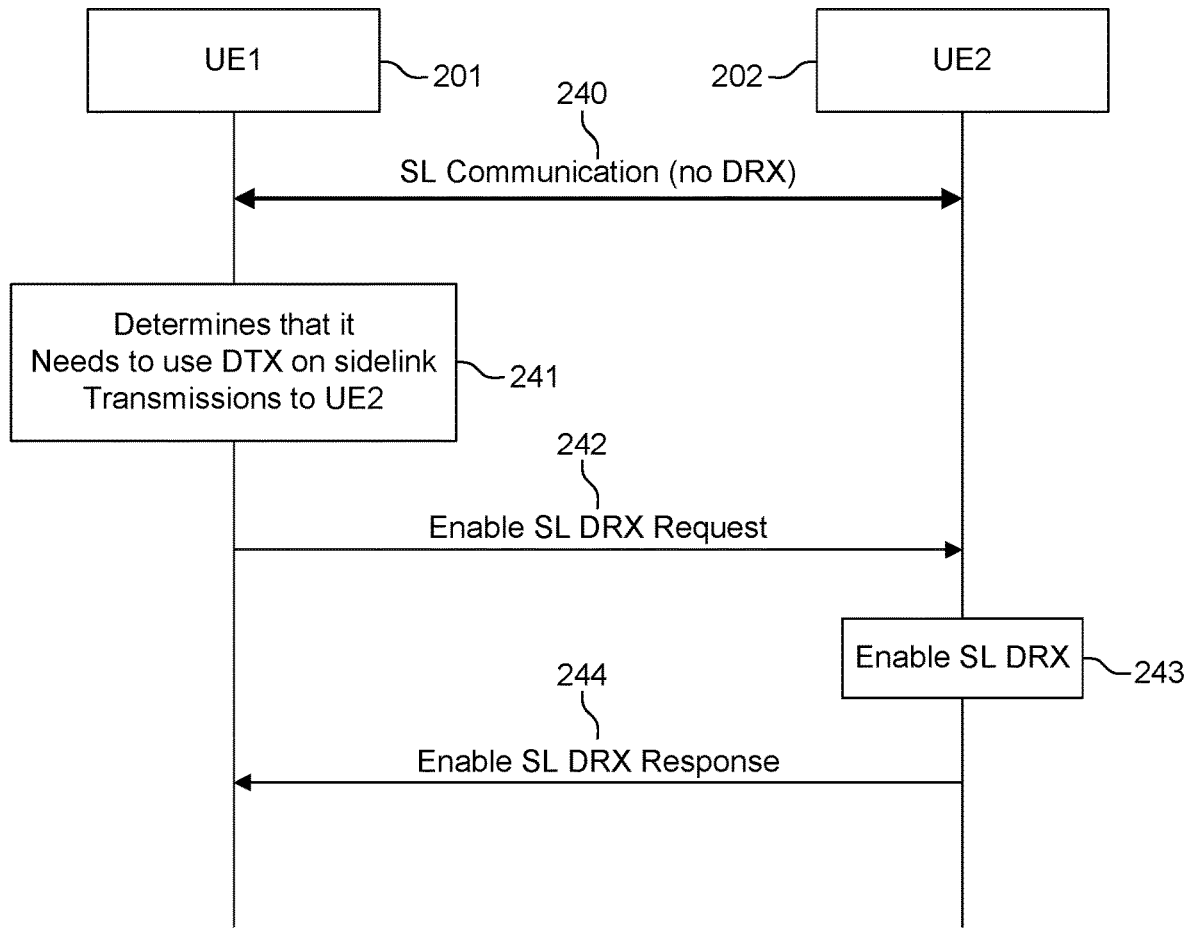
FIG. 16 illustrates an exemplary Peer UE enabling DRX.

In an example condition, SL DRX may be enabled/disabled based on request from the peer sidelink UE. For example, a peer UE may be required to use discontinuous transmission (DTX) on the sidelink. During these discontinuous transmission periods, the peer UE will not send any sidelink traffic. As a result, the receiving UE is not required to listen for transmissions from this peer UE during this interval and may enter DRX mode. Consequently, the peer UE may trigger the receiving UE to enable SL DRX (See FIG. 16). With reference to FIG. 16, at step 240, there may be SL communication (no DRX). At step 241, UE 201 may determine that DTX may be used on SL transmissions to UE 202. At step 242, UE 201 may send a request message to UE 202 to enable SL DRX. At step 243, UE 202, in response to the request of step 242, enables SL DRX. At step 244, UE 201, in response to the enabling of step 243, receives a message associated with the request of step 242 (e.g., acknowledging the enablement of SL DRX for UE 202).

In an example condition, SL DRX may be enabled/disabled based on a request from the serving cell or network.

In an example condition, SL DRX may be enabled based on current UE battery status. If below a (pre-) configured threshold, the UE enables SL DRX. The UE disables SL DRX if UE battery status is above a (pre-)configured threshold.

(Re)Configuring SL DRX

For Uu DRX operation, the serving cell is the sole entity responsible for enabling/disabling DRX operation, and it typically does this based on UE capability. That is, if the network and UE both support Uu DRX, then the feature is enabled. The serving cell is also responsible for configuring the Uu DRX so that the DRX operation at both the transmitter (gNB/eNB) and receiver (UE) are synchronized. For example, this synchronization prevents a serving cell from attempting to transmit downlink traffic to UE 201 that is in DRX.

As described in the Section for Enabling/Disabling SL DRX operation, in SL DRX, one or more triggering conditions, can result in an entity to enable or disable SL DRX operation. This SL DRX operation may follow one of the models described in the Section for approaches to issue 1. One of the issues that remains to be addressed is how to configure the SL DRX at the UEs so that both the transmitting UE and receiving UE are synchronized in terms of SL DRX operation. This may depend on the entity that enables/disables the SL DRX operation.

SL DRX Configuration is Implicitly Configured at Peer UEs

In this alternative, both the transmit UE and receive UE may implicitly know the SL DRX configuration to use, and as a result require no signaling between the UEs to configure the DRX operation. The details are similar to those covered in the SL_UnLinked state 212. The assumption is that the peer UEs share some common knowledge that allows them to simultaneously configure the SL DRX operation. The common knowledge may be the shared resource pool, the sidelink BWP used, the service type, the frequency of operation, the cast type, the device class/category, the service or service type, any combination of these, etc. The service or service type may be defined by a destination layer 2 ID. For PC5-S messages, such as the Direct Communication Request, the common knowledge may be the default destination layer 2 ID of the service or service type. Both UEs use this common knowledge and the (pre)configured SL DRX configurations to set up the SL DRX operation. At an extreme, the transmit UE and receive UE may have a single (pre)configured SL DRX configuration. Any sidelink communication will rely on this single configuration. The (pre)configured SL DRX configurations include the parameters for DRX operation in the SL_Linked state 213 (See Table 5).

Serving Cell Configuring SL DRX Operation

Figure 17:
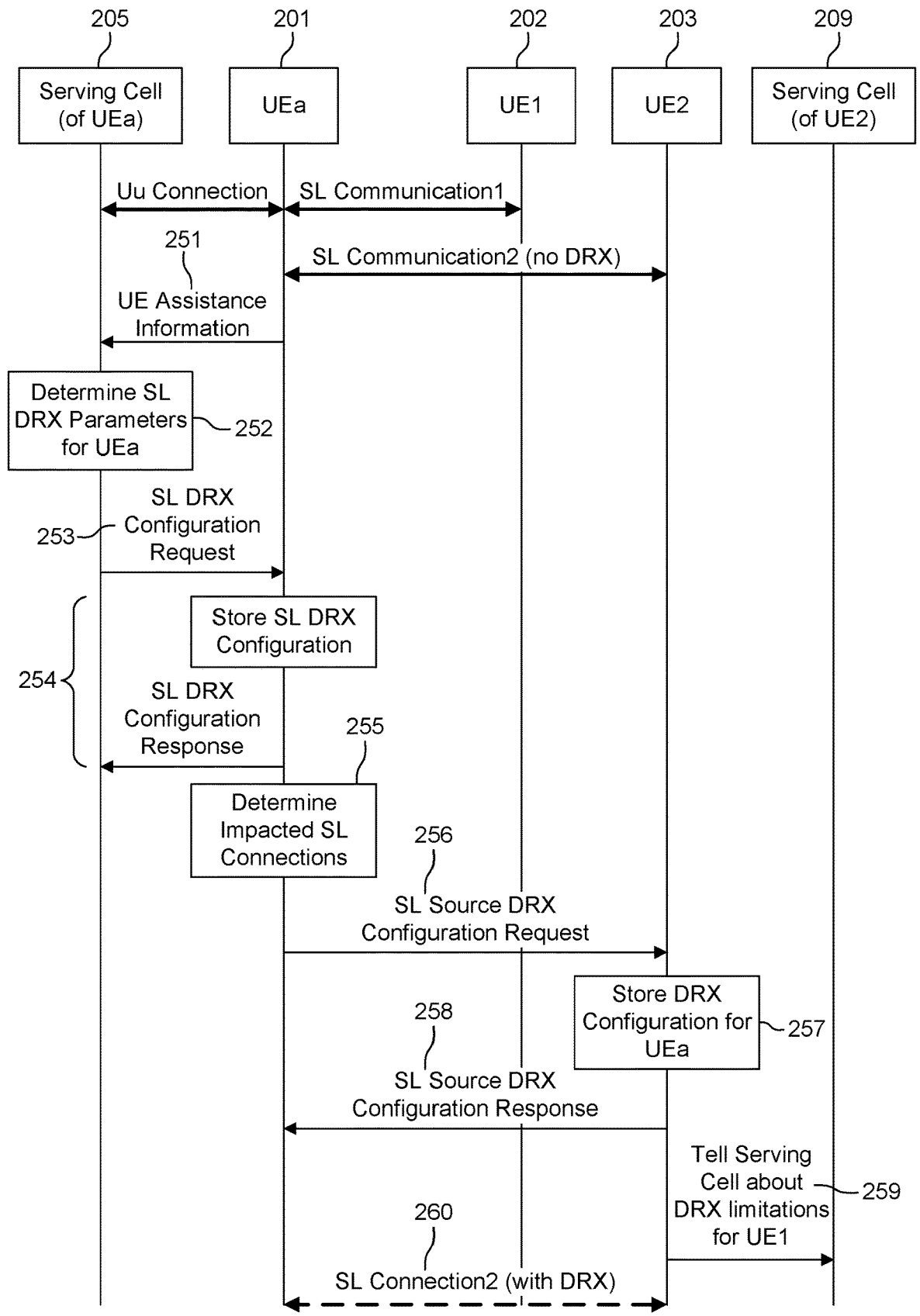
FIG. 17 illustrates an exemplary Serving Cell Configuring SL DRX Operation.

In this alternative, the serving cell is responsible for enabling/disabling SL DRX operation at UE 201 and configuring the SL DRX. A call flow is shown in FIG. 17, and a description of the steps is provided below. It is assumed that UE 201 has two sidelink communications—one to UE 202 and one to UE 203, as well as a Uu connection to its serving cell.

At step 251, UE 201 may send information to the serving cell to help the serving cell in configuring the SL DRX. For example, as part of UE Assistance Information. This information may include one or more of the following: 1) number of active SL communications or; 2) indication of the requested DRX parameters.

Number of active SL communications. For each SL communication, the UE may provide an indication if the communication is a unicast, groupcast, or broadcast. For the unicast communication, UE 201 may also provide an identifier of the peer UE (e.g. Layer 1 ID, Layer 2 ID). For the groupcast communication, UE 201 may also provide a group identifier.

Indication of the requested DRX parameters. These parameters may be based on the SL DRX model. For example, UE 201 may provide an indication that it wants SL DRX for a certain resource pool, frequency, sidelink BWP, sidelink service or service type, cast type, or peer UE, etc. UE 201 may also provide an indication as to the amount of discontinuous reception it is requesting. UE 201 may provide specific DRX parameters (See Table 5). Alternatively, UE 201 may provide general DRX guidance. For example, UE 201 may provide an indication that it wants to be in DRX 25% of the time within a period.

At step 252, serving cell 205 determines the SL DRX parameters for UE 201 (See Table 5).

At step 253, serving cell 205 configures the SL DRX for UE 201. This may be through a new RRC message, or carried as a new IE in an existing RRC message. This message may be part of the SL radio bearer (SLRB) configuration.

At step 254, UE 201 confirms the SL DRX configuration to the Serving Cell. Note that UE 201 may accept the SL DRX configuration, modify the SL DRX configuration, or reject the SL DRX configuration. For example, this may be to coordinate this SL DRX configuration with other SL DRX configurations that are already enabled in the UE. For the latter two options, UE 201 may provide a cause value to serving cell 205 as to the reason for the modification or rejection. In the case of modification, UE 201 may also provide the SL DRX configuration chosen by UE 201. In the call flow, it is assumed that UE 201 accepts the SL DRX configuration provided by serving cell 205.

At step 255, based on the SL DRX configuration and the SL DRX model, UE 201 determines the impacted sidelinks. For example, if serving cell 205 has configured SL DRX for a specific service or service type, UE 201 will determine the sidelink communications that are using this service or service type. As another example, if serving cell 205 has configured SL DRX for a specific peer UE, UE 201 will determine the sidelink communications from this peer UE. In this exemplary call flow, it is assumed that UE 201 has determined that only SL communication 2 is impacted by the configured SL DRX configuration.

At step 256, UE 201 sends a message to UE 203 to inform UE 203 that UE 201 will be using DRX, and providing the SL DRX configuration. This message may be a new RRC message, a new IE in an existing RRC message, a MAC CE message, or alternatively a layer 1 control message (such as carried in the SCI).

At step 257, UE 203 stores the relevant DRX configuration for UE 201. At step 258, UE 203 sends a confirmation message to UE 201, confirming that it has received the SL DRX configuration. At step 259, if UE 203 relies on scheduled resource allocation mode, UE 203 needs to notify its serving cell about the scheduling limitations imposed by the DRX operation of UE 201. For example, UE 203 may use RRC dedicated signalling to update the SLRB configuration between UE 203 and UE 201. UE 203 may provide to its serving cell, the DRX configuration of UE 201.

At step 260, UE 203 may ensure that future SL communication from UE 203 to UE 201 may only occur during SL DRX ON periods. If UE 203 relies on scheduled resource allocation mode, then the serving cell scheduler may know to only schedule sidelink transmission resources during UE 201 ON periods.

Subsequently, when a new SL communication is initiated at UE 201, UE 201 evaluates if this SL communication is impacted by the SL DRX configuration. If yes, the DRX configuration is provided to the peer UE at the time of SL connection establishment, for example as part of the SLRB configuration.

At any point thereafter, the serving cell may decide to change the SL DRX configuration of UE 201. The serving cell 205 may send a SL DRX reconfiguration command to UE 201, which would then determine the SL communications impacted by this reconfiguration, and subsequently advise the peer UEs of the impacted SL communications about the SL DRX reconfiguration. Alternatively, conditions at UE 201 may change (for example a new SL communication may be started) and UE 201 may provide an update to serving cell 205. Serving cell 205 may, based on this information, decide to change the SL DRX configuration.

In the case that the UEs involved in the SL communication have a common serving cell, then the serving cell may signal the SL DRX configuration to each of the UEs involved in the SL communication. Receive UEs may configure the SL DRX based on the signaled configuration. For transmit UEs using Mode 1 resource allocation, serving cell may guarantee that scheduling of SL transmissions will occur during the configured active times at receive UEs. For transmit UEs using Mode 2 resource allocation, the transmit UEs may use the signaled SL DRX configuration to guarantee that the slots occurring during the configured SL DRX OFF periods, are not selected for SL transmissions, during the during TX resource (re-)selection procedure.

In the case that the UEs involved in the SL communication have a different serving cells, then these serving cells may exchange information to coordinate the SL DRX configuration. The serving cells may then signal the SL DRX configuration to each of the UEs involved in the SL communication. Receive UEs may configure the SL DRX based on the signaled configuration. For transmit UEs using Mode 1 resource allocation, serving cell may guarantee that scheduling of SL transmissions will occur during the configured active times at receive UEs. For transmit UEs using Mode 2 resource allocation, transmit UEs may use the signaled SL DRX configuration to guarantee that the slots occurring during the configured SL DRX OFF periods, are not selected for SL transmissions, during the TX resource (re-)selection procedure.

Controlling/Scheduling Entity Configuring SL DRX Operation

Figure 18:
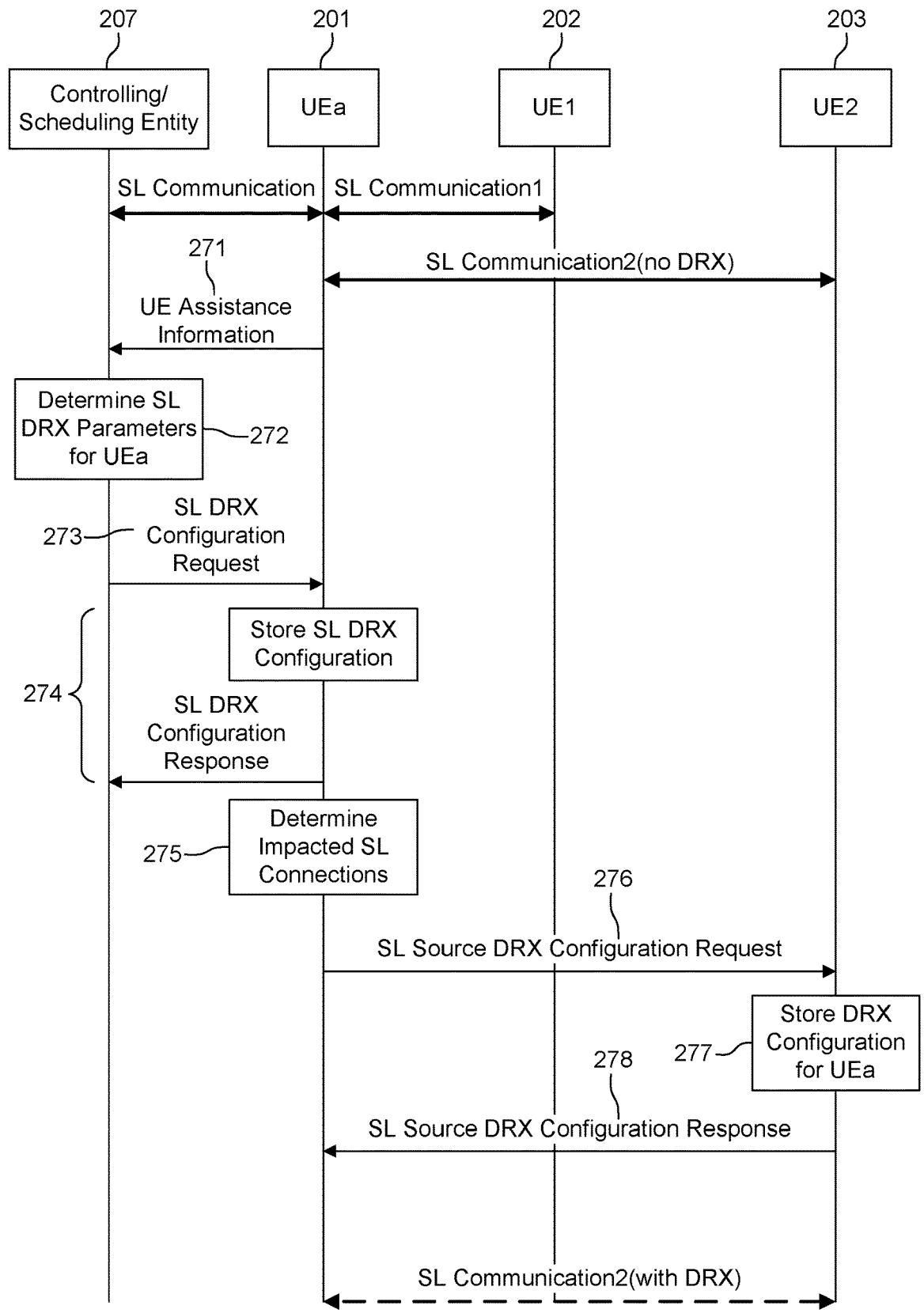
FIG. 18 illustrates an exemplary Controlling/Scheduling UE Configuring SL DRX Operation.

In this alternative, the Controlling/Scheduling entity may be responsible for enabling/disabling SL DRX operation at a UE. A call flow is shown in FIG. 18, and a description of the steps is provided below. It is assumed that UE 201 has three sidelink communications— one to UE 202, one to UE 203, and one to the Controlling/Scheduling Entity 207.

At step 271, UE 201 may send information to the controlling/scheduling entity 207 to help the controlling/scheduling entity in configuring the SL DRX. For example, as part of UE Assistance Information to the controlling/scheduling entity. This information may include one or more of the following:

Number of active SL communications. For each SL communication, the UE may provide an indication if the communication is unicast, groupcast, or broadcast. For the unicast communication, UE 201 may also provide an identifier of the peer UE (e.g. Layer 1 ID, Layer 2 ID). For the groupcast communication, UE 201 may also provide a group identifier.

Indication of the requested SL DRX parameters. These parameters may be based on the SL DRX model. For example, UE 201 may provide an indication that it wants DRX for a certain resource pool, frequency, sidelink BWP, sidelink service or service type, cast type, peer UE, etc. UE 201 may also provide an indication as to the amount of DRX it is requesting. UE 201 may provide specific DRX parameters (See Table 5). Alternatively, UE 201 may provide general DRX guidance, For example, UE 201 may provide an indication that it wants to be in DRX 25% of the time.

At step 272, Controlling/scheduling entity 207 determines the SL DRX parameters (See Table 5). If necessary, the Controlling/Scheduling UE may ask its serving cell for assistance.

At step 273, Controlling/scheduling entity 207 configures the SL DRX for UE 201. This may be through a new RRC message, or carried as a new IE in an existing RRC message. This message may be part of the SL radio bearer (SLRB) configuration.

At step 274, UE 201 confirms the SL DRX configuration to the Controlling/scheduling entity 207. Note that UE 201 may accept to SL DRX configuration, modify the SL DRX configuration, or reject the SL DRX configuration. For the latter two options, UE 201 may provide a cause value to the Controlling/scheduling entity 207 as to the reason for the modification or rejection. In the case of modification, UE 201 may also provide the SL DRX configuration chosen by UE 201. In the call flow, it is assumed that UE 201 accepts the SL DRX configuration provided by the Controlling/scheduling entity 207.

At step 275, based on the SL DRX configuration and the SL DRX model, UE 201 determines the impacted sidelinks. For example, if the Controlling/scheduling entity 207 has configured SL DRX for a specific service or service type, UE 201 will determine the sidelink communications that are using this service or service type. As another example, if the Controlling/scheduling entity 207 has configured SL DRX for a specific peer UE, UE 201 will determine the sidelink communications from this peer UE. In the call flow, it is assumed that UE 201 has determined that only SL communication 2 is impacted by the configured SL DRX configuration At step 276, UE 201 sends a message to UE 203 to inform UE 203 that UE 201 will be using DRX, and providing the SL DRX configuration. This message may be an RRC message, a MAC CE message, or alternatively a layer 1 control message (such as carried in the SCI).

At step 277, UE 203 stores the relevant DRX configuration for UE 201.

At step 278, UE 203 sends a confirmation message to UE 201, confirming that it has received the SL DRX configuration If UE 203 relies on resource allocation mode 2(d) (where its scheduling is done by the Controlling/scheduling entity 207), UE 203 needs to notify its Controlling/scheduling entity 207 about the scheduling limitations imposed by the DRX operation of UE 201. For example, UE 203 may use RRC dedicated signalling to update the SLRB configuration between UE 203 and UE 201. UE 203 may provide to its Controlling/scheduling entity 207, the DRX configuration of UE 201.

If UE 203 relies on scheduled resource allocation mode, UE 203 needs to notify its serving cell about the scheduling limitations imposed by the DRX operation of UE 201. For example, UE 203 may use RRC dedicated signalling to update the SLRB configuration between UE 203 and UE 201. UE 203 may provide to its serving cell, the DRX configuration of UE 201.

UE 203 may ensure that future SL communication from UE 203 to UE 201 may only occur during SL DRX ON periods. If UE 203 relies on resource allocation mode 2(d), then its Controlling/scheduling entity 207 knows to only schedule sidelink transmission resources during UE 201 ON periods. If UE 203 relies on scheduled resource allocation mode, then the serving cell scheduler knows to only schedule sidelink transmission resources during UE 201 ON periods.

Subsequently, when a new SL communication is initiated at UE 201, UE 201 evaluates if this SL communication is impacted by the SL DRX configuration. If yes, the DRX configuration may be provided to the peer UE through an RRC message. For example, at the time of SL connection establishment as part of the SLRB configuration.

At any point thereafter, Controlling/scheduling entity 207 (of UE 201) may decide to change the SL DRX configuration of UE 201. Controlling/scheduling entity 207 may send a SL DRX reconfiguration command to UE 201, which would then determine the SL communications impacted by this reconfiguration, and subsequently advise the peer UEs of the impacted SL communications about the SL DRX reconfiguration. Alternatively, conditions at UE 201 may change (for example a new SL connection may be started) and UE 201 may provide an update to its Controlling/scheduling entity 207. Controlling/scheduling entity 207 may, based on this information, decide to change the SL DRX configuration.

In the case that the UEs involved in the SL communication have a common Controlling/Scheduling entity, then the Controlling/Scheduling entity may signal the SL DRX configuration to each of the UEs involved in the SL communication. Receive UEs may configure the SL DRX based on the signaled configuration. For transmit UEs that are scheduled by the Controlling/Scheduling entity, the Controlling/Scheduling entity may guarantee that scheduling of SL transmissions will occur during the configured active times at receive UEs. For transmit UEs using sensing for scheduling (Mode 2 resource allocation), the transmit UEs may use the signaled SL DRX configuration to guarantee that the slots occurring during the SL DRX OFF periods, are not selected for SL transmissions, during the during TX resource (re-)selection procedure.

In the case that the UEs involved in the SL communication have a different Controlling/Scheduling entity, then these Controlling/Scheduling entity may exchange information to coordinate the SL DRX configuration. The Controlling/Scheduling entity may then signal the SL DRX configuration to each of the UEs involved in the SL communication. Receive UEs may configure the SL DRX based on the signaled configuration. For transmit UEs that are scheduled by the Controlling/Scheduling entity, the Controlling/Scheduling entity may guarantee that scheduling of SL transmissions will occur during the configured active times at receive UEs. For transmit UEs using sensing (Mode 2 resource allocation), transmit UEs may use the signaled SL DRX configuration to guarantee that the slots occurring during the SL DRX OFF periods, are not selected for SL transmissions, during the TX resource (re-)selection procedure.

Transmitting UE Configures SL DRX Operation

Figure 19:
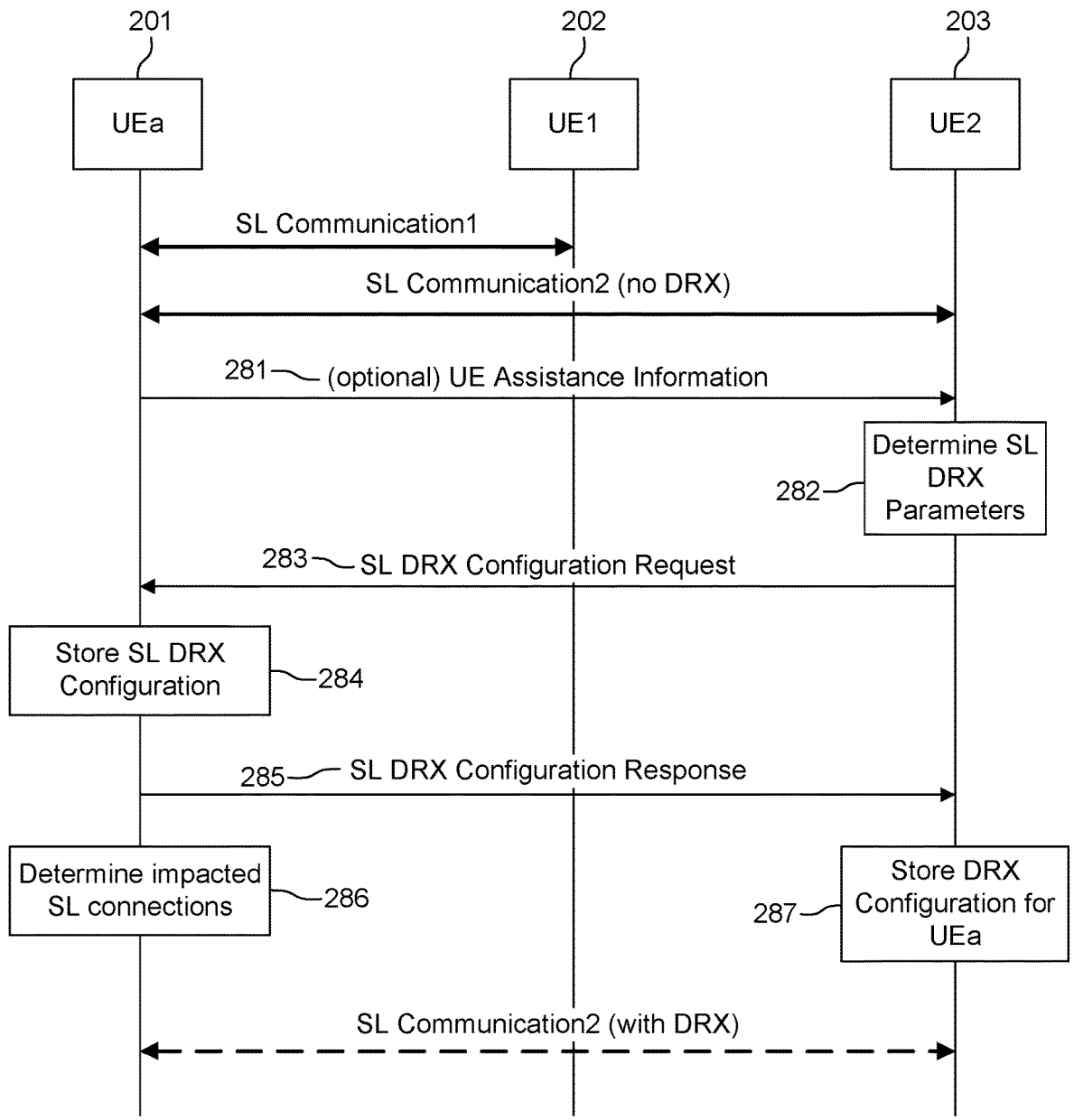
FIG. 19 illustrates an exemplary Transmitting UE Configuring SL DRX Operation.

In this alternative, a transmitting (peer) UE will configure SL DRX operation at a UE. A call flow is shown in FIG. 19, and a description of the steps is provided below. It is assumed that UE 201 has two sidelink communications—one to UE 202 and one to UE 203. A peer UE may enable SL DRX for a UE for any number of reasons. For example, the peer UE may have some DTX limitations, and the peer UE may not transmit sidelink traffic during DTX periods. As a result, the receiving UE does not need to monitor sidelink traffic from the peer UE during these periods. As another example, the receiving UE may want to enable SL DRX, but receiving UE would prefer (e.g., a prioritized preference) that the transmitting UE configure the parameters. The transmitting UE is transmitting the sidelink information and has a better idea of the DRX configuration that matches the sidelink traffic profile on the SL communication between the transmitting and receiving UEs. In making the determination of the DRX configuration, the transmitting UE may use traffic flow or QoS of the traffic to help establish the parameters. For example, if the QoS indicates that the traffic requires low latency, the transmitting UE may configure a DRX with a short DRX cycle.

At step 281, UE 201 may send UE Assistance Information to the peer UEs for which it would like to use SL DRX. In the example call flow, it may be assumed that UE 201 only would like to use SL DRX with UE 203. This information may include one or more of the following indication of the requested DRX parameters.

Indication of the requested DRX parameters. These parameters may be based on the SL DRX model. For example, UE 201 may provide an indication that UE 201 wants DRX for a certain resource pool, frequency, sidelink BWP, sidelink service or service type, cast type, peer UE, etc. UE 201 may also provide an indication as to the amount of DRX UE 201 is requesting. UE 201 may provide specific DRX parameters (See Table 5). Alternatively, UE 201 may provide general DRX guidance. For example, UE 201 may provide an indication that UE 201 wants to be in DRX 25% of the time.

At step 282, UE 203 determines the SL DRX parameters (See Table 5). If necessary, the peer UE may ask its serving cell for assistance. This determination may be based on the QoS required for the sidelink traffic on sidelink communication 2.

At step 283, peer UE configures the SL DRX for UE 201. This may be through a new RRC message, or carried as a new IE in an existing RRC message, or carried in a SLRB (re)configuration.

At step 284, UE 201 may accept to SL DRX configuration, modify the SL DRX configuration, or reject the SL DRX configuration. For the latter two options, UE 201 may provide a cause value to UE 203 as to the reason for the modification or rejection. In the case of modification, UE 201 may also provide the SL DRX configuration chosen by UE 201. In the call flow, it is assumed that UE 201 accepts the SL DRX configuration provided by UE 203.

At step 285, UE 201 may send a confirmation message to UE 203. At step 286, based on the SL DRX configuration and the SL DRX model, UE 201 determines the impacted sidelinks. Typically, it is expected that UE 203 would only configure SL DRX for its SL communication to the receiving UE. However, it is possible that the configuration may impact other sidelink communications. In such a case, not shown in FIG. 19, UE 201 may inform the other peer UE.

At step 287, UE 203 stores the relevant DRX configuration for UE 201. UE 203 will ensure that future SL communication from UE 203 to UE 201 may only occur during SL DRX ON periods.

Subsequently, when a new SL communication is initiated at UE 201, UE 201 evaluates if this SL communication is impacted by the SL DRX configuration. If yes, the DRX configuration is provided to the peer UE, for example at the time of SL connection establishment, for example as part of the SLRB configuration process. Alternatively, UE 201 may receive a SL Connection request from a peer UE. This request may provide an indication as to the peer UEs preference in terms of SL DRX operation. In an example, the peer UE may provide an indication that it has no preference for the SL DRX configuration of UE 201, and that it will follow any SL DRX configuration of UE 201. In an example, the peer UE may provide an indication that it cannot follow the SL DRX configuration of UE 201. For example, the SL connection to be established may require extremely short latency and the SL DRX configuration of UE 201 would not meet this requirement. In this case the peer UE may provide an alternate SL DRX configuration. It may also exchange this alternate configuration as part of the SL connection procedure.

At a point thereafter, the transmitter UE (UE 203) may decide to change the SL DRX configuration of UE 201. For example, UE 203 may determine that the current configuration does not meet the QoS requirements for the sidelink transmissions to UE 201. The transmit UE may send a SL DRX reconfiguration command to UE 201, which would then determine the SL communications impacted by this reconfiguration, and subsequently advise the peer UEs of the impacted SL communications about the SL DRX reconfiguration. Alternatively, conditions at UE 201 may change (for example a new SL connection may be started) and UE 201 may provide update the transmitting UE. The transmitting UE may, based on this information, decide to change the SL DRX configuration.

Receiving UE Configures SL DRX Operation

Figure 20:
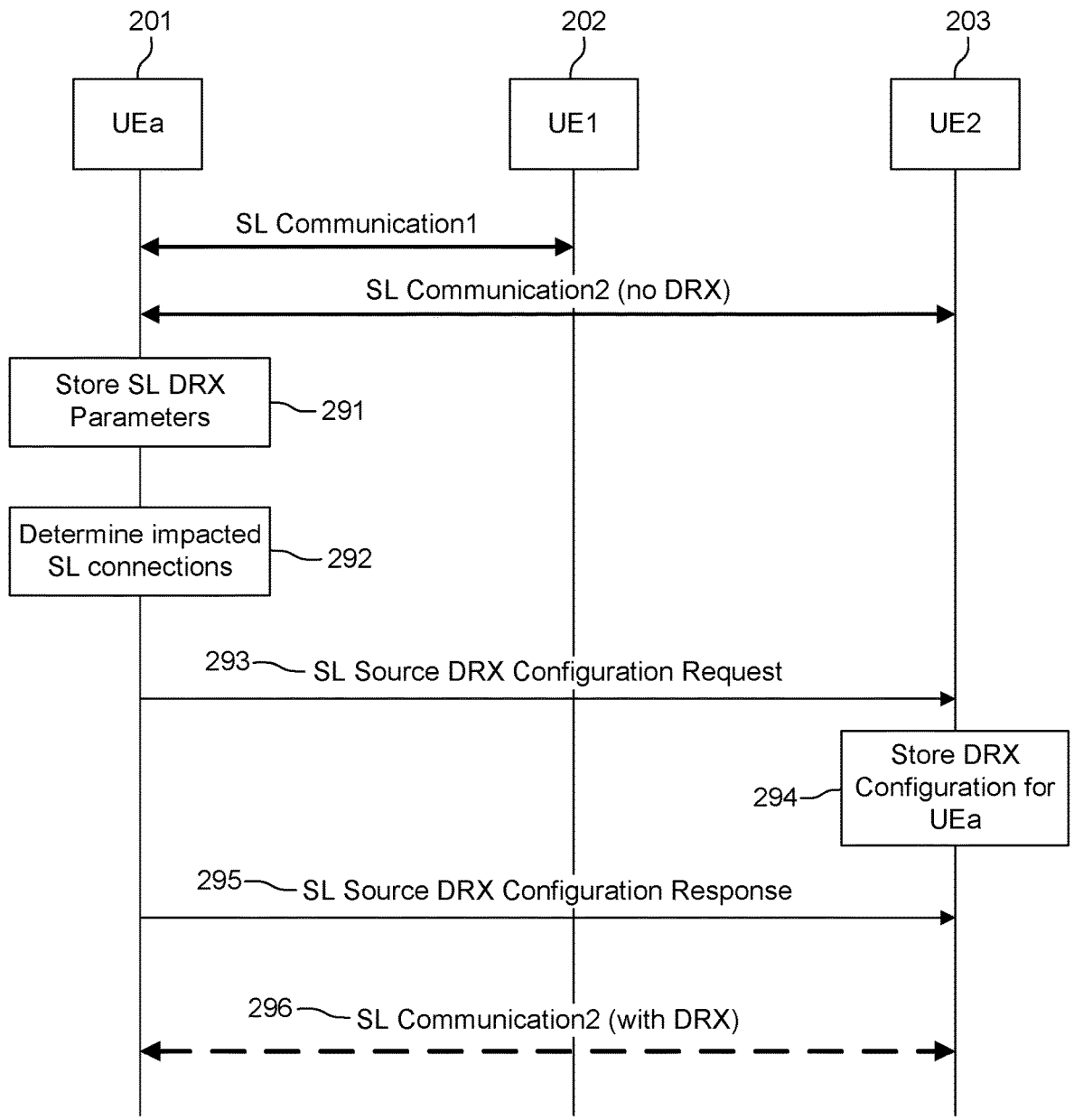
FIG. 20 illustrates an exemplary Receiving UE Configuring SL DRX Operation.

In this alternative, a receiving UE will configure SL DRX operation for itself. A call flow is shown in FIG. 20, and a description of the steps is provided below. It is assumed that UE 201 has two sidelink communications—one to UE 202 and one to UE 203.

At step 291, UE 201 determines that it wishes to enable SL DRX operation. Depending on the SL DRX model, the DRX may be for a certain resource pool, frequency, sidelink BWP, sidelink service or service type, cast type, peer UE, etc. Receiving UE determines the SL DRX parameters (See Table 5).

At step 292, based on the SL DRX configuration and the SL DRX model, UE 201 determines the impacted sidelinks. For example, if the configured SL DRX is for a specific service or service type, UE 201 will determine the sidelink communications that are using this service or service type. As another example, if the configured SL DRX is for a specific peer UE, UE 201 will determine the sidelink communications from this peer UE. As another example, if the configured SL DRX is for per destination (single DRX configuration for UE 201), then sidelink communications of UE 201 may be impacted. In the call flow, it may be assumed that UE 201 has determined that only SL communication 2 is impacted by the SL DRX configuration At step 293, UE 201 sends a message to UE 203 to inform UE 203 that UE 201 will be using DRX, and providing the SL DRX configuration. This message may be an RRC message, a MAC CE message, or alternatively a layer 1 control message (such as carried in the SCI).

At step 294, UE 203 stores the relevant DRX configuration for UE 201.

At step 295, UE 203 sends a confirmation message to UE 201, confirming that it has received the SL DRX configuration.

At step 296, UE 203 will ensure that future SL communication from UE 203 to UE 201 may only occur during SL DRX ON periods.

Subsequently, when a new SL communication is initiated at UE 201, UE 201 evaluates if this SL communication is impacted by the SL DRX configuration. If yes, the DRX configuration is provided to the peer UE at the time of SL connection establishment, for example as part of the SLRB configuration.

At a point thereafter, conditions at UE 201 may change (for example a new SL connection may be started, or a SL connection may be terminated) and UE 201 may decide to change its SL DRX configuration. If so, UE 201 may determine the SL communication impacted by this reconfiguration, and subsequently advise the peer UEs of the impacted SL communications about the SL DRX reconfiguration.

Discontinuity Requirement for SL Connection

It is disclosed herein that a discontinuity requirement parameter be part of the SL connection context maintained at the peer UEs. This may apply to both unicast communications and those groupcast communications that are connection-oriented and are configured through a SL connection establishment phase. When establishing the SL connection, the peer UEs may negotiate a discontinuity requirement parameter. The discontinuity requirement parameter provides an indication as to the OFF durations the connection can support. For example, some SL connections may have no special QoS requirements and can operate with any SL DRX configuration. Other SL connections may have strict QoS requirements (for example low latency), that may not be met for certain SL DRX configurations. The discontinuity requirement parameter may be in the form of a maximum discontinuity the SL connection can support (in terms of slots, subframes, frames, or msec). Alternatively, the discontinuity requirement parameter may be in the form of a range of acceptable SL DRX parameter defined in Table 5. Some of the values may be reserved to indicate that the SL connection has no special requirement and can support any SL DRX configuration. This information may be used when determining the common DRX parameter to use when UE 201 has multiple active SL communications.

Alternative 3: Stopping Continuous Reception Based on Configured SL DRX Operation for Groupcast or Broadcast SL Communication A sidelink communication may be groupcast, where the group may contain two or more members. Within this group, the UEs may be in-coverage and/or out-of-coverage. For the in-coverage UEs, some UEs may be in RRC Connected state, some UEs in RRC Idle state, and other UEs in RRC Inactive state. In one typical use case, one of the group members is the only UE that transmits groupcast sidelink communication. For example in a platoon type scenario, where the platoon leader is the only UE transmitting (e.g., groupcasting). In another typical use case, any of the members of the group may send the groupcast sidelink communication to the other members of the group. For example in a cooperative sharing type of scenario. The SL DRX configuration may be controlled by a UE in the group (e.g., group leader, group manager, another peer UE or the like), a serving cell of one of the group UEs, or a controlling/scheduling entity.

A sidelink communication may be broadcast. The UEs receiving this broadcast may be in-coverage or out-of-coverage. For the in-coverage UEs, some of these may be in RRC Connected state, some in RRC Idle state, and some in RRC Inactive state. In one typical use case, only one UE transmits broadcast sidelink communication. In another typical use case, any of the UEs may broadcast sidelink communication to the other UEs. The SL DRX configuration may be controlled by one of these UEs (e.g., leader, manager, another peer UE or the like), a serving cell of one of the these UEs, or a controlling/scheduling entity.

Figure 21:
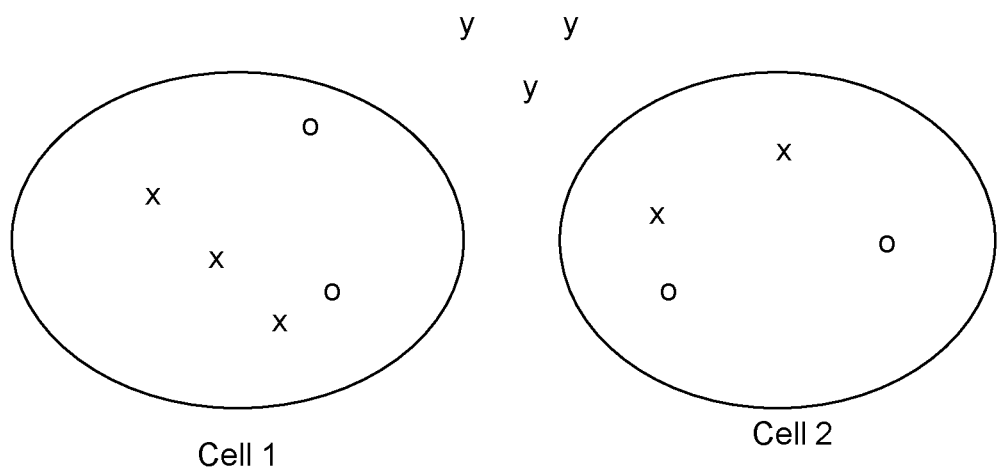
FIG. 21 illustrates an exemplary groupcast deployment.

In both cases (broadcast and groupcast), the ON time (time when the UE is continuously monitoring SCI/PSCCH for SL communication) for all the UEs need to be aligned, to ensure that all the UEs in the groupcast or broadcast receive the SL transmission. Aligning these ON times across the UEs is described below FIG. 21, shows a typical groupcast deployment. UEs may be in different service cells (Cell1 and Cell2) and some UEs in the groupcast may also be out-of-coverage (shown as 'y' in FIG. 21). The UEs in coverage may be in RRC Connected mode (shown as 'x' in the FIG. 21) or in RRC Idle mode (shown as 'o' in FIG. 21). Groupcast transmissions must be across all these UEs.

Enabling/Disabling SL DRX Operation for Groupcast/Broadcast

Numerous triggering conditions to enable/disable SL DRX may be defined. Disclosed herein SL DRX may be enabled or disabled based on one or more conditions herein, such as the following.

In an example condition, some groupcast/broadcast sidelink services may always use SL DRX, and for these services, SL DRX operation is always enabled. Other services may never use SL DRX, while some other services may leave the decision to a group leader, serving cell, or a controlling entity. This information may also be provisioned per service or service type In an example condition, some groupcast/broadcast sidelink services only enable SL DRX, if enough UEs (e.g., a threshold number) request or require SL DRX operation. For example, this may allow for cases where a group has only a few members that request or require SL DRX operation. In such cases, the service may benefit if SL DRX is not enabled. The decision to enable/disable SL DRX for the groupcast or broadcast, may be made by a group leader, serving cell, or a controlling entity. If the number of UEs requesting (or requiring) SL DRX exceeds a threshold K1, then SL DRX is enabled. Similarly, if the service has SL DRX enabled and the number of UEs requesting (or requiring) SL DRX falls below a threshold K2, the SL DRX is disabled. The values of K1 and K2 may be (pre)provisioned or (pre)configured. For example they may be part of the provisioning for the service.

Figure 22A:
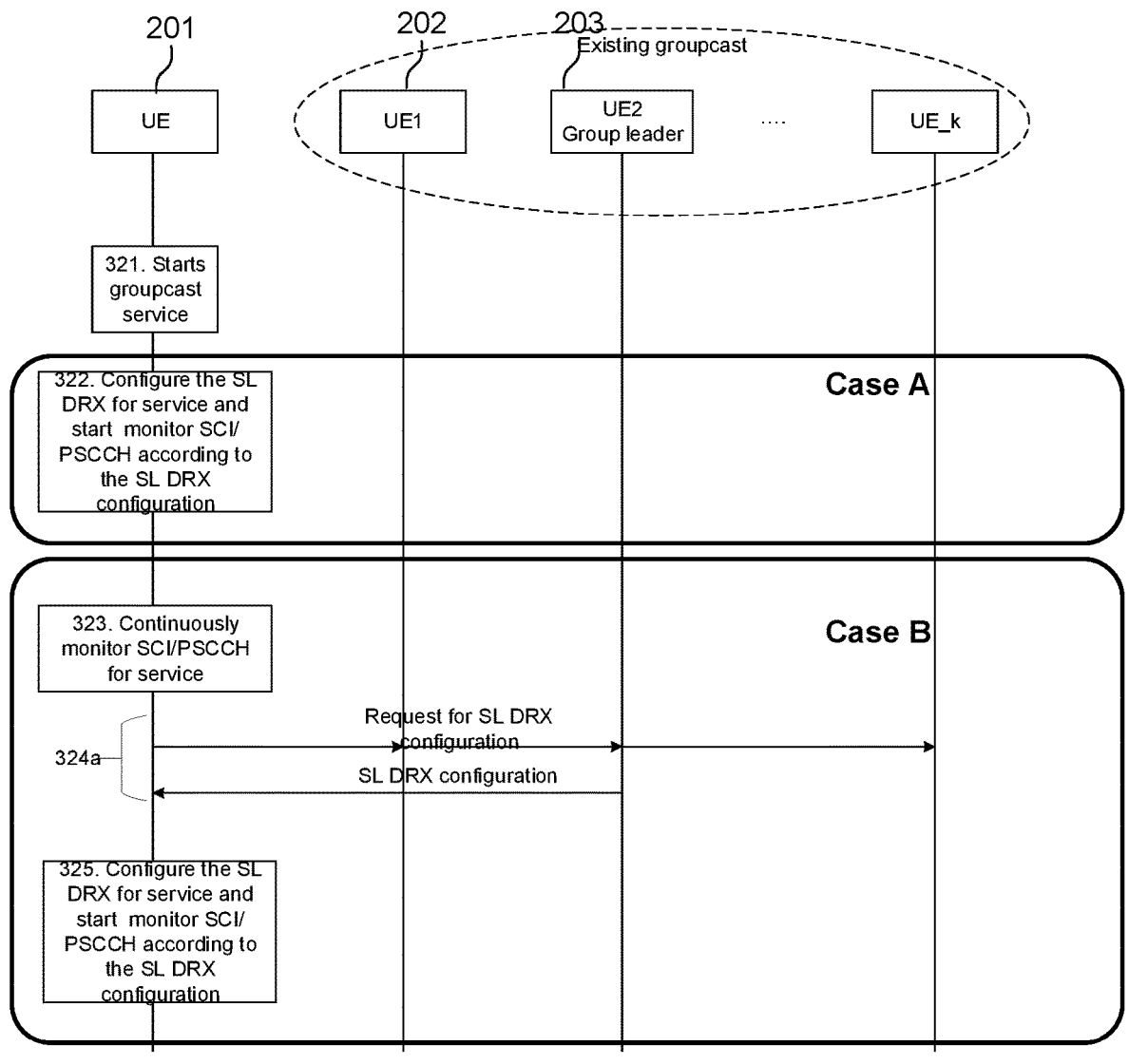
FIG. 22A illustrates an exemplary call flow which describes a case where the UE V2X application layer informs Access Stratum layer to start broadcast or groupcast reception for a particular service or service type.
Figure 22B:
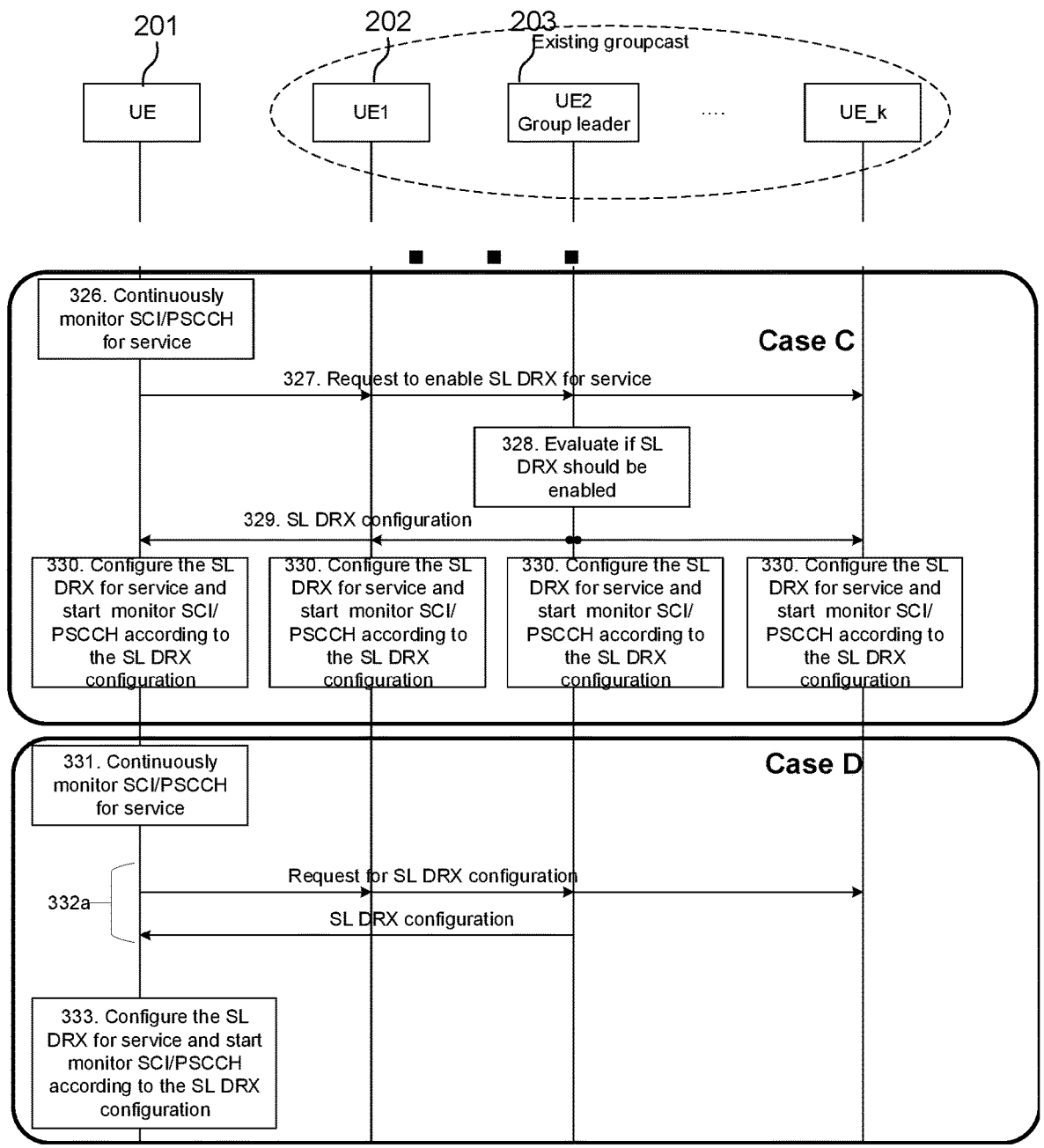
FIG. 22B illustrates an exemplary call flow which describes a case where the UE V2X application layer informs Access Stratum layer to start broadcast or groupcast reception for a particular service or service type.

FIG. 22A-FIG. 22B shows a call flow which describes a case where the UE V2X application layer informs Access Stratum layer to start broadcast or groupcast reception for a particular service (or service type). Based on the provisioning, the UE may know whether the service or service type always use SL DRX, whether the service or service type can use SL DRX, or whether the service or service type never uses SL DRX.

At step 321, UE 201 starts reception of broadcast or groupcast transmission for the service.

For Case A, UE 201 knows that the service or service type always uses SL DRX, and the SL DRX configuration is implicit. In implicit configuration, the UE implicitly knows the SL DRX configuration to use, and as a result may require no signaling between the UEs to configure the SL DRX operation. The details are similar to those described in the SL_UnLinked state. At step 322, if UE 201 knows that the service or service type always uses SL DRX, and the SL DRX configuration is implicit, UE 201 starts monitoring SCI/PSCCH according to the configured SL DRX.

With continued reference to FIG. 22A, for Case B, UE 201 knows that the service or service type always uses SL DRX, and the SL DRX configuration needs to be explicitly obtained (for example through signaling). At step 323, if UE 201 knows that the service or service type always uses SL DRX, and the SL DRX configuration is explicitly configured, UE 201 needs to first determine this configuration. Until UE 201 determines the configuration, UE 201 needs to continuously monitor the SCI/PSCCH to receive the groupcast or broadcast transmissions of this service.

At step 324, the following options may be used for UE to determine the SL DRX configuration. For a first option, UE 201 may send a groupcast or broadcast SL message asking for the SL DRX configuration. This may be sent as a new MAC CE or as a signal/indication carried in the SCI/PSCCH. One or multiple peer UEs (e.g., UE 202) may respond to this message with the SL DRX configuration. For example, the group leader (shown as UE 203 in the figure) may respond with the SL DRX configuration. The response may be included in a MAC CE or in an SCI/PSCCH (e.g., as part of the 1st stage SCI or in the 2nd stage SCI carried in the PSSCH).

For a second option, one or more of the peer UEs may periodically broadcast or groupcast the SL DRX configuration. For example, the group leader (shown as UE 203 in FIG. 22A) may periodically groupcast the SL DRX configuration. The transmission may be through a MAC CE or in an SCI/PSCCH (e.g., as part of the 1st stage SCI or in the 2nd stage SCI carried in the PSSCH). Upon reception of the SL DRX configuration, UE 201 may start monitoring SCI/PSCCH according to the configured SL DRX. The peer UEs may be configured with the periodicity of the SL DRX groupcast or broadcast.

At step 325, once UE 201 determines the SL DRX configuration, UE 201 may start monitoring SCI/PSCCH according to the configured SL DRX.

With continued reference to FIG. 22B, for Case C, UE 201 knows that the service or service type may dynamically enable/disable SL DRX and the service is not already using SL DRX.

At step 326, if UE 201 knows that the service or service type may dynamically enable/disable SL DRX, UE 201 needs to first determine if SL DRX is enabled, and if so, UE 201 needs to determine this configuration. Until then, UE 201 needs to continuously monitor the SCI/PSCCH to receive the groupcast or broadcast transmissions of this service.

At step 327, UE 201 may send a message to UEs to request to enable SL DRX. This may be sent as a new MAC CE or as a signal carried in the SCI/PSCCH.

At step 328, group leader may monitor the number of UEs that have requested to enable SL DRX. Group leader may decide to enable SL DRX for groupcast or broadcast transmission if the number of UEs is greater than a threshold, if an important UE requires it (say a platoon leader), if a high priority UE requires it, etc.

At step 329, Group Leader sends SL DRX configuration to the group UEs, or Group Leader sends an indication to the group UEs that the SL DRX is enabled.

At step 330, UE 201-UE 203, etc., starts monitoring SCI/PSCCH according to the configured SL DRX.

With continued reference to FIG. 22B, UE 201 knows that the service or service type may dynamically enable/disable SL DRX and the service is already using SL DRX At step 331, if UE 201 knows that the service or service type may dynamically enable/disable SL DRX, the UE needs to first determine if SL DRX is enabled, and if so, the UE needs to determine this configuration. Until then, the UE needs to continuously monitor the SCI/PSCCH to receive the groupcast or broadcast transmissions of this service.

At step 332a, the following options may be used for UE 201 to determine the SL DRX configuration. For a first option, UE 201 may send a groupcast or broadcast SL message asking for the SL DRX configuration. This may be sent as a new MAC CE or as a signal carried in the SCI/PSCCH. One or multiple peer UEs may respond to this message with the SL DRX configuration. The response may be included in a MAC CE or in an SCI/PSCCH (e.g., as part of the 1st stage SCI or in the 2nd stage SCI carried in the PSSCH). Upon reception of the SL DRX configuration, UE 201 may start monitoring SCI/PSCCH according to the configured SL DRX.

For a second option, one or more of the peer UEs may periodically broadcast or groupcast the SL DRX configuration. For example, the group leader may periodically groupcast the SL DRX configuration. The transmission may be through a MAC CE or in an SCI/PSCCH (e.g., as part of the 1st stage SCI or in the 2nd stage SCI carried in the PSSCH). Upon reception of the SL DRX configuration, UE 201 may start monitoring SCI/PSCCH according to the configured SL DRX. The peer UEs may be configured with the periodicity of the SL DRX groupcast or broadcast.

At step 333, once UE 201 determines the SL DRX configuration, UE 201 may start monitoring SCI/PSCCH according to the configured SL DRX.

(Re)Configuring SL DRX for Groupcast/Broadcast
SL DRX Configuration is Implicitly Configured at all UEs In this alternative, all UEs (those in the group or those transmitting/receiving the broadcast service) implicitly know the SL DRX configuration to use, and as a result require no signaling between the UEs to configure the DRX operation. The details are similar to those described in the SL_UnLinked state. The assumption is that the UEs share some common knowledge that allows them to simultaneously configure the SL DRX operation. The common knowledge may be the shared resource pool, the sidelink BWP used, the service or service type, the frequency of operation, the cast type, the device class/category, or any combination of these. All UEs use this common knowledge and the (pre)configured or (pre)provisioned SL DRX configurations to set up the SL DRX operation. At an extreme, all UEs may share a single (pre)configured SL DRX configuration. Any sidelink communication will rely on this single configuration. The (pre)configured SL DRX configurations include all the necessary parameters for DRX operation (See Table 5).

SL DRX Operation

The SL DRX operation is described herein. It is assumed that devices involved in sidelink communications may share a common timing reference.

A UE may have one or more SL DRX groups. A SL DRX group has a single SL DRX configuration that controls the SL DRX operation. The SL DRX configuration depends on the chosen SL DRX Model. For example this can be per source-destination pair, per source, per destination, per resource pool, per service or service type, etc. The SL DRX operation on each of the SL DRX groups may be independent, for example the SL DRX operation for one SL DRX group may not effect the SL DRX operation on another group. The SL DRX operation on the SL DRX groups are not aligned and do not necessarily share the same SL DRX cycle. Alternatively, the SL DRX groups may be dependent on each other or linked to each other. For example the linked SL DRX groups may have the same SL DRX cycle and/or may have the same wake-up time, but may have different active time durations.

For each SL DRX group, the SL DRX operation is divided into a number of ON times and OFF times. The ON times are variable and can be extended based on activity on the sidelink communications and or Uu interface. During the OFF times, UE 201 may not receive any sidelink traffic on SL communications that are using the discontinuous reception, and UE 201 may turn off SCI/PSCCH monitoring for these SL communications during the slots or subframes of the OFF period. During the ON periods, UE 201 is expected to monitor the SCI/PSCCH, but under certain conditions, UE 201 it may still perform some power savings as described in the section for approaches to issue 1.

UE 201 may have multiple active SL DRX configurations. For example, for the different cast types, for each unicast sidelink connection, for each service or service type, etc. In addition if UE 201 is also actively monitoring discovery messages while in Sl_Linked state 213, UE 201 may also have a SL DRX configuration dedicated for discovery. Based on these independent SL DRX configurations, UE 201 may find common DRX OFF intervals—periods during which all SL DRX configurations are in OFF mode. In some cases, using the common DRX periods may lead to very few opportunities for power savings. In such cases, the UE may prioritize certain SL DRX configurations over others. The de-prioritized SL DRX configurations may be disabled. The SL DRX configurations may have an associated priority value (drx-PrioritySL). The SL DRX configuration may be based on the traffic type. For example, drx-PrioritySL may be equivalent to the priority of the traffic with the highest priority carried in all the SL communications impacted by the SL DRX configuration. For example if multiple SL communications are impacted by current SL DRX configuration, the drx-PrioritySL may be equivalent to the highest traffic priority carried in each of the SL communications. Alternatively, the priority may be determined based on the entity generating the SL DRX configuration. Some entities may have a higher priority. For example, a platoon leader may have a higher priority for its SL DRX configuration. This priority level may be used by the UE to determine whether to enable or disable a SL DRX configuration. In a first priority alternative, the UE may only enable the SL DRX configurations with a priority higher than a threshold. In a second priority alternative, the UE may disable the SL DRX configurations with a priority lower than a threshold. In a third priority alternative, the UE may disable SL DRX configurations if the value of the difference in priority between this SL DRX configuration and the SL DRX configuration with the highest priority exceeds a threshold. Note that in the first, second, and third priority alternatives, the higher value is used to denote the higher priority. It should be understood that the opposite interpretation is also possible (lower value represents higher priority).

Each of the SL DRX configurations for the UE may be configured with parameters, such as drx-onDurationTimerSL, drx-InactivityTimerSL, drx-RetransmissionTimerTXSL, drx-RetransmissionTimerRXSL, drx-LongCycleStartOffsetSL, drx-ShortCycleSL, drx-SlotOffsetSL, drx-HARQ-RTT-TimerRXSL, drx-HARQ-RTT-TimerTXSL or drx-ShortCycleTimerSL. It is contemplated here and throughout that many of the parameters or conditions may not be required.

drx-onDurationTimerSL: the duration at the beginning of a SL DRX Cycle;

drx-InactivityTimerSL: the duration after the PSCCH occasion in which a SCI/PSCCH indicates a new SL transmission for the MAC entity. The SL transmission occurring on one of the SL connections that is impacted by the SL DRX configuration. The value of these timers may depend on the sidelink service or service type. For example, some services may require continuous reception for a burst of sidelink traffic. These services may have a longer drx-InactivityTimerSL. Note that if the SL connection is configured with a fixed number of HARQ retransmissions, the drx-InactivityTimerSL may include the time to receive all retransmissions drx-SlotOffsetSL: the delay before starting the drx-onDurationTimerSL;

drx-RetransmissionTimerRXSL: (per SL HARQ process) the maximum duration until a SL retransmission is received. This time may be quite variable on the SL, as the retransmissions from a peer UE depend on how the peer UE is performing scheduling. In some cases, this timer should be very large as the UE would need to wait for the peer UE to schedule the retransmission. In other cases, the retransmissions from the peer UE may be prioritized and the timer may be much shorter;

drx-RetransmissionTimerTXSL: (per SL HARQ process) the maximum duration until a grant for SL retransmission is received or the maximum duration until HARQ feedback for the SL retransmission is received;

drx-HARQ-RTT-TimerRXSL (per SL HARQ process): the minimum duration before a SL assignment for HARQ retransmission is expected by the MAC entity;

drx-HARQ-RTT-TimerTXSL (per SL HARQ process): the minimum duration before a SL HARQ feedback is expected by the MAC entity.

drx-LongCycleStartOffsetSL: the Long DRX cycle and drx-StartOffsetSL which defines the duration of the long SL DRX cycle and may optionally define the subframe where the Long and Short DRX Cycle starts;

drx-ShortCycleSL (optional): the Short DRX cycle;

drx-ShortCycleTimerSL (optional): the duration the UE shall follow the Short DRX cycle.

For some SL DRX models, the drx-StartOffsetSL may be configured (as part of the drx-LongCycleStartOffsetSL parameter), for example from a peer UE or from the serving cell. For other SL DRX models, the drx-StartOffsetSL may be based on some (pre)provisioned of (pre) configured knowledge at the UE. Some examples of this knowledge are descried herein.

In an example, if the SL DRX group relies on a SL DRX model that is per SL service or service type, the drx-StartOffsetSL may be based on the service ID. The service ID is known to all UEs involved in the SL communication.

In an example, if the SL DRX group relies on a SL DRX model that is per frequency, the drx-StartOffsetSL may be based on a frequency ID. The frequency ID may be some pre-configured or standardized ID associated with the frequency, or it may be the NR-ARFCN. The frequency ID is known to all UEs involved in the SL communication.

In an example, if the SL DRX group relies on a SL DRX model that is per geographic area, the drx-StartOffsetSL may be based on a Zone ID. The Zone ID is known to all UEs involved in the SL communication.

In an example, if the SL DRX group relies on a SL DRX model that is per resource pool, the drx-StartOffsetSL may be based on a resource pool ID. The resource pool ID may be some pre-configured or standardized ID associated with the resource pool, or it may be the SL-ResourcePoolID. The resource pool ID is known to all UEs involved in the SL communication.

In an example, if the SL DRX group relies on a SL DRX model that is per BWP, the drx-StartOffsetSL may be based on a BWP ID. The BWP ID may be some pre-configured or standardized ID associated with the bandwidth, or it may be the SL-ResourcePoolID. The BWP ID is known to all UEs involved in the SL communication.

In an example, if the SL DRX group relies on a SL DRX model that is per cast type, the drx-StartOffsetSL may be based on a cast type ID. The cast type ID may be some pre-configured or standardized ID associated with the cast type. The cast type ID is known to all UEs involved in the SL communication.

Each of the SL DRX configuration parameters may be defined independently per SL DRX group, or alternatively they may be shared by a number of SL DRX groups. In one preferred alternative, a UE may have multiple SL DRX groups. Some of these groups may have their independent SL DRX configurations and the SL DRX operation on these groups is not impacted by SL activity on another group. Other groups may have linked SL DRX configurations. For example, two SL DRX groups may be modelled as per frequency. These two SL DRX groups may share the same SL DRX cycle and have aligned wake-up times, but the two SL DRX configurations may have different drx-onDurationTimerSL and drx-InactivityTimerSL timers.

For some SL DRX groups, the SL DRX configuration timers may be scaled. For example, the drx-RetransmissionTimerRXSL and the drx-HARQ-RTT-TimerRXSL may be scaled depending on whether SL feedback is associated with the HARQ process and on the priority of the SL data carried for the HARQ process (the priority may correspond to the highest priority SL traffic carried in the transport block). Examples of scaling rules are included herein.

In an example, if no feedback is expected for a transport block, both drx-RetransmissionTimerRXSL and the drx-HARQ-RTT-TimerRXSL may be set to 0.

In an example, if the priority value of the SL traffic is below a threshold, its retransmissions may be prioritized, and the drx-RetransmissionTimerRXSL may be scaled down by a configured factor (sl_RetransmissionTimerScale). Note that this assumes that lower values represent higher priority. Alternatively, if the lower values represent lower priorities, then the check should be if the priority value of the SL traffic is above a threshold. The threshold(s) may be predefined, (pre-)configured or indicated.

In an example, if the range between TX UE and RX UE is above a threshold, the drx-HARQ-RTT-TimerRXSL may be scaled up by a configured factor (sl_HARQ-RTT-TimerScale) to take into account potential longer RTT.

In an example, if the measured traffic load is high, this may suggest that the scheduling of the retransmissions may be delayed. In such a case, the drx-RetransmissionTimerRXSL may be scaled up by a configured factor (sl_RetransmissionTimerScale) to allow for the increased scheduling latency. The measured traffic load may be based on the measured SL channel occupancy, channel busy ratio, channel usage ratio or the like.

UE 201 may execute each configured SL DRX configuration. For each configuration, UE 201 follows the rules below. Each configuration impacts a number of sidelink communications, depending on the selected DRX model. Some examples of these are described in Table 2.

TABLE 2

Impacted Sidelinks per DRX Model

| DRX Model | Impacted sidelink communications |
|---|---|
| Per destination | All sidelink communications |
| Per source/destination pair | Only sidelink communications from the given source |
| Per service type | Only sidelink communications of the given service type |
| Per cast type | Only sidelink communications of the given cast type |

When UE 201 is in the active time for one of these configurations, UE 201 monitors sidelink activity on the impacted sidelink connections to extend the active time based on the configured parameters. The active time is also impacted by transmissions from UE 201 on the impacted sidelink communications, as well as scheduling grants from the serving cell or controlling/scheduling entity 207 for the impacted sidelink communications. A first example of a detailed procedure is described below in Table 3.

In a first example, when SL DRX is configured, the MAC entity shall:

TABLE 3

1> if a SL DRX Command MAC CE or a Long DRX Command MAC CE is received from the enrity that configures the SL DRX:
   2> stop drx-onDurationTimerSL;
   2> stop drx-InactivityTimerSL.
1> if drx-Inactivity TimerSL expires or a SL DRX Command MAC CE is received from the enrity that configures the SL DRX:
   2> if the Short SL DRX cycle is configured:
      3> start or restart drx-ShortCycleTimerSL in the first symbol after the expiry of drx-InactivityTimerSL or in the first symbol after the end of SL DRX Command MAC CE reception;
      3> use the Short SL DRX Cycle.
   2> else:
      3> use the Long SL DRX cycle.
1> if drx-ShortCycleTimerSL expires:
   2> use the Long SL DRX cycle.
1> if a Long SL DRX Command MAC CE is received:
   2> stop drx-ShortCycleTimerSL;
   2> use the Long SL DRX cycle.
1> if the Short SL DRX Cycle is used, and [(SFN x 10) + subframe number] modulo (drx-ShortCycleSL) = (drx-StartOffsetSL) modulo (drx-ShortCycleSL); or
1> if the Long DRX Cycle is used, and [(SFN x 10) + subframe number] modulo (drx-LongCycleSL) = drx-StartOffsetSL:
   2> start drx-onDurationTimerSL after drx-SlotOffsetSL from the beginning of the subframe.
1> if the MAC entity is in Active Time:
   2> monitor the PSCCH;
   2> if the PSCCH indicates a SL transmission:
      3> stop the drx-RetransmissionTimerSL for the corresponding HARQ process.
   2> if the PSCCH indicates a new SL transmission :
      3> start or restart drx-InactivityTimerSL in the first symbol after the end of the PSCCH reception.

A second example of a detailed procedure is described below in Table 4.

In second example, when a SL DRX cycle is configured, the Active Time for SL Communications in a SL DRX group includes the time while:

drx-onDurationTimerSL or drx-InactivityTimerSL configured for the SL DRX group is running; or drx-RetransmissionTimerRXSL or drx-RetransmissionTimerTXSL is running on SL communication in the SL DRX group; or UE issues a CSI request to a peer UE (for example via an indication through an SCI to the peer UE), and the MAC entity is waiting for the SL-CSI report (for example through a SL CSI MAC CE) from this peer UE. The CSI is pending until the UE receives a SL-CSI report from the peer UE, or a CSI request timer expires. The UE may start a timer (set to sl-LatencyBound-CSI-Report) when the CSI request is sent, and cancel the SL-CSI request if the timer expires.

In second example, when SL DRX is configured, the MAC entity shall:

TABLE 4

1>if a MAC PDU is received in a configured sidelink assignment:
   2>start the drx-HARQ-RTT-TimerRXSL for the corresponding SL HARQ process in the
      first symbol after the end of the corresponding transmission carrying the SL HARQ
      feedback;
   2>stop the drx-RetransmissionTimerRXSL for the corresponding SL HARQ process.
1>if a MAC PDU is transmitted in a configured sidelink grant:
   2>start the drx-HARQ-RTT-TimerTXSL for the corresponding SL HARQ process in the
      first symbol after the end of the first repetition of the corresponding PSSCH
      transmission;
   2>stop the drx-RetransmissionTimerTXSL for the corresponding SL HARQ process.
1>if a drx-HARQ-RTT-TimerRXSL expires:
   2>if the data of the corresponding HARQ process was not successfully decoded:
      3>start the drx-RetransmissionTimerRXSL for the corresponding HARQ process in
         the first symbol after the expiry of drx-HARQ-RTT-TimerRXSL.
1>if a drx-HARQ-RTT-TimerTXSL expires:
   2>start the drx-RetransmissionTimerSL for the corresponding HARQ process in the first
      symbol after the expiry of drx-HARQ-RTT-TimerSL.
1>if a SL DRX Command MAC CE or a SL Long DRX Command MAC CE is received:
   2>stop drx-onDurationTimerSL for each linked SL DRX group;
   2>stop drx-InactivityTimerSL for each linked SL DRX group.
1>if drx-InactivityTimerSL for a SL DRX group expires:
   2>if the Short DRX cycle is configured:
      3>start or restart drx-ShortCycleTimerSL for this DRX group in the first symbol after
         the expiry of drx-InactivityTimerSL;
      3>use the Short SL DRX cycle for this SL DRX group.
   2>else:
      3>use the Long SL DRX cycle for this SL DRX group.
1>if a SL DRX Command MAC CE is received:
   2>if the Short SL DRX cycle is configured:
      3>start or restart drx-ShortCycleTimerSL for each SL DRX group in the first symbol
         after the end of SL DRX Command MAC CE reception;
      3>use the Short SL DRX cycle for each linked SL DRX group.
   2>else:
      3>use the Long SL DRX cycle for each linked SL DRX group.
1>if drx-ShortCycleTimerSL for a SL DRX group expires:
   2>use the Long SL DRX cycle for this SL DRX group.
1>if a Long SL DRX Command MAC CE is received:
   2>stop drx-ShortCycleTimerSL for each linked SL DRX group;
   2>use the Long SL DRX cycle for each linked SL DRX group.
1>if the Short SL DRX cycle is used for a SL DRX group, and [(SFN × 10) + subframe
   number] modulo (drx-ShortCycleSL) = (drx-StartOffsetSL) modulo (drx-ShortCycleSL):
   2>start drx-onDurationTimerSL for this SL DRX group after drx-SlotOffsetSL from the
      beginning of the subframe.
1>if the Long SL DRX cycle is used for a SL DRX group, and [(SFN × 10) + subframe
   number] modulo (drx-LongCycleSL) = drx-StartOffsetSL modulo (drx-LongCycleSL):
   2>start drx-onDurationTimerSL for this SL DRX group after drx-SlotOffsetSL from the
      beginning of the subframe.
1>if a SL DRX group is in Active Time:
   2>monitor the SCI/PSCCH on the SL communications in this SL DRX group;
   2>if the SCI/PSCCH indicates a SL transmission:
      3>start the drx-HARQ-RTT-TimerRXSL for the corresponding HARQ process in the
         first symbol after the end of the corresponding transmission carrying the SL
         HARQ feedback;
      3>stop the drx-RetransmissionTimerRXSL for the corresponding HARQ process.
   2>if the MAC entity makes a SL transmission:
      3>start the drx-HARQ-RTT-TimerTXSL for the corresponding HARQ process in the
         first symbol after the end of the first repetition of the corresponding PSSCH
         transmission;
      3>stop the drx-RetransmissionTimerTXSL for the corresponding HARQ process.
   2>if the SCI/PSCCH indicates a new SL transmission on a SL communication in this SL
      DRX group or if the MAC entity makes a new SL transmission on a SL
      communication in this SL DRX group:
      3>start or restart drx-InactivityTimerSL for this SL DRX group in the first symbol
         after the end of the SCI/PSCCH reception (for the case SCI/PSCCH indicates a
         new SL transmission) or the first symbol after the corresponding PSSCH
         transmission (for the case MAC entity makes a new SL transmission).
   2>if a SL HARQ process receives feedback information and acknowledgement is
      indicated:
      3>stop the drx-RetransmissionTimerRXSL for the corresponding HARQ process.

Also for this second example, regardless of whether the MAC entity is monitoring SCI/PSCCH or not on the SL communications in a SL DRX group, the MAC entity transmits HARQ feedback, aperiodic CSI on PSSCH, on the SL communications in the SL DRX group when such is expected.

In a third example, the SL DRX configuration parameters are configured per resource pool. The resource pool has a set of slots that can be used for PSSCH transmission and/or reception. The SL DRX configuration marks some of these slots as OFF, so that they cannot be used for PSSCH transmission or reception. The UE knows the slots of the resource pool that remain for PSSCH transmission and/or reception and the UE may stop continuous reception outside of these slots.

In the three examples of procedures, the MAC entity need not monitor the SCI/PSCCH if it is not a complete PSCCH occasion (e.g. the Active Time starts or ends in the middle of a PSCCH occasion).

In the three examples of procedures, the equations to determine the start of the drx-onDurationTimerSL are based on subframes. As an alternative, these equations may also be based on slots. For example, the equations may be:

1> if the Short SL DRX cycle is used for a SL DRX group, and [(SFN×10)+slot number] modulo (drx-ShortCycleSL)=(drx-StartOffsetSL) modulo (drx-ShortCycleSL):
   2> start drx-onDurationTimerSL for this SL DRX group after drx-SlotOffsetSL from the beginning of the subframe.

1> if the Long SL DRX cycle is used for a SL DRX group, and [(SFN×10)+slot number] modulo (drx-LongCycleSL)=drx-StartOffsetSL modulo (drx-LongCycleSL):
   2> start drx-onDurationTimerSL for this SL DRX group after drx-SlotOffsetSL from the beginning of the subframe.

In the three examples of procedures the equations to determine the start of the drx-onDurationTimerSL are based on the parameter: drx-StartOffsetSL. This parameter may be configured as part of the SL DRX configuration. Alternatively, this parameter may be known to the UE based on the SL DRX model as described herein for various SL DRX models:

If SL DRX models is per destination UE: drx-StartOffsetSL=Destination ID (for example based on 5G-S-TMSI or C-RNTI)

If SL DRX models is per sidelink carrier frequency: drx-StartOffsetSL=Frequency ID (for example NR-ARFCN)

If SL DRX models is per sidelink bandwidth part: drx-StartOffsetSL=BWP ID

If SL DRX models is per resource pool: drx-StartOffsetSL=SL-ResourcePoolID

If SL DRX models is per Sidelink Service type: drx-StartOffsetSL=service ID (for example destination Layer 2 ID)

If SL DRX models is per cast type: drx-StartOffsetSL=cast type ID

If SL DRX models is per geographic area: drx-StartOffsetSL=Geographic Area ID (for example the Zone_ID)

In cases where the SL DRX model is a combined model, based on more than one of the above, the drx-StartOffsetSL should be unique for each potential combination of values of the combined model. For example, if the SL DRX model is based on Service as well as geographic area, then the drx-StartOffsetSL may be calculated as a function of service ID and Geographic Area ID. For example drx-StartOffsetSL=Zone_ID+(destination Layer 2 ID−1)*(maximum number of zones)

In addition, a base offset may be applied to all calculations for drx-StartOffsetSL above, using a drx-StartOffsetBaseSL. This drx-StartOffsetBaseSL may be obtained from the SL DRX configuration parameter drx-LongCycleStartOffsetSL.

In the above, the expression "monitor the SCI/PSCCH", "monitor the PSCCH" and "monitor the SCI" are used interchangeably. Similarly, the expression "SCI/PSCCH indicates a SL transmission" and "SCI indicates a SL transmission" and "PSCCH indicates a SL transmission" are used interchangeably. They refer to the process whereby the UE monitors the transmissions on the SL communications (for the SL communications of a SL DRX group) and determine whether the SL transmission is destined for this UE. The UE may have one or more source Layer 2 IDs and one or more destination layer 2 IDs. These layer 2 IDs have 2 parts: K Most-Significant-Bits (MSBs) and 24-K Least-Significant-Bits (LSBs) (where K can be 8 or 16). For unicast transmissions, the two peer UEs exchange their Layer 2 IDs during link establishment. Unicast transmissions are from a specific source Layer 2 ID to a specific destination layer 2 ID. Groupcast transmissions are to a destination Layer 2 ID. UE determines the destination Layer-2 ID based on configuration of the mapping between V2X service type and Layer-2 ID. Broadcast transmissions are also to a destination Layer 2 ID. The UE is configured with the destination Layer-2 ID(s) to be used for V2X services.

SCI indicates if there is a transmission on SL-SCH and provides the relevant HARQ information. A SCI consists of two parts: the 1st stage SCI on PSCCH and the 2nd stage SCI on PSSCH. The SCI carries a Source ID and Destination ID. The Source ID and the Destination ID may be carried in the 1st stage SCI on PSCCH or the 2nd stage SCI on PSSCH. These IDs correspond to the LSBs of the Layer 2 IDs and may be thought as PHY layer identifier of the source of the SL transmission and the PHY layer identifier of the destination of the SL transmission, respectively. The MSBs of the Layer 2 IDs are carried in the SL-SCH MAC subheader of the MAC PDU. The MSB of the layer 2 ID of the source of the SL transmission is carried in the SRC subheader while the MSB of the layer 2 ID of the destination of the SL transmission is carried in the DST subheader.

The determination of whether a SL transmission is destined for this UE may be made at a UE by checking if information carried in the SL transmission matches information known to the UE, as described in the alternatives herein.

In an alternative, if unicast transmission, the Source ID and Destination ID in the SCI matches the LSBs of the Layer 2 IDs maintained by the UE for this unicast communication. For example, the 16 LSB of any Source Layer-2 ID of the UE are equal to the Destination ID in the corresponding SCI, and the 8 LSBs of any Destination Layer-2 ID of the UE are equal to the Source ID in the corresponding SCI.

In an alternative, if unicast transmission, the DST field of the decoded MAC PDU subheader is equal to the 8 MSB of any of the Source Layer-2 ID(s) of the UE for which the 16 LSB are equal to the Destination ID in the corresponding SCI, and the SRC field of the decoded MAC PDU subheader is equal to the 16 MSB of any of the Destination Layer-2 ID(s) of the UE for which the 8 LSB are equal to the Source ID in the corresponding SCI.

In an alternative, if groupcast transmission, the 16 LSBs of any destination Layer 2 IDs are equal to the Destination ID in the corresponding SCI.

In an alternative, if groupcast transmission, the DST field of the decoded MAC PDU subheader is equal to the 8 MSB of any of the Destination Layer-2 ID(s) of the UE for which the 16 LSB are equal to the Destination ID in the corresponding SCI.

In an alternative, if broadcast transmission, the 16 LSBs of any destination Layer 2 IDs are equal to the Destination ID in the corresponding SCI.

In an alternative, if groupcast transmission, the DST field of the decoded MAC PDU subheader is equal to the 8 MSB of any of the Destination Layer-2 ID(s) of the UE for which the 16 LSB are equal to the Destination ID in the corresponding SCI.

In an alternative, if the UE knows that a SL communication will occur in a certain PSSCH duration, and the UE has a valid SCI for this PSSCH duration. For resource allocation mode 1, the UE may know the peer UE has a dynamic or configured grant for the PSCCH duration, for transmission to the UE. For resource allocation mode 2, the UE may know that a peer UE has reserved the PSSCH duration for transmission to the UE.

SL DRX Configuration parameters are described below in Table 5.

A UE may obtain a SL DRX configuration through one or more of the following mechanisms: the configuration may be (pre)provisioned; the configuration may be (pre)configured, the configuration may be provided through system information from a serving cell; the configuration may be provided through dedicated signaling from a serving cell; the configuration may be provided through dedicated signaling from a peer UE (through PC5-RRC exchanges, through MAC CE signalling, or through PHY layer signalling (for example through SCI)).

In addition, it is possible that the SL DRX configurations for a UE comes from different mechanisms. For example, a UE may be involved in SL broadcast communication, which

TABLE 5

| SL DRX Configuration parameters | |
|---|---|
| drx-InactivityTimerSL | SL Inactivity Timer for DRX. Value in number of slots, sub-frames, or msec |
| drx-onDuration TimerSL | Duration of the ON period of the DRX cycle. Value in number of slots, sub-frames, or msec. |
| drx-Retransmission TimerRXSL | Timer for DRX denoting the maximum duration until a SL retransmission is received. Value in number of slots, sub-frames, or msec |
| drx-Retransmission TimerTXSL | Timer for DRX denoting the maximum duration until a grant for SL retransmission is received or the maximum duration until HARQ feedback for the SL retransmission is received. Value in number of slots, sub-frames, or msec |
| drx-Retransmission TimerSL | Timer for DRX. Value in number of slots, sub-frames, or msec. May represent either the drx-RetransmissionTimerRXSL or drx-RetransmissionTimerTXSL |
| drx-HARQ-RTT-TimerRXSL | The minimum duration before a SL assignment for HARQ retransmission is expected by the MAC entity. This timer is per SL HARQ process |
| drx-HARQ-RTT-TimerTXSL | The minimum duration before a SL HARQ feedback is expected by the MAC entity. This timer is per SL HARQ process |
| drx-HARQ-RTT-TimerSL | Timer for DRX. Value in number of slots, sub-frames, or msec. May represent either the drx-HARQ-RTT-TimerRXSL or drx-HARQ-RTT-TimerTXSL |
| drx-LongCycleStartOffsetSL | drx-longCycleSL and drx-StartOffsetSL or drx-StartOffsetBaseSL.. The value of drx-LongCycleSL is in number of slots, sub-frames, or msec. If drx-ShortCycleTimerSL is configured, the value of drx-LongCycleSL shall be a multiple of drx-ShortCycleTimerSL value. The value of drx-StartOffsetSL or drx-StartOffsetBaseSL is in number of sub-frames. |
| drx-ShortCycleSL | Short DRX cycle. Value in number of slots, sub-frames, or msec |
| drx-ShortCycleTimerSL | Timer for DRX. Value in multiples of drx-shortCycleSL. A value of 1 corresponds to drx-shortCycleSL, a value of 2 corresponds to 2 * drx-shortCycleSL and so on. |
| drx-SlotOffsetSL | The delay before starting the drx-onDurationTimerSL |
| drx-PrioritySL | The priority of the SL DRX configuration. May be based on the traffic type. For example, drxPrioritySL may be equivalent to the priority of the traffic with the highest priority carried in all the SL communications impacted by the SL DRX configuration. For example, if 3 SL communications are impacted by current SL DRX configuration, the drx-PrioritySL may be equivalent to the highest traffic priority carried in each of the 3 SL communications. Alternatively, the priority may be determined based on the entity generating the SL DRX configuration. Some entities may have a higher priority. For example, a platoon leader may have a higher priority for its SL DRX configuration. This priority may be used to scale the drx-RetransmissionTimerRXSL timer. | has the SL DRX configuration provided through pre-provisioning, as well as a SL unicast communication, which has the SL DRX configuration provided through dedicated signaling with the peer UE.

A typical IE: SL-DRX-Config is shown in Table 6:

Approaches to Issue 4: SL Communications Impact on Uu

SL communication may also have an impact on the Uu DRX operation. The Uu DRX will cycle through a number of Active (ON) times or OFF times. The Active time may be defined to allow UE 201 to be monitoring the PDCCH when

TABLE 6

```
SL-DRX-Config ::=                   SEQUENCE {
    drx-onDurationTimerSL               CHOICE {
                            subMilliSeconds INTEGER (1..31),
                            milliseconds ENUMERATED {
                                ms1, ms2, ms3, ms4, ms5, ms6, ms8, ms10, ms20, ms30, ms40,
ms50,
                                ms60, ms80, ms100, ms200, ms300, ms400, ms500, ms600,
ms800,
                                ms1000, ms1200,ms1600, spare8, spare7, spare6, spare5,
spare4,
                                            spare3, spare2, spare1 }
                        },
    drx-InactivityTimerSL               ENUMERATED {
                            ms0, ms1, ms2, ms3, ms4, ms5, ms6, ms8, ms10, ms20, ms30,
ms40,
                                        ms50, ms60, ms80, ms100, ms200, ms300, ms500,
ms750, ms1280,
                                        ms1920, ms2560, spare9, spare8,spare7, spared, spare5,
spare4,
                                        spare3, spare2, spare1},
    drx-HARQ-RTT-TimerRXSL                  INTEGER (0..56),
    drx-HARQ-RTT-TimerTXSL                  INTEGER (0..56),
    drx-RetransmissionTimerRXSL             ENUMERATED {
                            sl0, sl1, sl2, sl4, sl6, sl8, sl16, sl24, sl33, sl40, sl64, sl80,
                                        sl96, sll112, sl128,sl160, sl320, spare15, spare14,
spare13,
                                        spare12, spare11, spare10, spare9, spare8, spare7,
spare6, spare5,
                                        spare4, spare3, spare2, spare1},
    drx-RetransmissionTimerTXSL             ENUMERATED {
                            sl0, sl1, sl2, sl4, sl6, sl8, sl16, sl24, sl33, sl40, sl64, sl80,
                                        sl96, sll112, sl128, sl160, sl320, spare15, spare14,
spare13,
                                        spare12, spare11, spare10, spare9, spare8, spare7,
spare6, spare5,
                                        spare4, spare3, spare2, spare1 },
    drx-LongCycleStartOffsetSL              CHOICE {
        ms10                    INTEGER(0..9),
        ms20                    INTEGER(0..19),
        ms32                    INTEGER(0..31),
        ms40                    INTEGER(0..39),
        ms60                    INTEGER(0..59),
        ms64                    INTEGER(0..63),
        ms70                    INTEGER(0..69),
        ms80                    INTEGER(0..79),
        ms128                    INTEGER(0..127),
        ms160                    INTEGER(0..159),
        ms256                    INTEGER(0..255),
        ms320                    INTEGER(0..319),
        ms512                    INTEGER(0..511),
        ms640                    INTEGER(0..639),
        ms1024                    INTEGER(0..1023),
        ms1280                    INTEGER(0..1279),
        ms2048                    INTEGER(0..2047),
        ms2560                    INTEGER(0..2559),
        ms5120                    INTEGER(0..5119),
        ms10240                     INTEGER(0..10239)
    },
    shorDRXSL                   SEQUENCE {
    drx-ShortCycleSL                    ENUMERATED {
                            ms2, ms3, ms4, ms5, ms6, ms7, ms8, ms10, ms14, ms16, ms20,
                                        ms30, ms32,ms35, ms40, ms64, ms80, ms128,
                                        ms160,
ms256, ms320,
                                        ms512, ms640, spare9, spare8, spare7, spare6,
spare5, spare4,
                                            spare3, spare2, spare1 },
    drx-ShortCycleTimerSL               INTEGER (1..16)
    }                                           OPTIONAL, --NeedR
    drx-SlotOffsetSL                INTEGER (0..31),
    drx-PrioritySL                  INTEGER (0..31)
``` downlink traffic is most expected. However, the current definition of active time should take into account Uu activities that occur as a result of what is happening on sidelink. This may include the following sidelink related Uu activities: 1) transmission of a sidelink Scheduling Request; 2) transmission of a sidelink buffer status report; or 3) transmission of a sidelink HARQ, among other things.

In addition, it is disclosed that a UE using Uu DRX, should restart its Uu drx_InactivityTimer when it receives a PDCCH including a sidelink grant (dynamic or configured).

Exemplary changes to the Uu DRX procedure are shown in the following text:

The MAC entity may be configured by RRC with a DRX functionality that controls the UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213.

RRC controls DRX operation by configuring the following parameters:

drx-onDurationTimer the duration at the beginning of a DRX Cycle;

drx-SlotOffset: the delay before starting the drx-onDurationTimer;

drx-InactivityTimer: the duration after the PDCCH occasion in which a PDCCH indicates a new UL or DL transmission for the MAC entity;

drx-RetransmissionTimerDL (per DL HARQ process except for the broadcast process): the maximum duration until a DL retransmission is received;

drx-RetransmissionTimerUL (per UL HARQ process): the maximum duration until a grant for UL retransmission is received;

drx-LongCycleStartOffset: the Long DRX cycle and drx-StartOffset which defines the subframe where the Long and Short DRX Cycle starts;

drx-ShortCycle (optional): the Short DRX cycle;

drx-ShortCycleTimer (optional): the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity.

When a DRX cycle is configured, the Active Time includes the time while:

drx-onDurationTimer or drx-InactivityTimer or drx-RetransmissionTimerDL or drx-RetransmissionTimerUL or ra-ContentionResolutionTimer (as described in clause 5.1.5) is running; or a Scheduling Request is sent on PUCCH and is pending (as described in clause 5.4.4); or a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4); or a Sidelink Scheduling Request is sent on PUCCH and is pending; or a Sidelink Buffer Status Report has been triggered and sent and this Sidelink BSR has not cancelled; or a Sidelink HARQ feedback has been sent to the gNB indicating a failed (NACK or DTX) Sidelink transmission, and no sidelink grant has been received for retransmission When DRX is configured, the MAC entity shall perform the following as provided in Table 7.

TABLE 7

1>if a MAC PDU is received in a configured downlink assignment:
  2>start the drx-HARQ-RTT-TimerDL for the corresponding HARQ process in the first symbol after the end of the corresponding transmission carrying the DL HARQ feedback;
  2>stop the drx-RetransmissionTimerDL for the corresponding HARQ process.
1>if a MAC PDU is transmitted in a configured uplink grant:
  2>start the drx-HARQ-RTT-TimerUL for the corresponding HARQ process in the first symbol after the end of the first repetition of the corresponding PUSCH transmission;
  2>stop the drx-RetransmissionTimerUL for the corresponding HARQ process.
1>if a drx-HARQ-RTT-TimerDL expires:
  2>if the data of the corresponding HARQ process was not successfully decoded:
    3>start the drx-RetransmissionTimerDL for the corresponding HARQ process in the first symbol after the expiry of drx-HARQ-RTT-TimerDL.
1>if a drx-HARQ-RTT-TimerUL expires:
  2>start the drx-RetransmissionTimerUL for the corresponding HARQ process in the first symbol after the expiry of drx-HARQ-RTT-TimerUL.
1>if a DRX Command MAC CE or a Long DRX Command MAC CE is received:
  2>stop drx-onDurationTimer;
  2>stop drx-InactivityTimer.
1>if drx-InactivityTimer expires or a DRX Command MAC CE is received:
  2>if the Short DRX cycle is configured:
    3>start or restart drx-ShortCycleTimer in the first symbol after the expiry of drx-InactivityTimer or in the first symbol after the end of DRX Command MAC CE reception;
    3>use the Short DRX Cycle.
  2>else:
    3>use the Long DRX cycle.
1>if drx-ShortCycleTimer expires:
  2>use the Long DRX cycle.

TABLE 7-continued

1>if a Long DRX Command MAC CE is received:
  2>stop drx-ShortCycleTimer,
  2>use the Long DRX cycle.
1>if the Short DRX Cycle is used, and [(SFN x 10) + subframe number] modulo
  (drx-ShortCycle) = (drx-StartOffset) modulo (drx-ShortCycle); or
1>if the Long DRX Cycle is used, and [(SFN x 10) + subframe number] modulo
  (drx-LongCycle) = drx-StartOffset
  2>start drx-onDurationTimer after drx-SlotOffset from the beginning of the
    subframe.
1>if the MAC entity is in Active Time:
  2>monitor the PDCCH as specified in TS 38.213;
  2>if the PDCCH indicates a DL transmission:
    3>start the drx-HARQ-RTT-TimerDL for the corresponding HARQ process in
      the first symbol after the end of the corresponding transmission carrying
      the DL HARQ feedback;
    3>stop the drx-RetransmissionTimerDL for the corresponding HARQ
      process.
  2>if the PDCCH indicates a UL transmission:
    3>start the drx-HARQ-RTT-TimerUL for the corresponding HARQ process in
      the first symbol after the end of the first repetition of the corresponding
      PUSCH transmission;
    3>stop the drx-RetransmissionTimerUL for the corresponding HARQ
      process.
  2>if the PDCCH indicates a new transmission (DL or UL or SL):
    3>start or restart drx-InactivityTimer in the first symbol after the end of the
      PDCCH reception.
1>in current symbol n, if the MAC entity would not be in Active Time considering
  grants/assignments/DRX Command MAC CE/Long DRX Command MAC CE
  received and Scheduling Request sent until 4 ms prior to symbol n when
  evaluating all DRX Active Time conditions as specified in this clause:
  2>not transmit periodic SRS and semi-persistent SRS defined in TS 38.214;
  2>not report CSI on PUCCH and semi-persistent CSI on PUSCH.
1>if CSI masking (csi-Mask) is setup by upper layers:
  2>in current symbol n, if drx-onDurationTimer would not be running
    considering grants/assignments/DRX Command MAC CE/Long DRX
    Command MAC CE received until 4 ms prior to symbol n when evaluating all
    DRX Active Time conditions as specified in this clause:
    3>not report CSI on PUCCH.

Regardless of whether the MAC entity is monitoring PDCCH or not, the MAC entity transmits HARQ feedback, aperiodic CSI on PUSCH, and aperiodic SRS defined in TS 38.214 when such is expected.

The MAC entity needs not to monitor the PDCCH if it is not a complete PDCCH occasion (e.g. the Active Time starts or ends in the middle of a PDCCH occasion).

For some other SL communications, they may require that UE 201 maintain a Uu connection to its serving cell. For example, a sidelink communication may require low latency on the Uu connection for its resource allocation. It is disclosed that if UE 201 in RRC_IDLE or RRC_INACTIVE initiates one of these SL communications, this triggers UE 201 to move to RRC_CONNECTED mode on the Uu interface, and to stay in RRC_CONNECTED mode as long as the SL communication is ongoing.

Approaches to Issue 5: Uu DRX Impact on SL Communications

Some SL communications may require that UE 201 maintain a Uu connection to its serving cell. For example, a sidelink communication may require a threshold low latency on the Uu connection for its resource allocation. A SL communication may be (pre-) configured with a Uu requirement. For example, this may be part of a SLRB configuration.

In one alternative the Uu DRX may be used to activate or deactivate SL communications. The SL communication remains active as long as the Uu interface is in the active mode. If the UE is in DRX on the Uu interface, then UE 201 will stop all SL processing on this SL communication. For example, UE 201 may stop monitoring SCI/PSCCH, UE 201 may stop monitoring discovery related messages, UE 201 may stop any SL transmissions.

Approaches to Issue 6: Uu DRX-SL DRX Interaction

In one option, it is expected that the Uu DRX operation and the SL DRX operation may be completely independent, with each running its own sets of timers, and with potentially non-overlapping ON times. This may lead to inefficiencies with respect to power savings. To maximize this power savings, the ON times of the Uu DRX and SL DRX should be synchronized. In the following, it is assumed that as part of this Uu DRX configuration, the serving cell also specifies a "Uu/SL DRX Option". This tells UE 201 how UE 201 is to deal with a simultaneous Uu DRX and SL DRX configuration. Various options are possible, such as 1) common DRX; 2) shared DRX, or 3) independent DRX.

Common DRX: one common DRX across the Uu and all SL communications.

Shared DRX: a shared DRX across the Uu and all SL communications. A shared DRX implies that the DRX across all interfaces is synchronized, for example having the start of the ON times synchronized.

Independent DRX: independent DRX or Uu and SL communications.

Figure 23A:
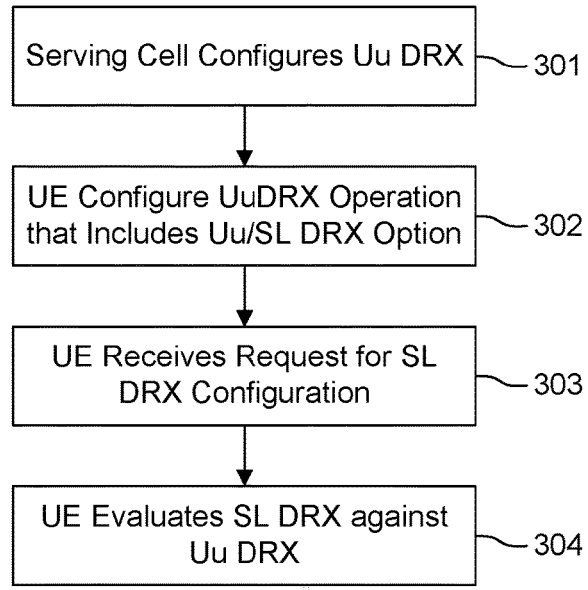
FIG. 23A illustrates an exemplary Uu DRX configured before SL DRX.

Case 1 as shown in FIG. 23A discloses subject matter associated with Uu DRX configured before SL DRX.

At step 301, Serving cell configures the Uu DRX for UE 201. This configuration includes the "Uu/SL DRX option".

At step 302, UE 201 configures its Uu DRX operation.

At step 303, UE 201 receives a request for a SL DRX configuration from a peer UE or from a Controlling/scheduling entity 207.

At step 304, UE 201 evaluates the SL DRX against the Uu DRX configuration. If Uu DRX configuration specifies a Common DRX, UE 201 responds to the requesting peer UE with the common DRX. If Uu DRX configuration specifies a Shared DRX, UE 201 responds to the requesting peer UE with the SL DRX configuration having start of the ON times synchronized. If Uu DRX configuration specifies an Independent DRX, UE 201 follows the procedure described in the section for (Re)Configuring SL DRX.

Figure 23B:
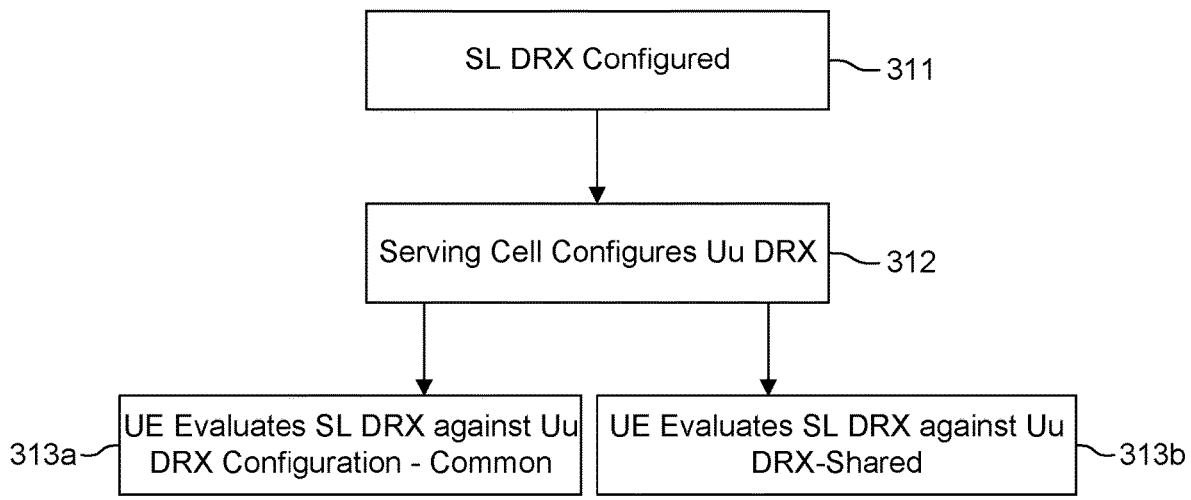
FIG. 23B illustrates an exemplary SL DRX configured before Uu DRX.

Case 2 as shown in FIG. 23B discloses subject matter associated with SL DRX configured before Uu DRX.

Step 310, UE 201 has a configured SL DRX, for one or more of its SL communications.

Step 311, Serving cell configures the Uu DRX for UE 201. This configuration includes the "Uu/SL DRX option".

Step 312a, UE 201 evaluates the SL DRX against the Uu DRX configuration. If Uu DRX configuration specifies a Common DRX, the UE determines all SL communications impacted by the common DRX, and notifies these about the common DRX Step 312b, UE 201 evaluates the SL DRX against the Uu DRX configuration. If Uu DRX configuration specifies a Shared DRX, then for each SL DRX configuration, UE 201 determines a new SL DRX configuration matching the shared DRX, determines all SL communications impacted by this new SL DRX configuration, and notifies these UEs about the new SL DRX configuration.

Approaches to Issue 7: How to Determine that RX UE has Extended it ACTIVE Time

Figure 4:
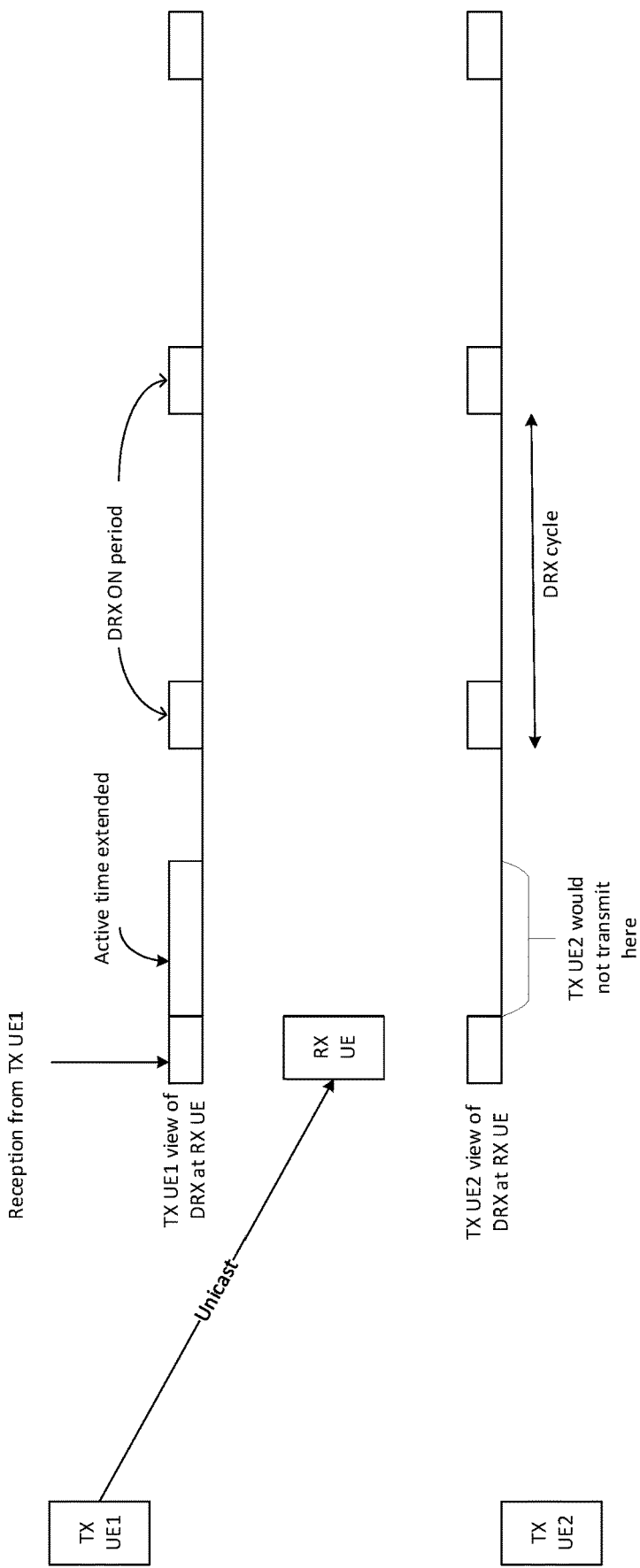
FIG. 4 illustrates an exemplary different view of SL DRX.

A RX UE in SL_Linked state may be communicating over the SL with a number of peer UEs that are sharing a SL DRX configuration. All the peer UEs may be aware of the SL DRX configuration, but they will not be aware when one of these peer UEs extends the active time of the RX UE. Multiple TX UEs (for example TX UE1 and TX UE2 as shown in FIG. 4) may be communicating over the SL to RX UE. The RX UE has a shared SL DRX configuration that is known to these multiple UEs. At time t1, TX UE1 sends SL traffic to RX UE during the SL DRX configuration active time. This causes the RX UE to extend its active time. TX UE1 may be aware that RX UE has extended its active period, and it may use this knowledge to further send SL traffic to the RX UE. However, TX UE2 is not aware that the RX UE has extended its active period and it is not able to take advantage of this active time to send SL traffic to the RX UE.

In a first alternative, a mechanism is proposed to allow the other TX UEs to know that a RX UE has extended its active time. The following mechanism may be used:

A TX UE may be made aware when a SL DRX configuration is shared (amongst a number of TX UEs)

The TX UE may monitor SL communications during the configured DRX active time. If the TX UE determines that the RX UE is scheduled, it may extend the active time for the RX UE.

In a second alternative, the active time extension is limited so as to not favor transmissions from only a single TX UE. For example, if a UE is involved with SL communications with multiple TX UEs, it may have a maximum as to how much it can extend the active time.

Figure 24:
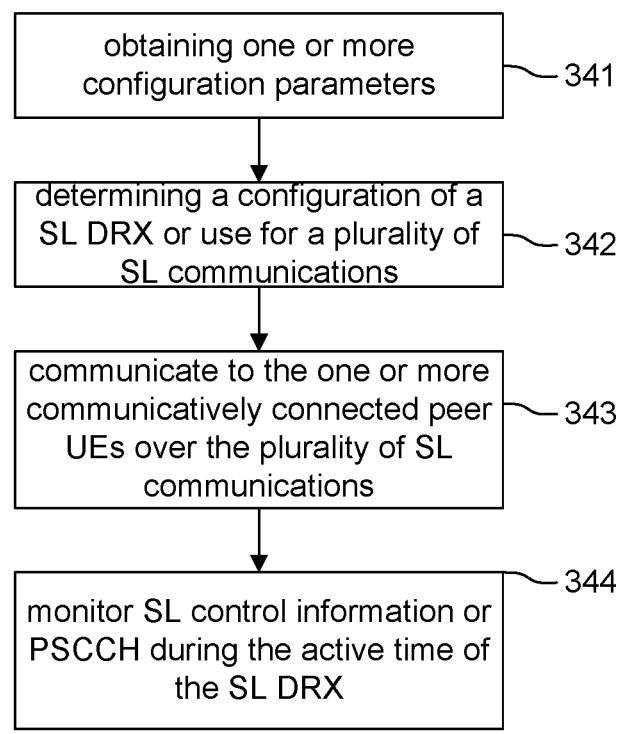
FIG. 24 illustrates an exemplary method associated with SL DRX.

FIG. 24 illustrates an exemplary method associated with SL DRX. At step 341, obtaining (e.g., receiving) one or more configuration parameters for an apparatus (e.g., a user equipment). The one or more configuration parameters may include an ON duration timer, an inactivity timer, a retransmission timer, a hybrid automatic repeat request (HARQ) round-trip-timer (RTT), a short discontinuous reception (DRX) cycle, a long DRX cycle, or a DRX priority. At step 342, determining a configuration of a sidelink (SL) DRX to use for a plurality of SL communications to one or more communicatively connected peer user equipments (UEs), wherein the configuration comprises the one or more configuration parameters. The determination may be based on trigger conditions associated with one or more thresholds for the configuration parameter. At step 343, in response to the configuration, the apparatus may communicate to the one or more communicatively connected peer UEs over the plurality of SL communications using the configuration for the SL DRX. The plurality of SL communication may be used at approximately the same time.

With continued reference to FIG. 24, methods, as described herein, may provide for situations in which UE acts as a RX UE; UE implicitly determines its DRX configuration (e.g., based on service); UE DRX configuration configured by a peer UE; UE DRX joins a SL groupcast/broadcast that is not using SL DRX and asks that the SL DRX be enabled for groupcast/broadcast; or UE DRX configuration configured by serving cell. For example, at step 344, the apparatus acts as a destination for one or more SL communications. In other words, some of the plurality of SL communications are for communications towards the apparatus (e.g., from one or more peer UEs). So the apparatus may act as a RX UE. The apparatus may monitor SL control information (SCI) or physical shared control channel (PSCCH) during the active time of the SL DRX. Other methods alone or combination are considered and disclosed herein.

Abbreviations and definitions are provided in Table 8 below.

TABLE 8

| Abbreviations and Definitions | |
|---|---|
| AR/VR | Augmented Reality/Virtual Reality |
| BWP | Bandwidth Part |
| CM | Connection Management |
| C-RNTI | Cell Radio-Network Temporary Identifier |
| DCI | Downlink Control Information |
| DL | Downlink |
| DRX | Discontinuous Reception |
| DST | Destination |
| EPC | Evolved Packet Core |
| eNB | Evolved Node B |
| gNB | NRNodeB |
| HARQ | Hybrid Automatic Repeat request |
| IC | In Coverage |
| IE | Information Element |
| IS | In-Sync |
| ITS-AID | Intelligent Transport Systems Application Identifier |
| LTE | Long Term Evolution |
| MAC | Medium Access Control |
| NR | New Radio |
| OCC | Out of Coverage |
| PDCCH | Physical Downlink Control Channel |
| P-RNTI | Paging RNTI |
| PSCCH | Physical Shared Control Channel |
| PSID | Provider Service Identifier |
| PUCCH | Physical Uplink Control Channel |
| PHY | Physical Layer |
| QoS | Quality of Service |
| RAN | Radio Access Network |
| RNTI | Radio Network Temporary Identifier |
| RRC | Radio Resource Control |
| RS | Reference Signal |
| RX | Receive |
| SCI | Sidelink Control Information |
| SFN | System Frame Number |
| SI | System Information |
| SL | SideLink |
| SLRB | Sidelink Radio Bearer |

TABLE 8-continued

Abbreviations and Definitions

| | |
|---|---|
| SRC | Source |
| UE | User Equipment |
| UL | Uplink |

Figure 25:
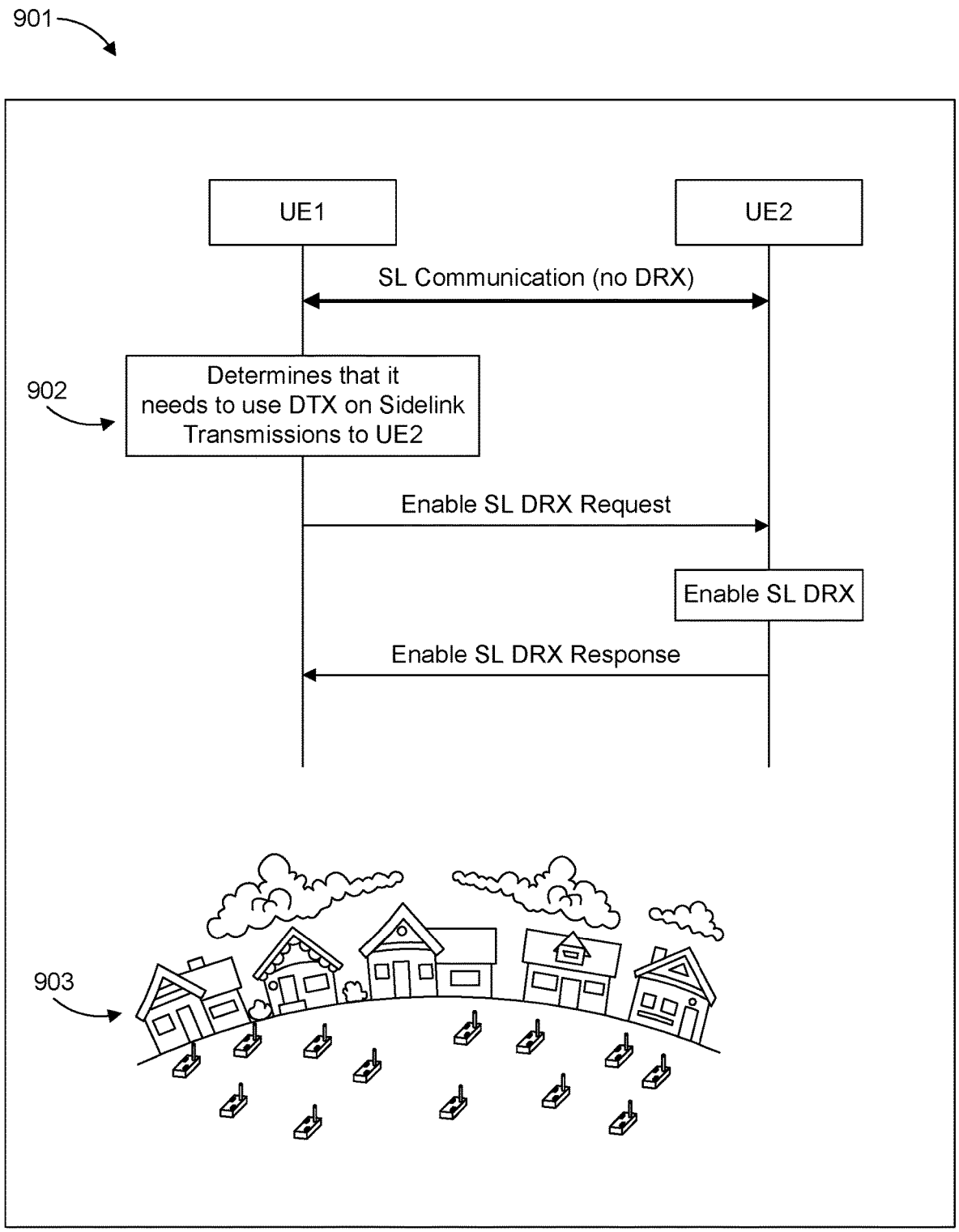
FIG. 25 illustrates an exemplary display (e.g., graphical user interface) that may be generated based on the methods, systems, and devices of NR sidelink discontinuous reception.

FIG. 25 illustrates an exemplary display (e.g., graphical user interface) that may be generated based on the methods, systems, and devices of NR sidelink discontinuous reception, as discussed herein. Display interface 901 (e.g., touch screen display) may provide text in block 902 associated with NR sidelink discontinuous reception, such as related parameters, method flow, and associated current conditions. Progress of any of the steps (e.g., sent messages or success of steps) discussed herein may be displayed in block 902. In addition, graphical output 902 may be displayed on display interface 901. Graphical output 903 may be the topology of the devices implementing the methods, systems, and devices of NR sidelink discontinuous reception, a graphical output of the progress of any method or systems discussed herein, or the like.

The 3rd Generation Partnership Project (3GPP) develops technical standards for cellular telecommunications network technologies, including radio access, the core transport network, and service capabilities-including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 26A:
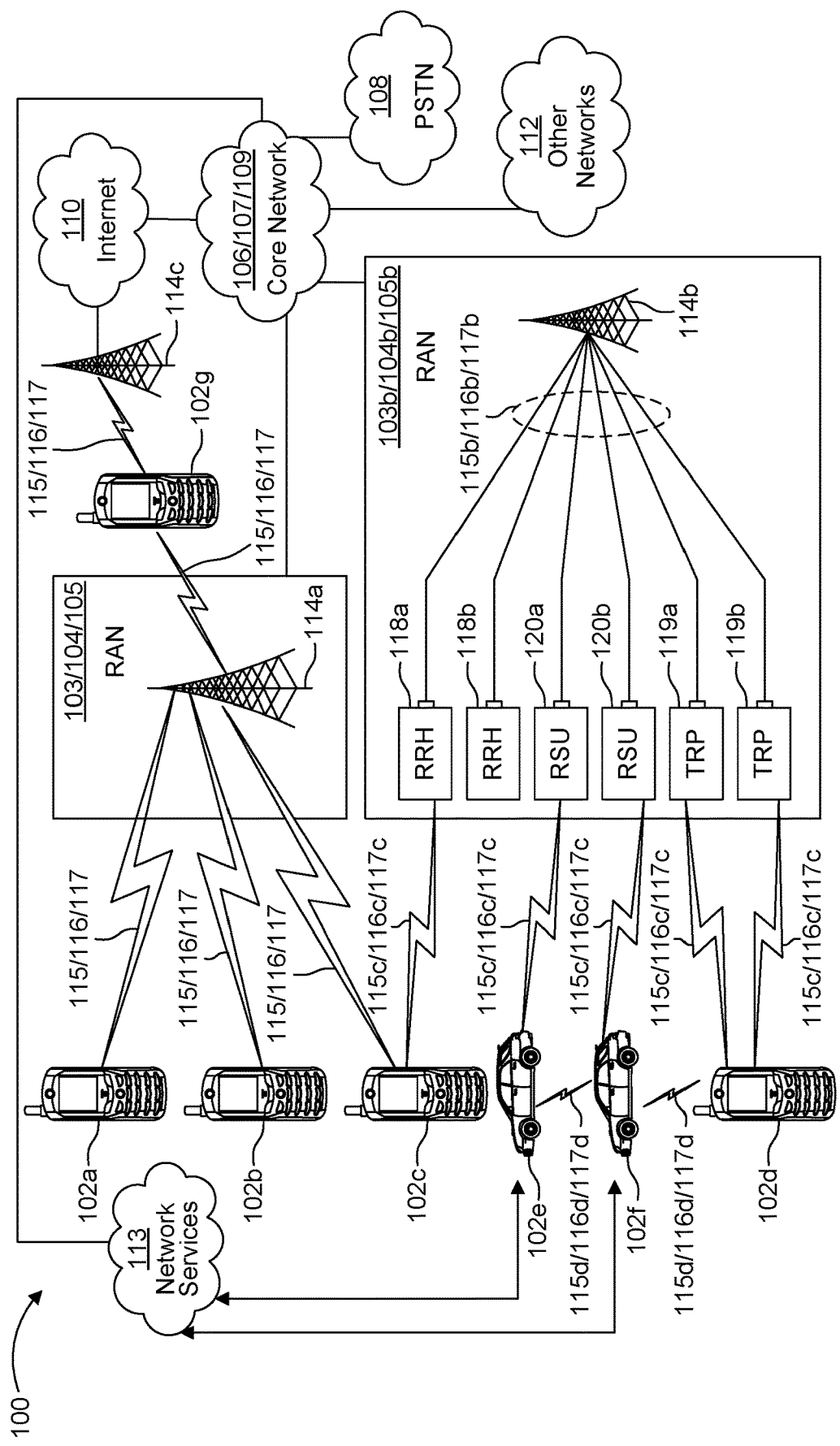
FIG. 26A illustrates an example communications system.

FIG. 26A illustrates an example communications system 100 in which the methods and apparatuses of NR sidelink discontinuous reception, such as the systems and methods illustrated in FIG. 1 through FIG. 25 described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 26A, FIG. 26B, FIG. 26C, FIG. 26D, FIG. 26E, or FIG. 26F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 26A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices of NR sidelink discontinuous reception, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/116d/117d, such as Sidelink communication, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 26A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of NR sidelink discontinuous reception, as disclosed herein. In an example, the base station 114c and the WTRUs 102, e.g., WTRU 102e, may implement a radio technology such as IEEE 802.11 to establish a wireless local area network (WLAN). similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 26A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 26A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices of NR sidelink discontinuous reception, as disclosed herein. For example, the WTRU 102g shown in FIG. 26A may be configured to communicate with the base station 114a, which may employ a cellular-based radio technology, and with the base station 114c, which may employ an IEEE 802 radio technology.

Although not shown in FIG. 26A, it will be appreciated that a User Equipment may make a wired connection to a gateway. The gateway may be a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 26B:
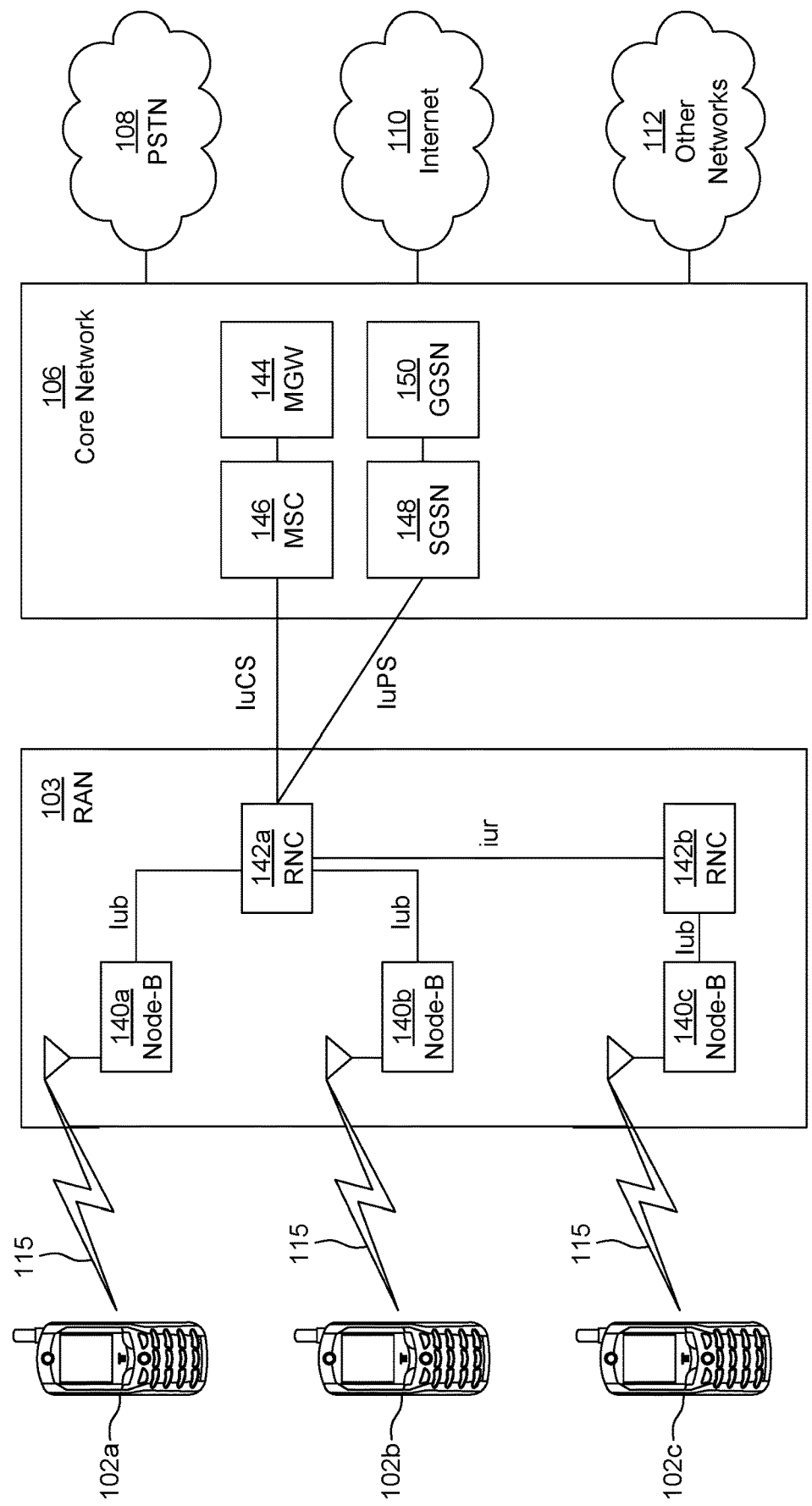
FIG. 26B illustrates an exemplary system that includes RANs and core networks.

FIG. 26B is a system diagram of an example RAN 103 and core network 106 that may implement methods, systems, and devices of NR sidelink discontinuous reception, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 26B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 26B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 26B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 26C:
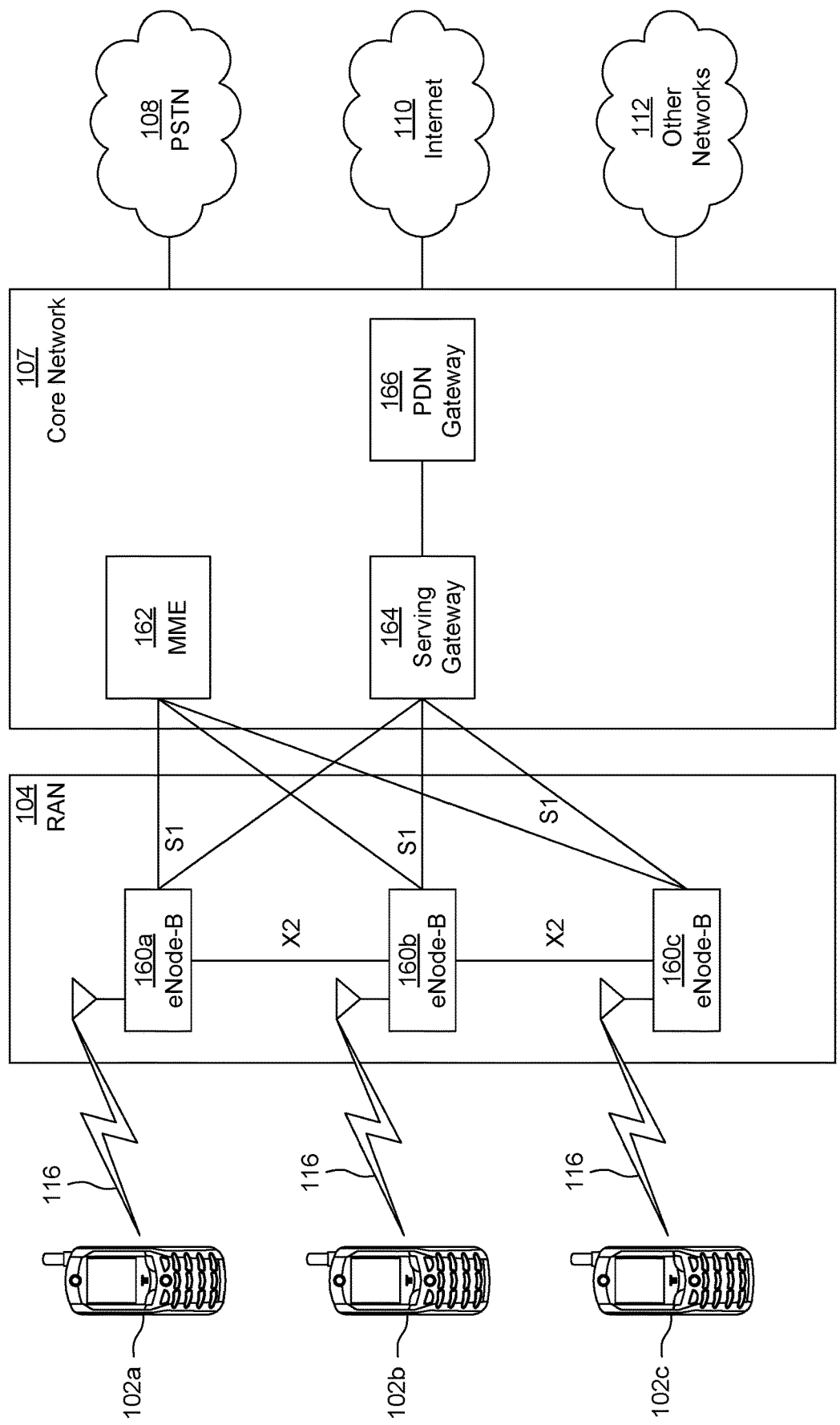
FIG. 26C illustrates an exemplary system that includes RANs and core networks.

FIG. 26C is a system diagram of an example RAN 104 and core network 107 that may implement methods, systems, and devices of NR sidelink discontinuous reception, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 26C, the eNode-Bs 160a, 160b, and 160c may communicate with one another over an X2 interface.

The core network 107 shown in FIG. 26C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 26D:
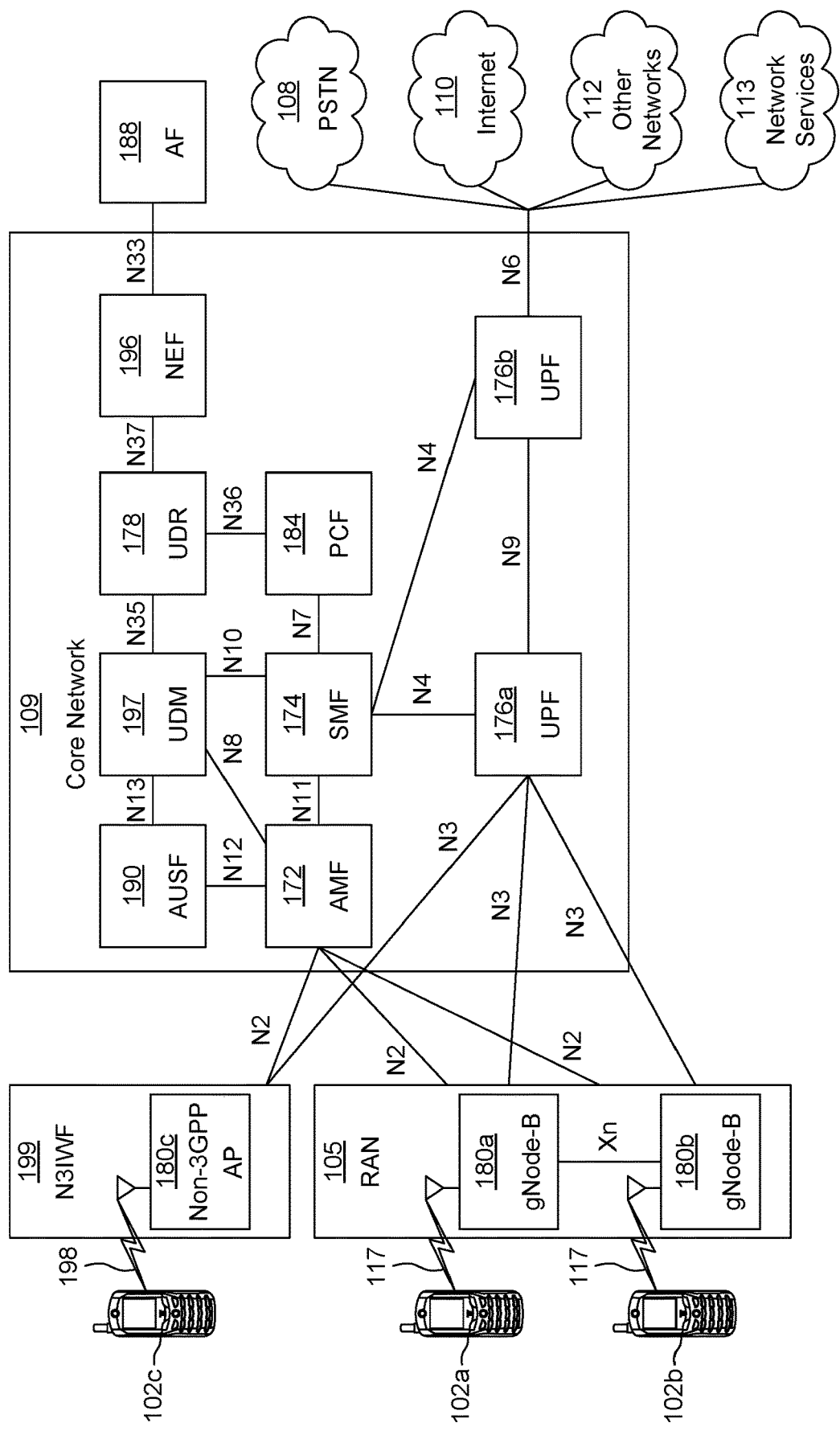
FIG. 26D illustrates an exemplary system that includes RANs and core networks.

FIG. 26D is a system diagram of an example RAN 105 and core network 109 that may implement methods, systems, and devices of NR sidelink discontinuous reception, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 26D, the gNode-Bs 180a and 180b may communicate with one another over an Xn interface, for example.

The core network 109 shown in FIG. 26D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 26G.

In the example of FIG. 26D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 26D shows that network functions directly connect to one another, however, it should be appreciated that they may communicate via routing agents such as a diameter routing agent or message buses.

In the example of FIG. 26D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 26D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 26D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 26D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 26A, FIG. 26C, FIG. 26D, or FIG. 26E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 26A, FIG. 26B, FIG. 26C, FIG. 26D, or FIG. 26E are provided by way of example only, and it is understood that the subject matter disclosed and claimed herein may be embodied or implemented in any similar communication system, whether presently defined or defined in the future.

Figure 26E:
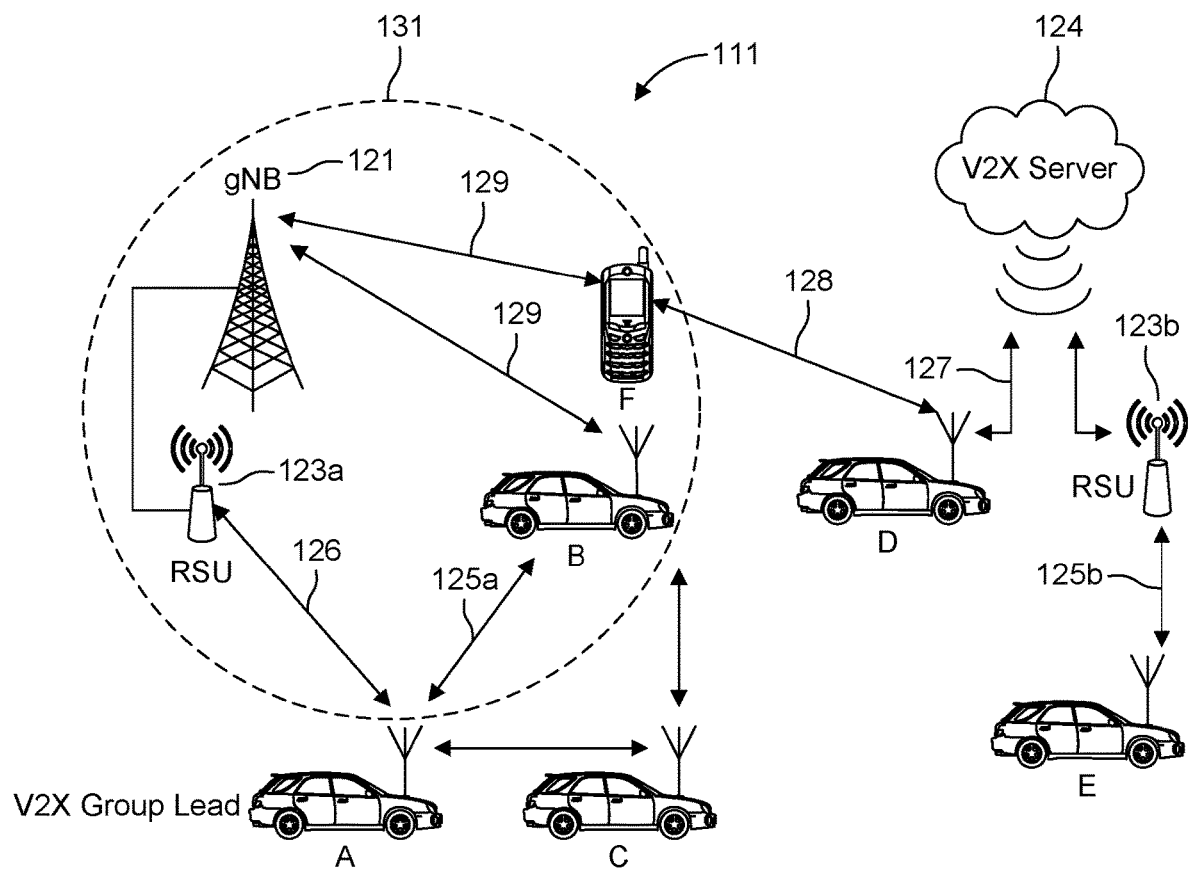
FIG. 26E illustrates another example communications system.

FIG. 26E illustrates an example communications system 111 in which the systems, methods, apparatuses that implement NR sidelink discontinuous reception, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 26E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 26E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 26F:
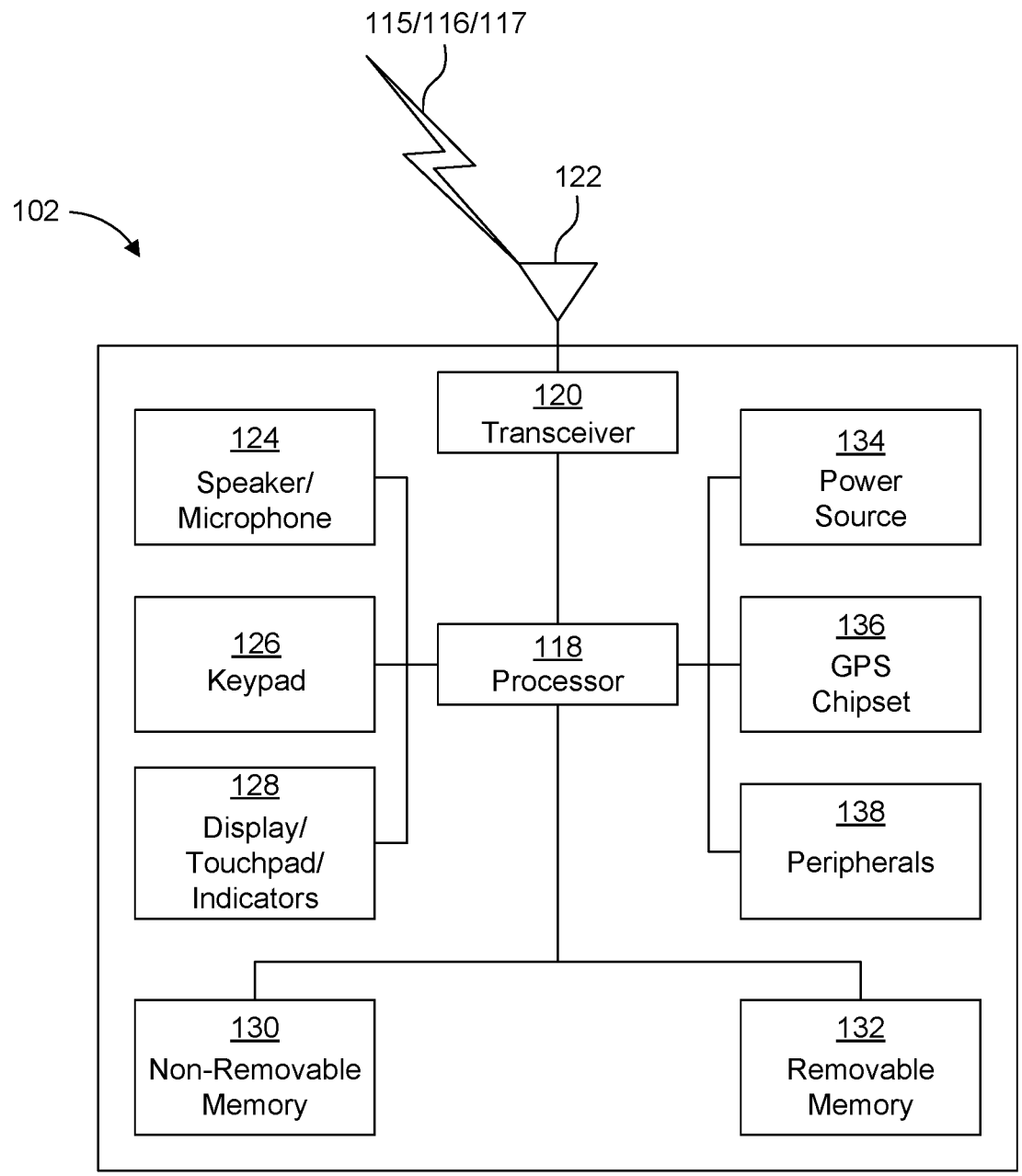
FIG. 26F is a block diagram of an example apparatus or device, such as a WTRU.

FIG. 26F is a block diagram of an example apparatus or device WTRU 102 that may be configured for wireless communications and operations in accordance with the systems, methods, and apparatuses that implement NR sidelink discontinuous reception, described herein, such as a WTRU 102 of FIG. 26A, FIG. 26B, FIG. 26C, FIG. 26D, or FIG. 26E, or FIG. 6-FIG. 22B (e.g., UE 229 or UE 228). As shown in FIG. 26F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 26F and may be an exemplary implementation that performs the disclosed systems and methods for NR sidelink discontinuous reception described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 26F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 26A) over the air interface 115/116/117 or another UE over the air interface 115d/116d/117d. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 26F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether some of the examples described herein are successful or unsuccessful, or otherwise indicate a status of NR sidelink discontinuous reception and associated components. The control lighting patterns, images, or colors on the display or indicators 128 may be reflective of the status of any of the method flows or components in the FIG.'S illustrated or discussed herein (e.g., FIG. 6-FIG. 22B, etc). Disclosed herein are messages and procedures of NR sidelink discontinuous reception. The messages and procedures may be extended to provide interface/API for users to request resources via an input source (e.g., speaker/microphone 124, keypad 126, or display/touchpad/indicators 128) and request, configure, or query NR sidelink discontinuous reception related information, among other things that may be displayed on display 128.

The processor 118 may receive power from the power source 134, and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 26G:
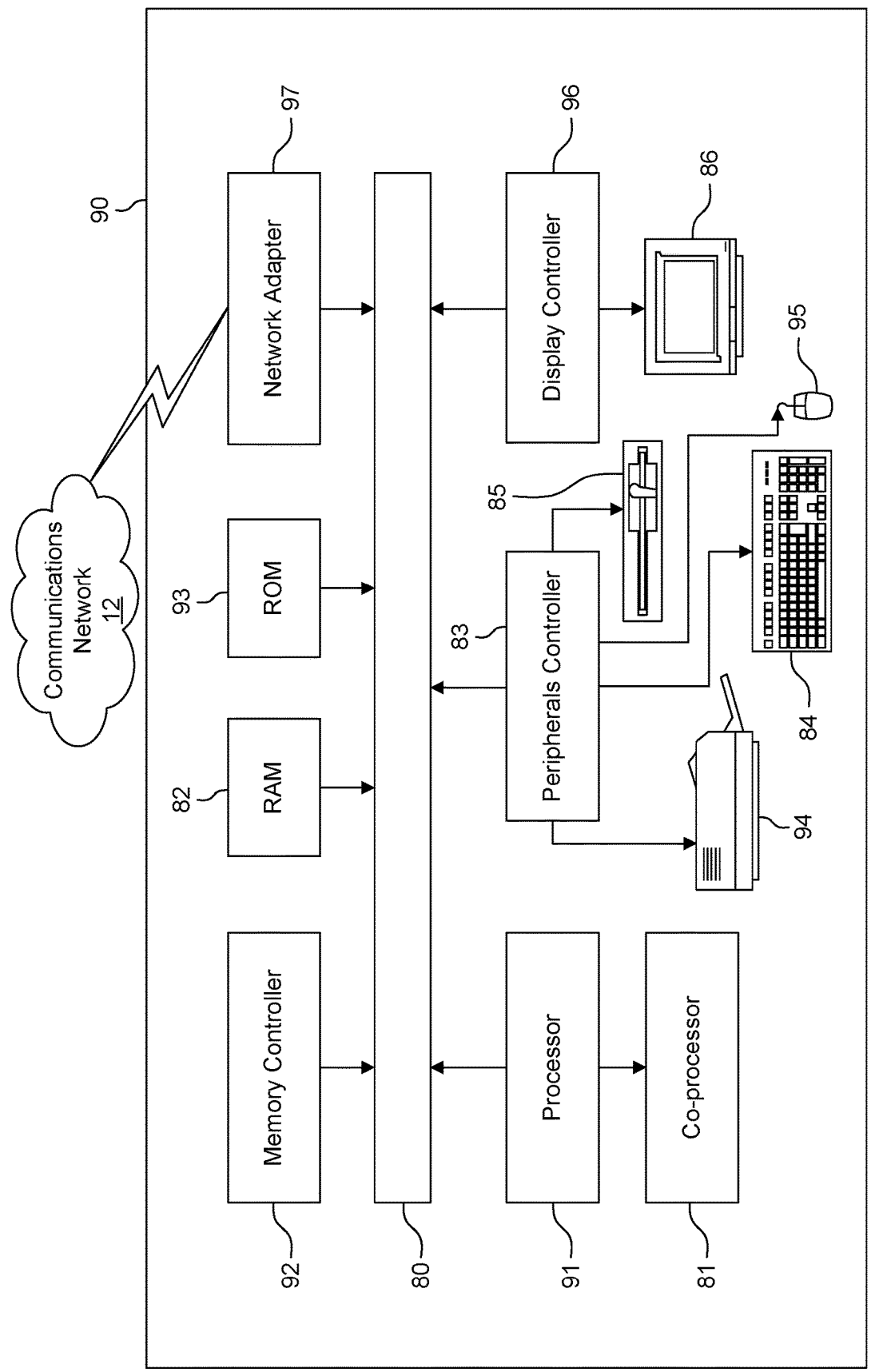
FIG. 26G is a block diagram of an exemplary computing system.

FIG. 26G is a block diagram of an exemplary computing system 90 in which one or more apparatuses of the communications networks illustrated in FIG. 26A, FIG. 26C, FIG. 26D and FIG. 26E as well as NR sidelink discontinuous reception, such as the systems and methods illustrated in FIG. 6 through FIG. 22B described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 26A, FIG. 26B, FIG. 26C, FIG. 26D, or FIG. 26E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure-NR sidelink discontinuous reception—as illustrated in the Figures, specific terminology is employed for the sake of clarity. The claimed subject matter, however, is not intended to be limited to the specific terminology so selected.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the disclosed subject matter, including making and using any devices or systems and performing any incorporated methods. The disclosed subject matter may include other examples that occur to those skilled in the art (e.g., skipping steps, combining steps, or adding steps between exemplary methods disclosed herein).

Methods, systems, and apparatuses, among other things, as described herein may provide for means for NR sidelink discontinuous reception. All combinations in this paragraph or following paragraphs (including the removal or addition of steps) are contemplated in a manner that is consistent with the other portions of the detailed description. In a first example, a UE may execute operations that may include monitoring discovery messages; receiving one or more SL DRX Configurations for SL_UnLinked state based on some common knowledge of the communication resources in time, frequency and space; selecting the DRX configuration based on one or more selection parameters; setting the monitoring for the discovery message based on the selected DRX configuration; and stopping the monitoring based on triggering conditions. The SL DRX Configuration for SL_UnLinked may include Discovery Period, Discovery Window Size, or Discovery Window start time, among other things. The common knowledge of the communication resources in time, frequency, or space may also be known to the serving cell, among other things. The selection parameters may include service type, device class, resource pool, or sidelink bandwidth part, among other things. The triggering conditions may include location, signal from user, sidelink activity, UE battery status, status of Uu interface, or signal from serving cell, among other things. In a second example, a UE may execute operations that may include announcing discovery messages; receiving a discovery response window configuration; monitoring for discovery announcements during the configured discovery window; and increasing the size of the window after each discovery announcement, up until the maximum window size is reached. In a third example, a UE may execute operations that may include communicating using SL communication with one or more other peer UEs; enabling or disabling SL DRX based on trigger conditions; configuring SL DRX parameters; determining the SL communications that are impacted by the SL DRX configuration; informing the peer UEs impacted by the SL DRX configuration; performing SL DRX operation according to the SL DRX configuration; and monitoring status of SL activity to determine if SL DRX configuration needs to be modified. Trigger conditions may be based on SL state, SL service, configuration from the network, SL carrier frequency/SL BWP/SL resource pool, number of active SL connections, QoS requirements of the SL communication, or UE battery status, among other things. SL DRX Configuration may include drx-InactivityTimerSL, drx-onDurationTimerSL, drx-Retransmission- TimerSL, drx-longCycleStartOffsetSL, drx-shortCycleSL, drxShortCycleTimerSL, or drxPrioritySL, among other things. UE may ask serving cell for assistance in determining the SL DRX configuration. Peer UEs may inform their serving cell about the DRX configuration, so that the serving cell may make appropriate scheduling decisions. In a fourth example, a UE that has a Uu interface to its serving cell and the UE may execute operations that may include communicating with SL communication with one or more other peer UEs; receiving a Uu DRX configuration from its serving cell; restarting the drx_InactivityTimer upon reception of a SL grant (SCI for sidelink transmission); and extending the active time based on Uu activities related to SL communication. The Uu activities related to SL communication may include: transmission of a sidelink Scheduling Request, transmission of a sidelink buffer status report, or transmission of a sidelink HARQ, among other things.

Methods, systems, and apparatuses, among other things, as described herein may provide for means for NR sidelink discontinuous reception. All combinations in this paragraph or following paragraphs (including the removal or addition of steps) are contemplated in a manner that is consistent with the other portions of the detailed description. Methods, systems, computer-readable storage mediums, or apparatuses, among other things, as described herein may provide for situations in which UE acting as a RX UE; UE implicitly determines its DRX configuration (e.g., based on service); UE DRX configuration configured by a peer UE; UE DRX joins a SL groupcast/broadcast and that is not using SL DRX and asks that the SL DRX be enabled for groupcast/broadcast; or UE DRX configuration configured by serving cell.

Methods, systems, computer-readable storage mediums, or apparatuses, among other things, as described herein may provide for receiving one or more configuration parameters, wherein the one or more configuration parameters comprise an ON duration timer, an inactivity timer, a retransmission timer, a Hybrid Automatic Repeat Request (HARQ) round-trip-timer (RTT), a short discontinuous reception (DRX) cycle, a long DRX cycle, or a DRX priority; based on the configuration parameters, determining a configuration of a sidelink (SL) DRX to use for a plurality of SL communications to one or more communicatively connected peer UEs, wherein the configuration comprises the one or more configuration parameters; and communicating to the one or more communicatively connected peer UEs over the plurality of SL communications using the configuration for the SL DRX. The SL communications may comprise (e.g., include) a communication received by the apparatus from the one or more communicatively connected peer UEs, causing the apparatus to be a RX UE for the communication, wherein the SL DRX configuration has an active time, and wherein the apparatus monitors SL control information (SCI) or Physical Shared Control Channel (PSCCH) during the active time for the SL DRX. The one or more configuration parameters may be determined implicitly based on at least one of: service, service type, cast type, destination, source-destination pair, resource pool, bandwidth part, or frequency. Determined implicitly may be the apparatus knowing these configuration parameters, such as based on some property of the apparatus or the configuration parameters are obtained through provisioning or pre-provisioning. This implicit determination may be in contrast to where the apparatus has to get (e.g., fetch) these configuration parameters from the peer UE. The active time of the SL DRX may have a start time based on a service layer 2 identifier or destination layer 2 identifier. Methods, systems, computer-readable storage mediums, or apparatuses, among other things, as described herein may provide monitoring for the reception of a SL communication from the one or more communicatively connected peer UEs during an active time. The monitoring may include monitoring SL control information (SCI) or a Physical Shared Control Channel (PSCCH). The active time is the time where the apparatus is listening in the SL. The DRX cycle is divided between active times and OFF times, Methods, systems, computer-readable storage mediums, or apparatuses, among other things, as described herein may provide for sending assistance information to a communicatively connected peer UE of the one or more communicatively connected peer UEs, wherein the assistance information is for the configuration of the SL DRX; in response to sending the assistance information, receiving from the communicatively connected peer UE, a configuration request for SL DRX, the configuration request comprising a first configuration of the SL DRX; analyzing the configuration request for SL DRX to determine whether to modify the first configuration of the SL DRX, reject the first configuration of the SL DRX, or accept the first configuration of the SL DRX; based on the analyzing of the configuration request, determining to accept the first configuration of the SL DRX; sending a confirmation message to the communicatively connected peer UE, wherein the confirmation message indicates the acceptance of the first configuration of the SL DRX; determining if other SL communications are impacted by the first configuration of the SL DRX; and based on the determined SL communications impacted, sending a configuration message to a communicatively connected peer UE of an impacted SL communication, wherein the configuration message indicates to the peer UE the use of SL DRX. More broadly the one of the plurality of SL communications may be groupcast or broadcast, and the apparatus performs further operations comprising: determining that the one of the plurality of SL communications has no SL DRX configuration; and sending a request to enable the SL DRX for the one of the plurality of SL communications. The assistance information may comprise: a number of active SL communications for the apparatus, a preferred SL DRX configuration, or an indication that the apparatus is requesting SL DRX for a certain resource pool, frequency, SL BWP, SL service type, cast type, or peer UE. The assistance information and configuration message may be transmitted over a PC5 Radio Resource Control (RRC) message or over a MAC Control Element (CE). The impacted SL communication may be groupcast or broadcast. The apparatus may be a user equipment (UE).

All combinations in this paragraph or following paragraphs (including the removal or addition of steps) are contemplated in a manner that is consistent with the other portions of the detailed description. Methods, systems, computer-readable storage mediums, or apparatuses, among other things, as described herein may provide for determining that the impacted SL communication has no SL DRX configuration; and sending a request to enable the SL DRX for the impacted SL communication. Methods, systems, computer-readable storage mediums, or apparatuses, among other things, as described herein may provide for sending information to a serving cell for configuring the SL DRX; in response to sending the information, receiving from the serving cell a configuration request for the SL DRX, the configuration request comprising a first configuration of the SL DRX; analyzing the configuration request for SL DRX to determine whether to modify the first configuration of the SL DRX, reject the first configuration of the SL DRX, accept the first configuration of the SL DRX; based on the analyzing of the configuration request, determining to accept the first configuration of the SL DRX; sending a confirmation message to the serving cell, wherein the confirmation message indicates the acceptance of the first configuration of the SL DRX; determining if other SL communications are impacted by the first configuration of the SL DRX; and based on the determined SL communications impacted, sending a configuration message to a communicatively connected peer UE, wherein the configuration message indicates to the peer UE the use of SL DRX. The apparatus may act as a source for one or more SL communications, and wherein the SL communication may have a SL DRX configuration with active times. The one or more configuration parameters are determined implicitly based on at least one of: service, service type, cast type, destination, source-destination pair, resource pool, bandwidth part, or frequency.

Methods, systems, computer-readable storage mediums, or apparatuses, among other things, as described herein may provide for receiving assistance information from a communicatively connected peer UE of the one or more communicatively connected peer UEs, wherein the assistance information is for the configuration of the SL DRX; in response to receiving the assistance information, determine a configuration of a SL DRX for the peer UE; sending a configuration request comprising a first configuration of the SL DRX for the peer UE, to the peer UE; receiving a confirmation message from the communicatively connected peer UE, wherein the confirmation message indicates the acceptance, rejection, or modification of the first configuration of the SL DRX; determining scheduling limitations imposed by the first configuration of the SL DRX; and sending communications to the communicatively connected peer UE, taking into consideration the scheduling limitations. Wherein taking into consideration the scheduling limitations comprises one or more of: marking slots where the communicatively connected peer UE is in SL DRX as not useable for SL transmission; or notifying a serving cell about the scheduling limitations for transmission to the communicatively connected peer UE. The assistance information or configuration request are transmitted over a PC5 Radio Resource Control (RRC) message or over a Medium Access Control (MAC) Control Element (CE). The SL DRX active time may comprise one or more of the following times: times during which drx-onDurationTimerSL or drx-InactivityTimerSL are running; times during which drx-RetransmissionTimerRXSL or drx-RetransmissionTimerTXSL are running for a SL communication; or times during which UE has issued a Channel State information (CSI) request to a communicatively connected peer UE and the MAC entity is waiting for the SL-CSI report (from this peer UE). The monitoring the SCI/PSCCH may be based on checking at least one of: for unicast transmission, if a source identifier (ID) and a destination ID in the SL control information (SCI) matches least significant bits (LSBs) of layer 2 IDs maintained by the UE for this unicast communication; for unicast transmission, if the destination (DST) field of a decoded medium access control (MAC) packet data unit (PDU) subheader is equal to the 8 most significant bits (MSB) of any of the source layer-2 ID(s) of the UE for which the 16 LSB are equal to the Destination ID in the corresponding SCI, and the SRC field of the decoded MAC PDU subheader is equal to the 16 MSB of any of the destination layer-2 ID(s) of the UE for which the 8 LSB are equal to the source ID in the corresponding SCI; for groupcast transmission, if the 16 LSBs of any destination layer 2 IDs are equal to the destination ID in the corresponding SCI; for groupcast transmission, if the DST field of the decoded MAC PDU subheader is equal to the 8 MSB of any of the Destination Layer-2 ID(s) of the UE for which the 16 LSB are equal to the Destination ID in the corresponding SCI; for broadcast transmission, if the 16 LSBs of any destination layer 2 IDs are equal to the destination ID in the corresponding SCI; for groupcast transmission, the DST field of the decoded MAC PDU subheader is equal to the 8 MSB of any of the Destination Layer-2 ID(s) of the UE for which the 16 LSB are equal to the destination ID in the corresponding SCI; or if the UE knows that a SL communication will occur in a certain PSSCH duration, and the UE has a valid SCI for this PSSCH duration.

Methods, systems, computer-readable storage mediums, or apparatuses, among other things, as described herein may provide for communicating over sidelink, to one or more communicatively connected peer UEs over one or more sidelink communications; communicating over Uu interface to a serving cell, and having a configured Uu DRX; and including in the Uu DRX active time, one or more of the following times: time during which a Sidelink Scheduling Request is sent on PUCCH and is pending; time during which a Sidelink Buffer Status Report (BSR) has been triggered and sent and this Sidelink BSR has not cancelled; or time during which a Sidelink HARQ feedback has been sent to the serving cell indicating a failed (e.g., NACK or DTX) Sidelink transmission, and no sidelink grant has been received for retransmission.

What is claimed:

1. A first wireless transmit/receive unit (WTRU) comprising:
   a processor configured to:
   send assistance information to a second WTRU, the assistance information associated with a sidelink (SL) discontinuous reception (SL DRX) configuration;
   receive a configuration request from the second WTRU after sending the assistance information associated with the SL DRX configuration, the configuration request comprising SL DRX configuration information;
   determine whether to accept the SL DRX configuration information or to reject the SL DRX configuration information;
   on condition of determining to reject the SL DRX configuration information, send a message to the second WTRU, the message comprising an indication of rejection of the SL DRX configuration information; and
   on condition of determining to accept the SL DRX configuration information, send the SL DRX configuration information to a network.

2. The first WTRU of claim 1, wherein the processor is configured to monitor one or more of SL control information (SCI) or a physical shared control channel (PSCCH) during an active time of the SL DRX configuration.

3. The first WTRU of claim 1, wherein the SL DRX configuration information comprises one or more of a retransmission time period for SL DRX, a time period for SL DRX inactivity, a delay before starting a duration of an on period of a cycle of SL DRX, a duration of an on period of a cycle of SL DRX, or a minimum duration before a SL assignment for hybrid automatic repeat request (HARQ) retransmission is expected.

4. The first WTRU of claim 1, wherein the assistance information comprises one or more of a number of active SL communications for the first WTRU, a preferred SL DRX configuration, timing information of the SL DRX, or an indication that the first WTRU is requesting SL DRX for a certain resource pool, frequency, sidelink BWP, sidelink service type, cast type, or the second WTRU.

5. The first WTRU of claim 1, wherein the assistance information and configuration request are transmitted over a PC5 Radio Resource Control (RRC) message or over a medium access control (MAC) Control Element (CE).

6. A method performed by a first wireless transmit/receive unit (WTRU), the method comprising:
  sending assistance information to a second WTRU, the assistance information associated with a sidelink (SL) discontinuous reception (SL DRX) configuration;
  receiving a configuration request from the second WTRU after sending the assistance information associated with the SL DRX configuration, the configuration request comprising SL DRX configuration information;
  determining whether to accept the SL DRX configuration information or to reject the SL DRX configuration information;
  on condition of determining to reject the SL DRX configuration information, sending a message to the second WTRU, the message comprising an indication of rejection of the SL DRX configuration information; and
  on condition of determining to accept the SL DRX configuration information, sending the SL DRX configuration information to a network.

7. The method of claim 6, wherein the SL DRX configuration information comprises one or more of a retransmission time period for SL DRX, a time period for SL DRX inactivity, a delay before starting a duration of an on period of a cycle of SL DRX, a duration of an on period of a cycle of SL DRX, or a minimum duration before a SL assignment for hybrid automatic repeat request (HARQ) retransmission is expected.

8. The method of claim 6, wherein the assistance information comprises one or more of a number of active SL communications for the first WTRU, a preferred SL DRX configuration, timing information of the SL DRX, or an indication that the first WTRU is requesting SL DRX for a certain resource pool, frequency, sidelink BWP, sidelink service type, cast type, or the second WTRU.

9. The method of claim 6, wherein the assistance information and configuration request message are transmitted over a PC5 Radio Resource Control (RRC) message or over a medium access control (MAC) Control Element (CE).

* * * * *